Nov. 7, 1967   B. F. AMBROSIO ET AL   3,351,916
DATA CONVERTER
Filed Jan. 11, 1965   17 Sheets-Sheet 3

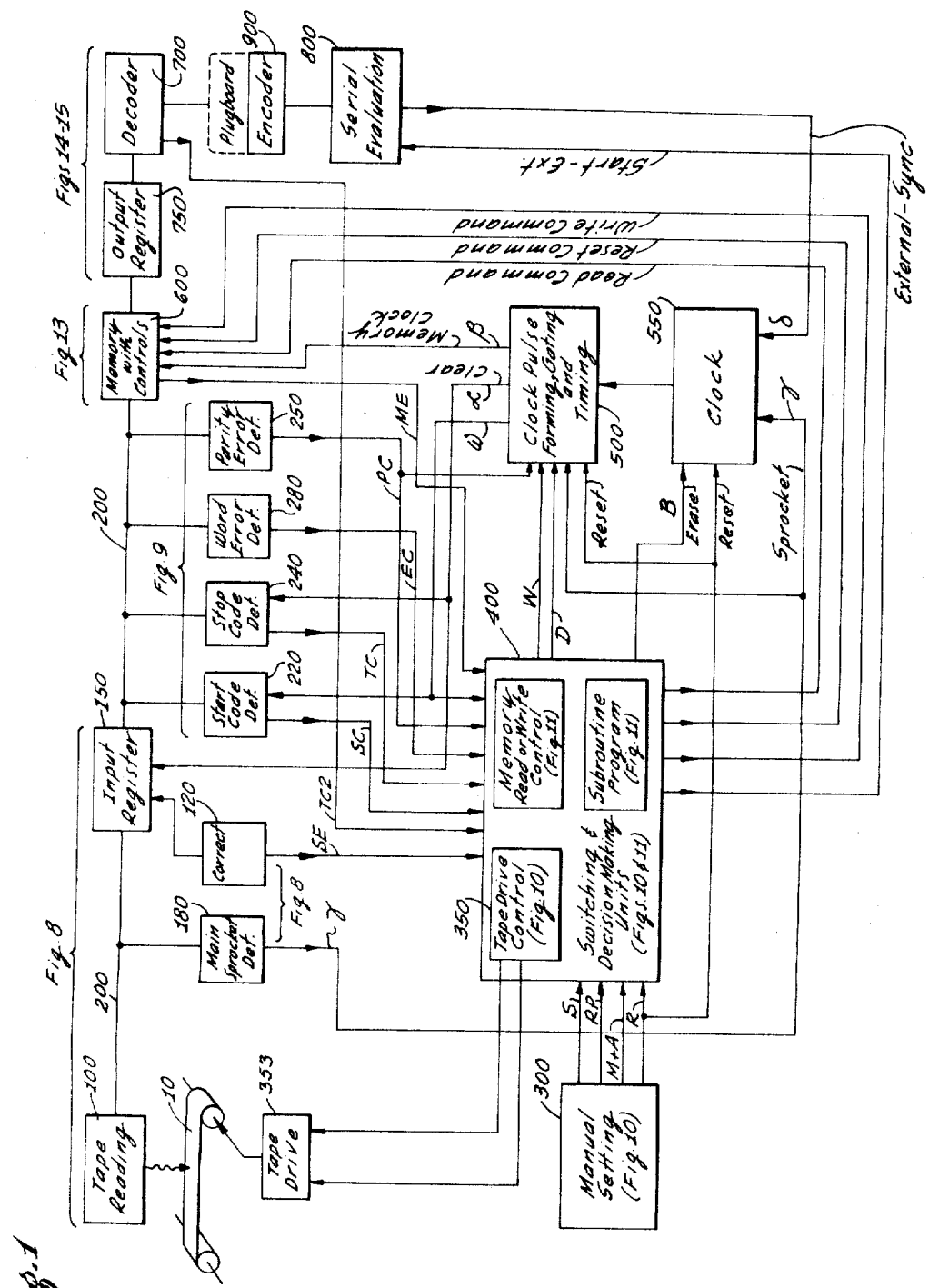

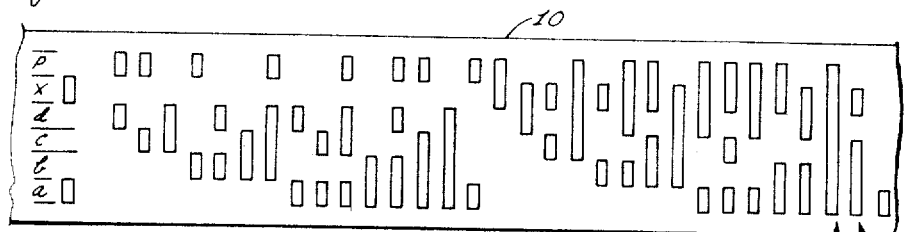
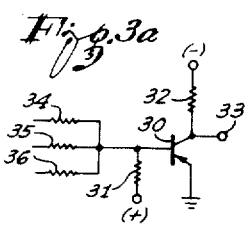
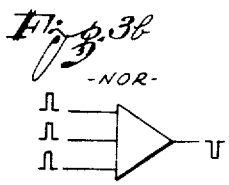
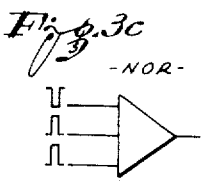
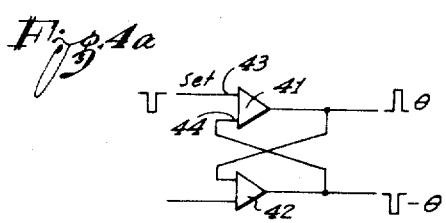
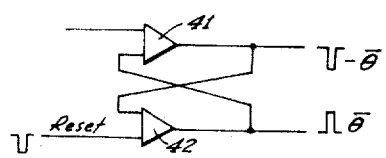
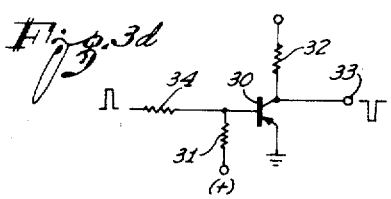
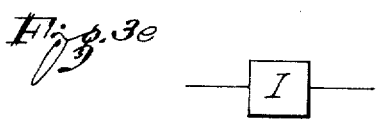
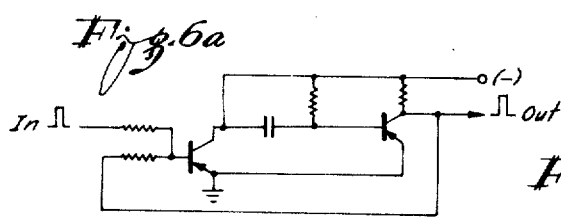
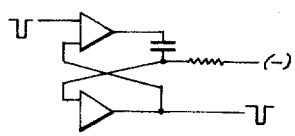
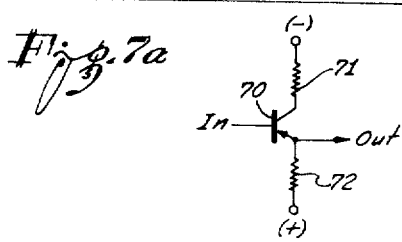
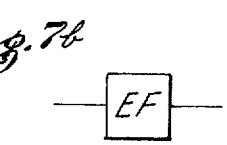

INVENTORS:
Biagio F. Ambrosio
Rein Turn

Smyth, Roston & Pavitt
Attorneys

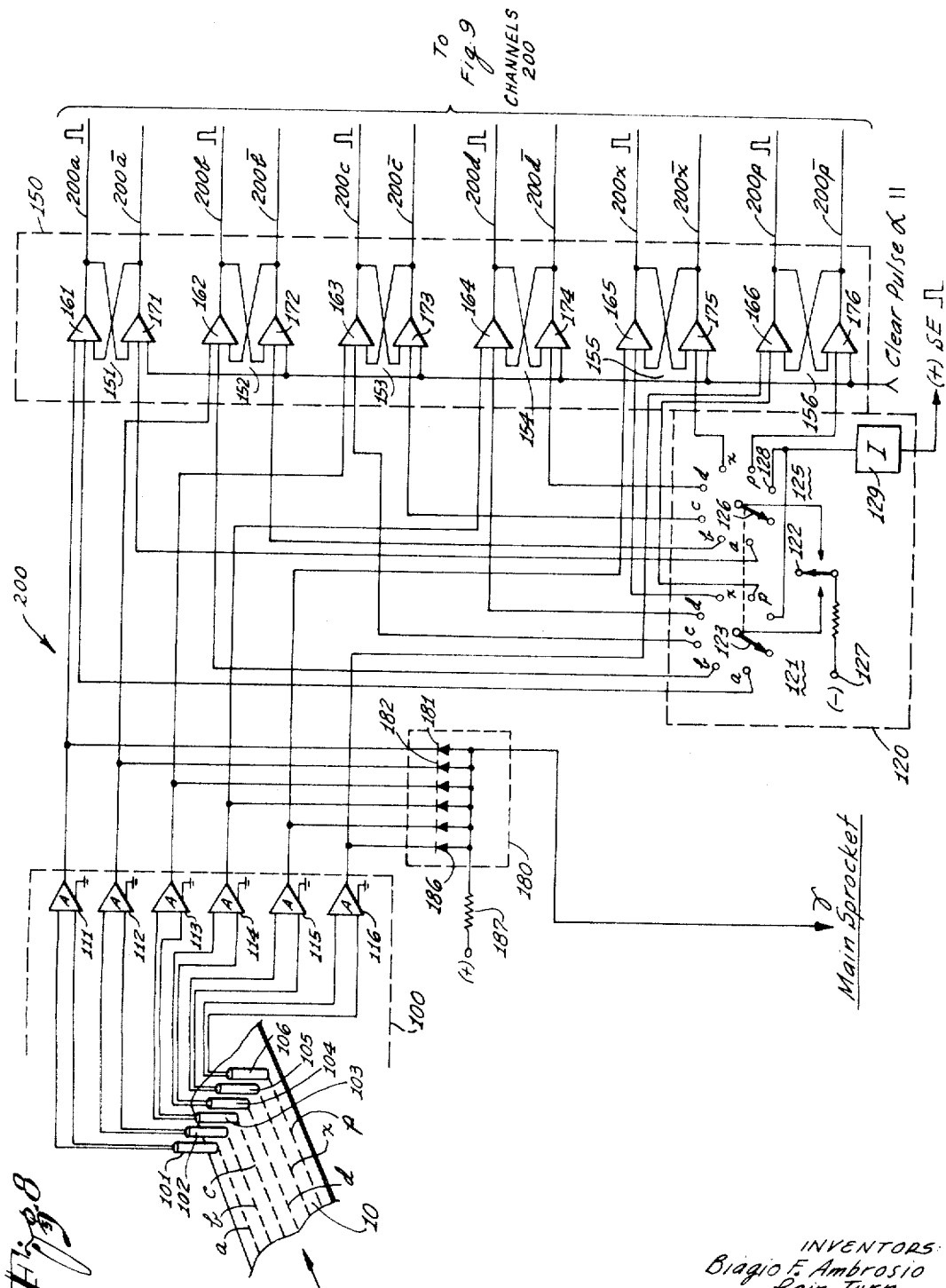

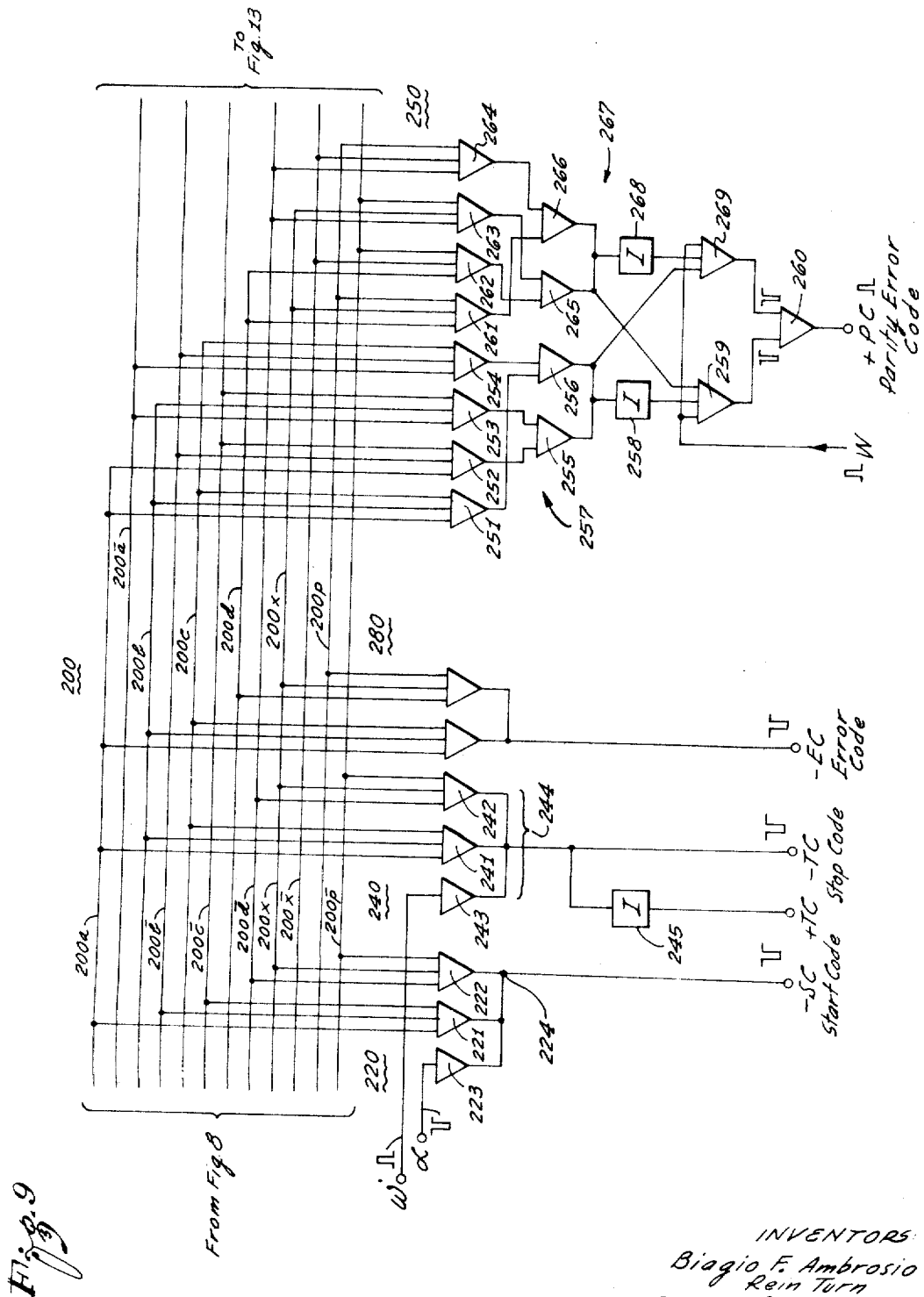

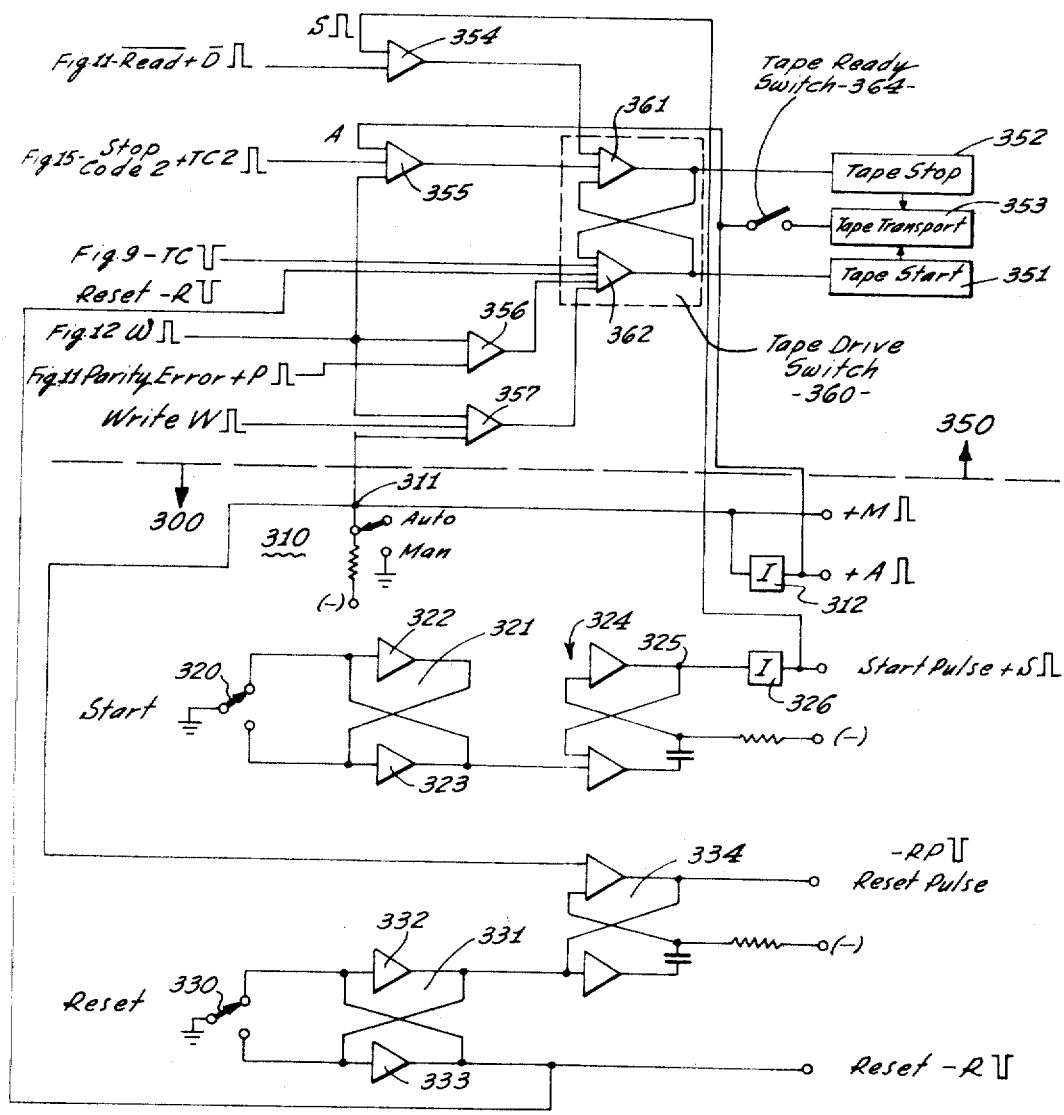

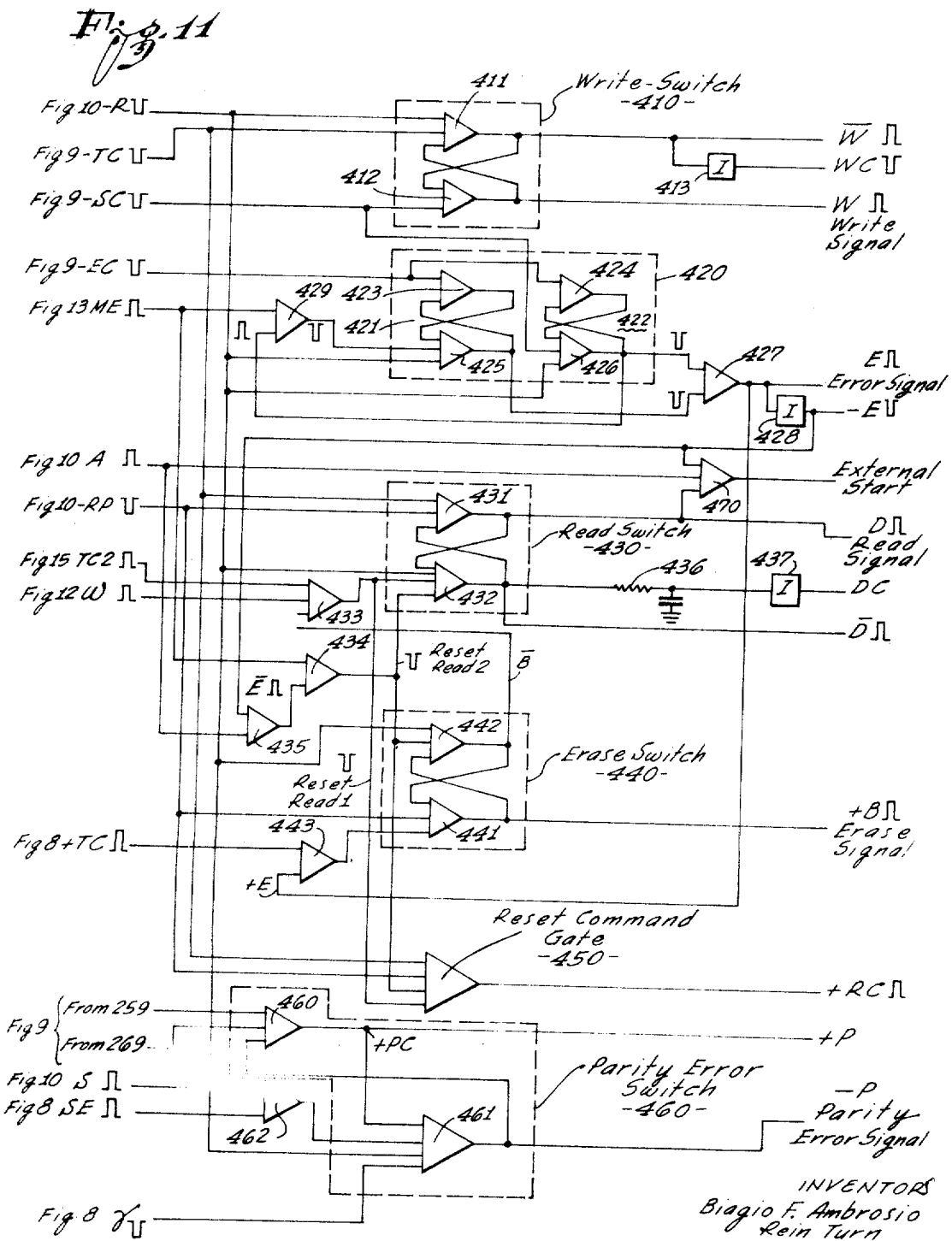

INVENTORS:
Biagio F. Ambrosio
Rein Turn

Attorneys

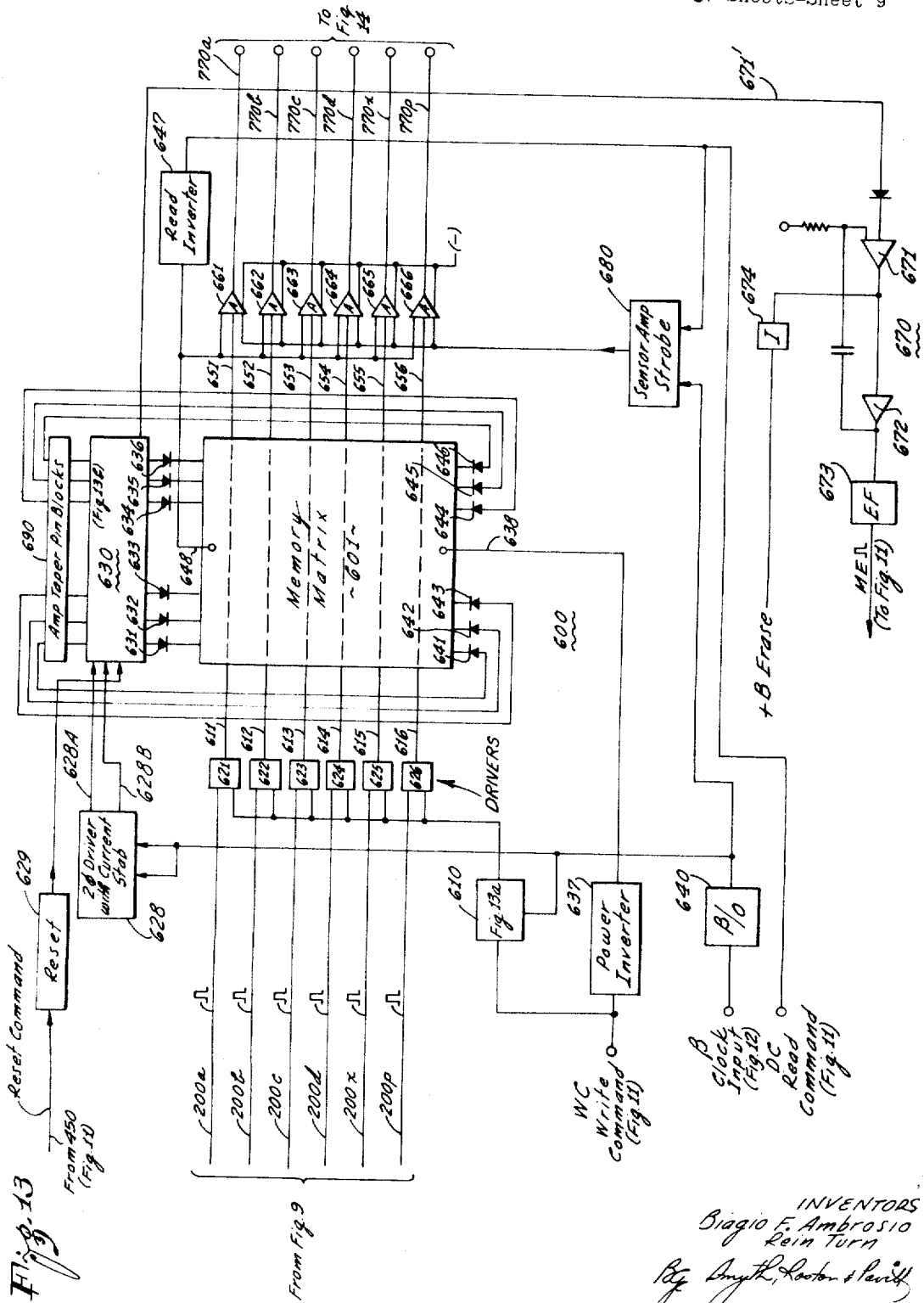

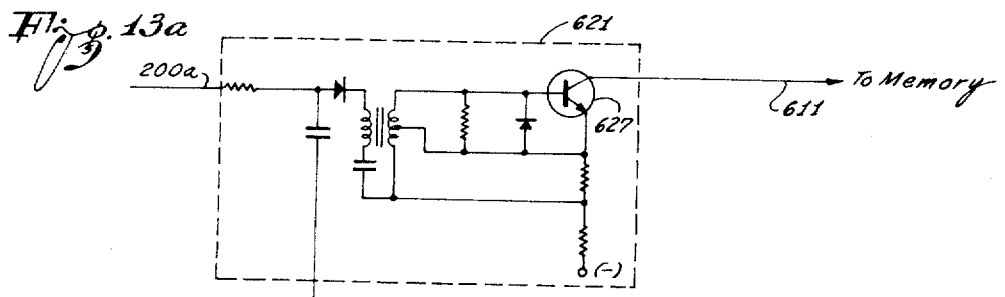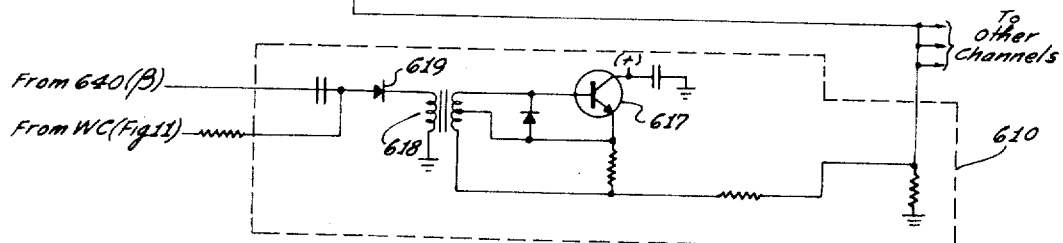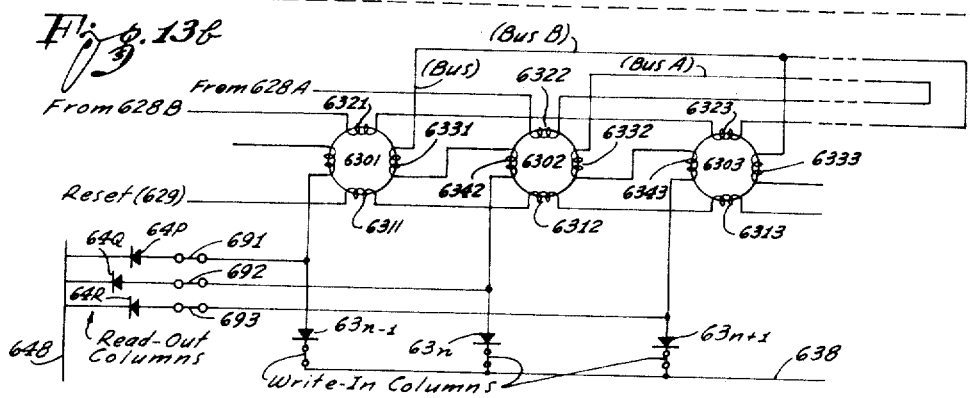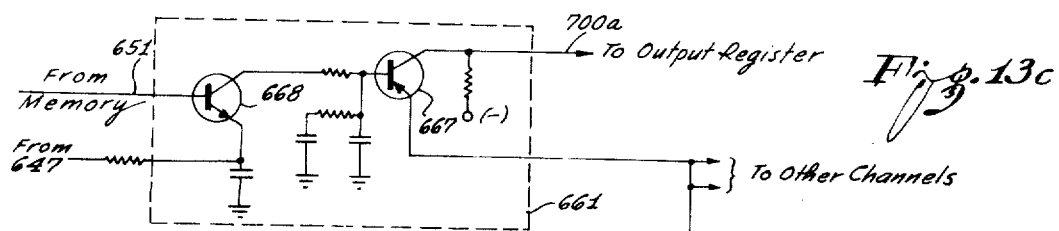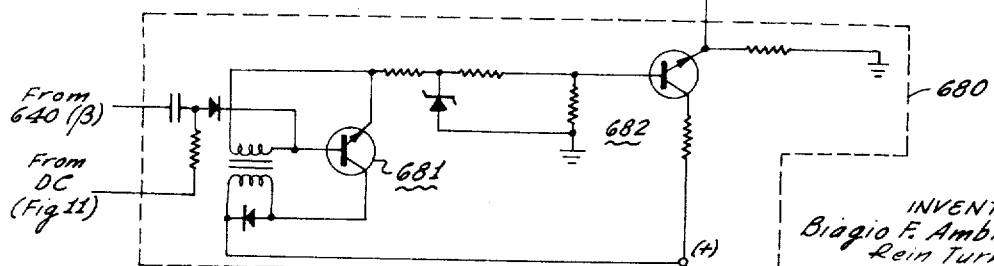

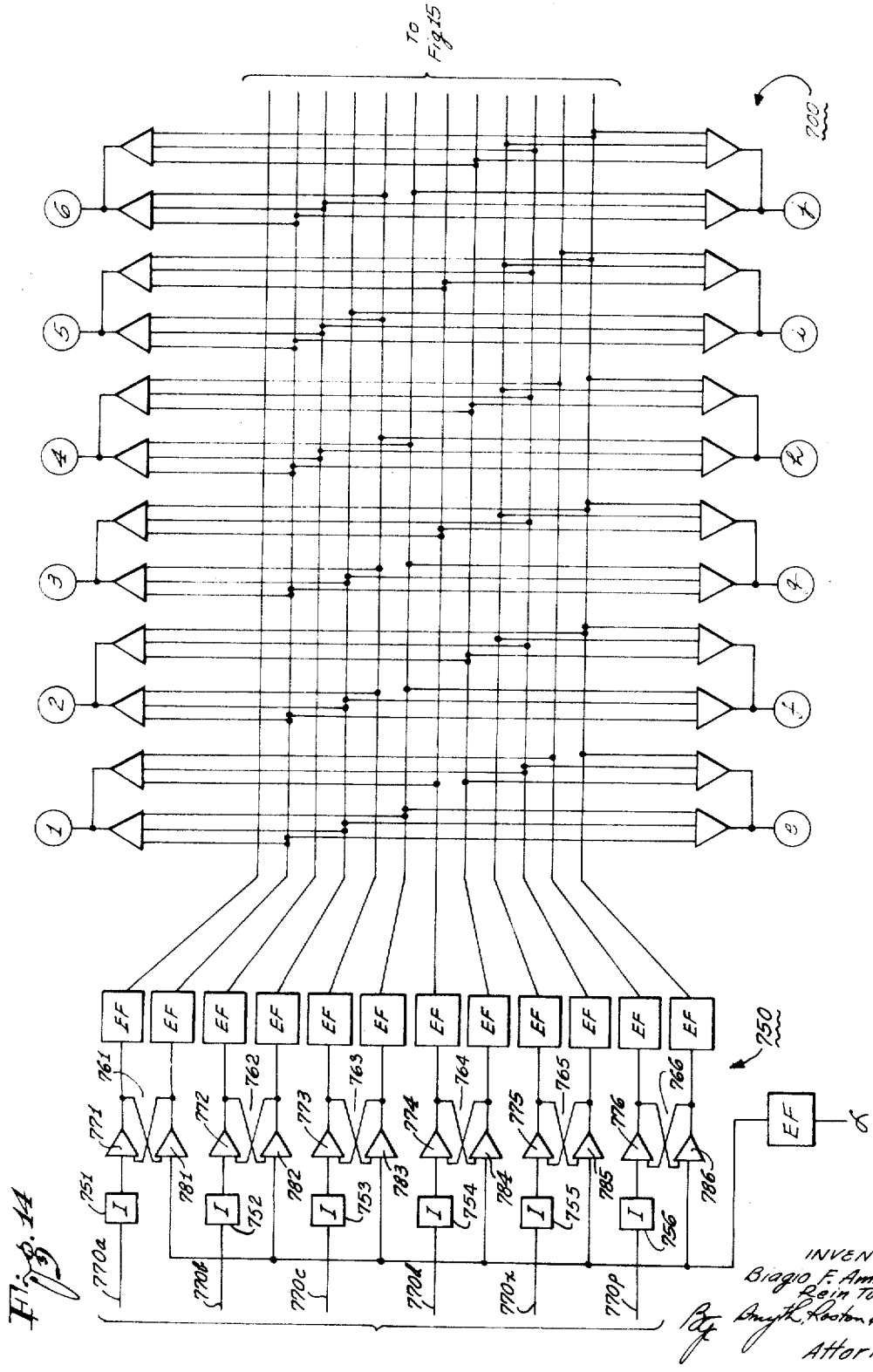

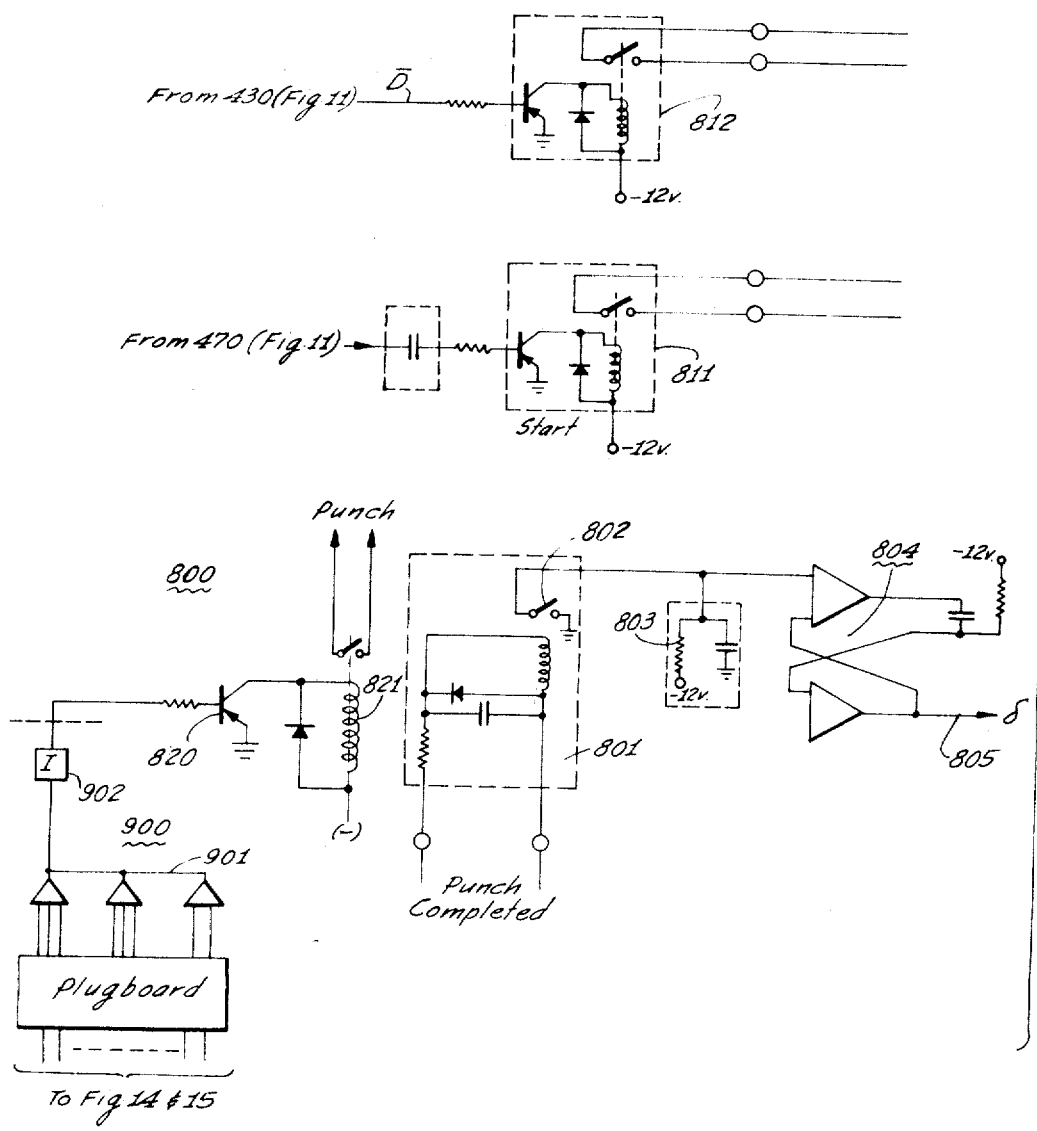

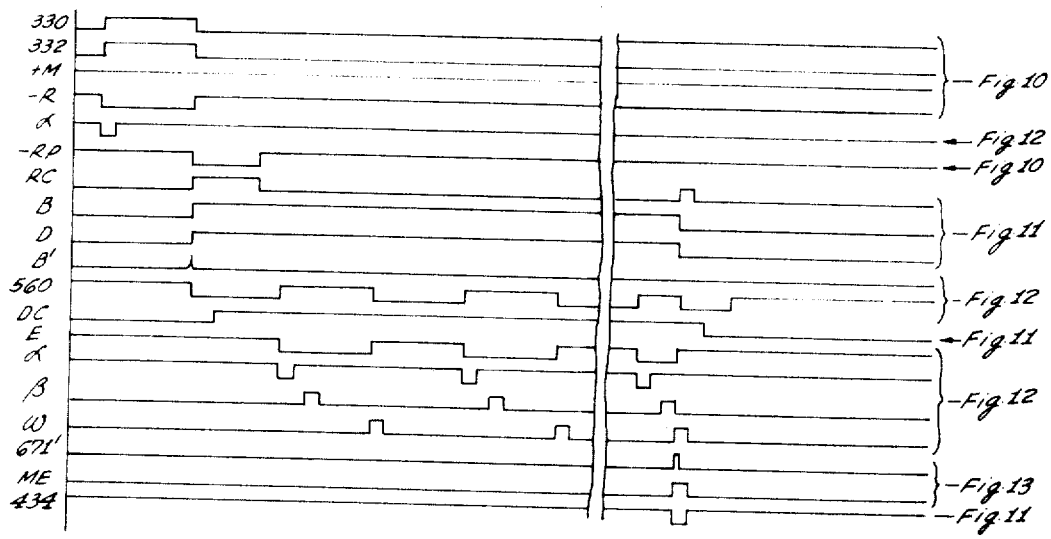
Fig. 17 (Master Clear and Erase Routine)
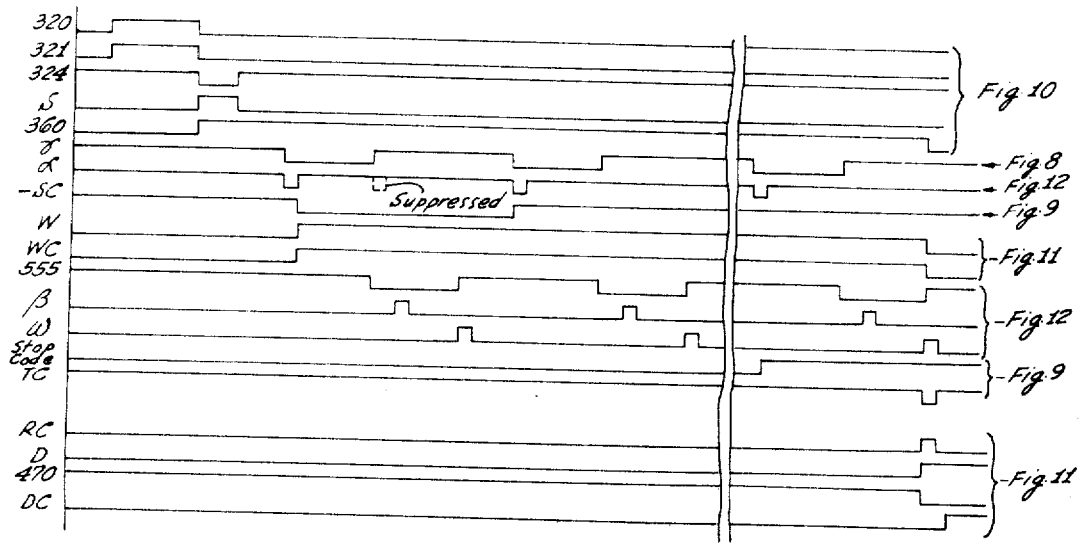
Fig. 18 (Memory Write-in Routine)

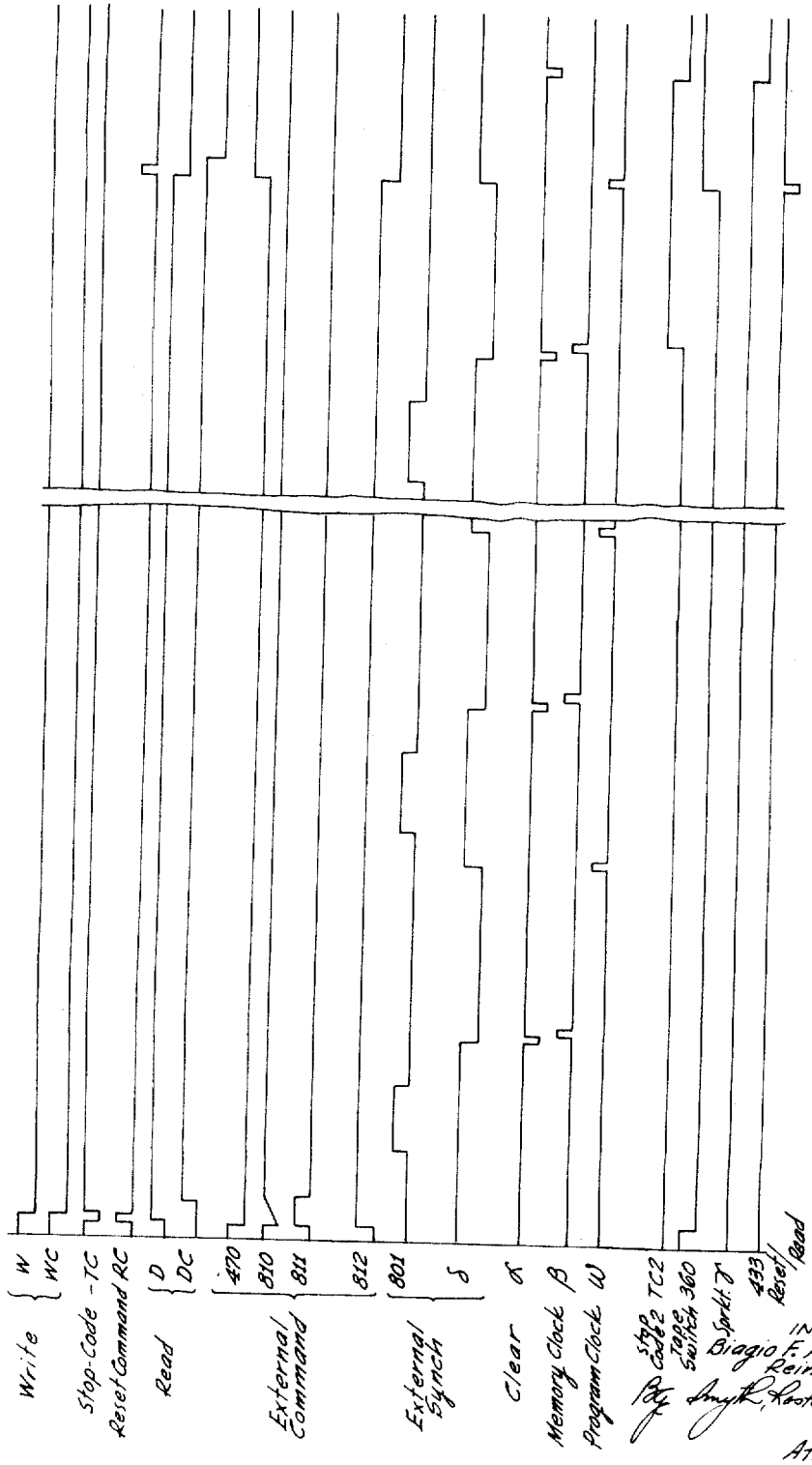

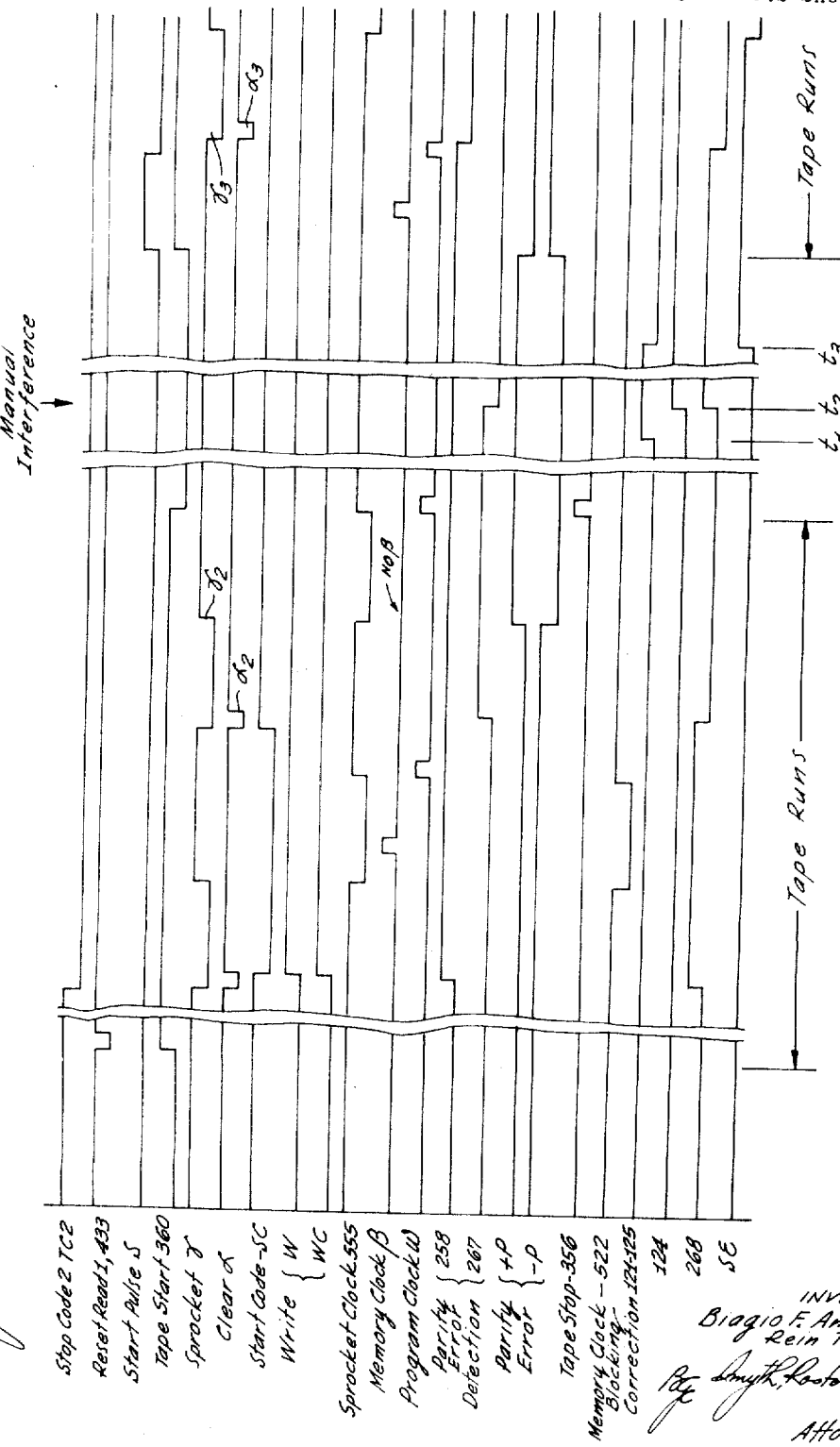

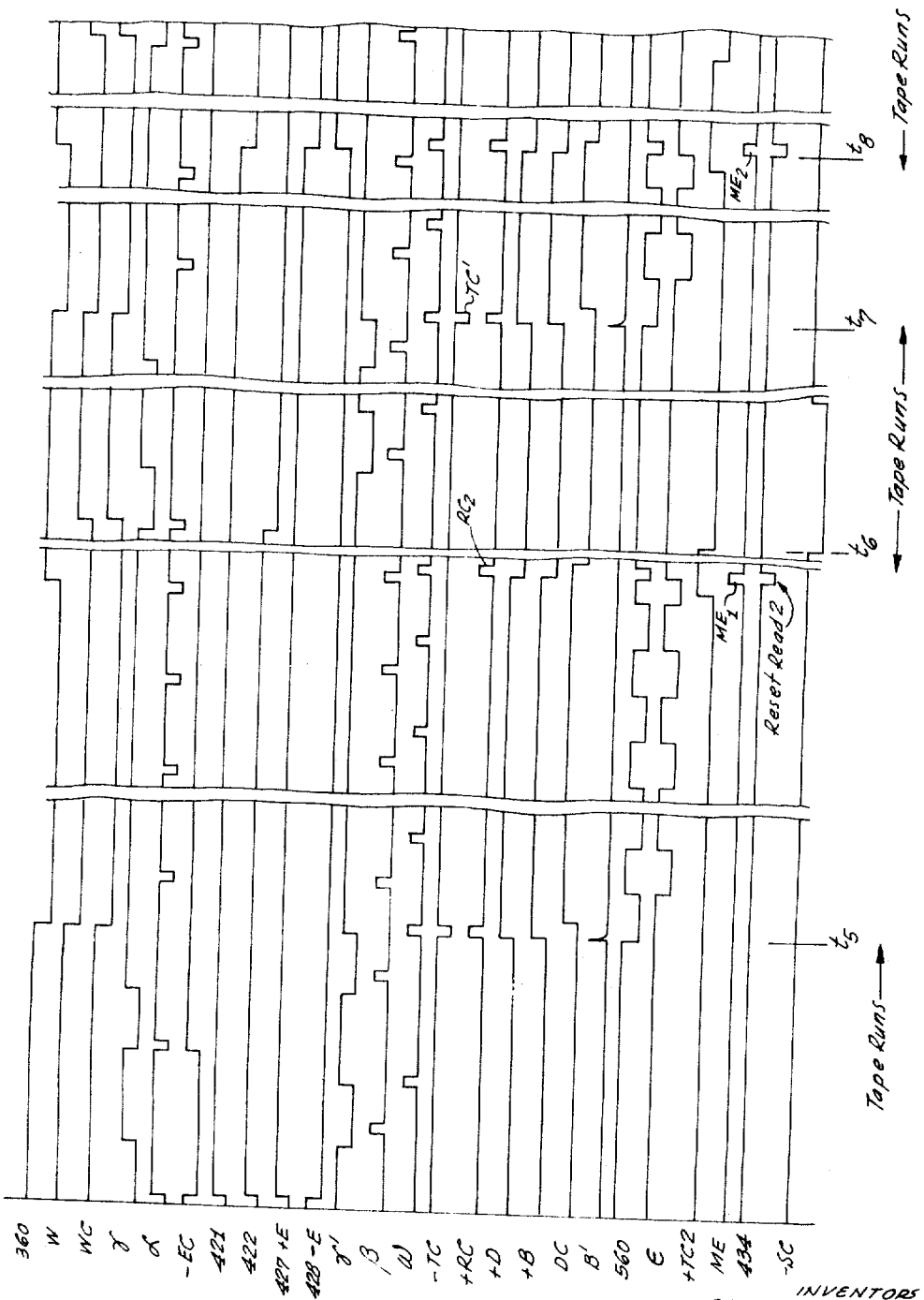

United States Patent Office 3,351,916
Patented Nov. 7, 1967

3,351,916
DATA CONVERTER
Biagio F. Ambrosio, 5711 Melvin Ave., Tarzana, Calif.
91356, and Rein Turn, Van Nuys, Calif.; said Turn assignor to said Ambrosio
Filed Jan. 11, 1965, Ser. No. 424,572
44 Claims. (Cl. 340—172.5)

ABSTRACT OF THE DISCLOSURE

A code printed tape is read and a group of data is stored in a memory whereupon the tape is stopped and the data are read out from the memory and decoded. Memory readin and readout and tape starting and stopping are cycled through a special stop character at the end of the data group. A start character controls beginning of reading. The memory is clocked either from the tape or the external output device to which the decoded data are fed. An internal clock operates only for erasing. Parity error and a special error code stop the tape. A manual corrector permits character correction.

---

The present invention relates to improvements in data converters. More particularly, the present invention relates to a device that finds utility as an input device for a digital data-evaluating apparatus that by itself is not equipped to directly read out intelligence stored on a particular storage medium.

It is, therefore, a primary object of the present invention to provide for a new and improved data converter that is equipped with a reading device for serially reading out information from a particular storage medium, that is further equipped to temporarily store such read-out data, and that is further equipped to render such read-out data available in decoded form for external use without limitation as to the type of evaluating apparatus.

It is a feature of the present invention to provide a new and improved data converter in which a reader serially reads out characters stored on a storage medium such as a tape. Each character is comprised of a plurality of bits arranged across the tape. The bits are longitudinally arranged in parallel tracks, and each character is defined as a particular combination of bits or absence of bits in all of the tracks. The characters are further arranged in groups, each group defining a word.

The storage medium is to include in serial relationship information data characters as well as instruction characters. The novel data converter is equipped with an input register immediately responding to any combination of bits read out by the tape reader. Instruction code detectors respond to the output of the input register to initiate command signals for the processing of characters subsequently or previously read out of the tape.

The input register feeds its content to a buffer memory, and the instruction codes determine commencement and termination of memory write-in—memory read-out. The output circuit of the memory, including an output register, is connected to a decoder; and during a memory read-out period, different characters appear as single-bit signals at different output terminals of the decoder.

It is a specific feature of the present invention to load the characters in the memory prior to decoding, and decoding is had during memory read-out and immediately prior to evaluation. The purpose thereof is to be seen in that the decoder operates with as many outputs as there are different characters, so that any kind of re-encoding is possible. The memory is thus smaller if the characters are stored as read from the tape, rather than as decoded.

The external evaluation device, such as a card-punching machine or a computer, is connected to the decoder. The novel data converter may be equipped with a device permitting power and signal adaptation for cyclically starting and stopping the external evaluation device.

It is a further feature of the invention to use a special instruction code for causing alternation between memory write-in and memory read-out control. A detector for this code is connected to the memory input register; a similar detector is connected to the memory output register. Whenever this instruction code appears in the input register, it causes termination of the memory write-in of a word previously read from the tape; and this instruction code further initiates a switching over for memory read-out and appropriate evaluation of the data previously read from the tape and stored in the memory. The terminated memory write-in routine includes a write-in of this instruction code into the memory. When, during the memory read-out routine, this instruction code is being read out from the memory, it is used to terminate the memory read-out and to initiate another write-in cycle of another word to be read from the tape by the tape reader.

It is thus a specific feature of the present invention that a serially appearing instruction code character is decoded at the memory input and output registers to alternate between memory write-in and memory read-out, and thereby such an instruction code determines the cyclic operation of the memory.

A further feature of the invention includes the provision of a control and decision-making unit that responds to serially read out instruction code signals to alternate buffer-memory operation between write-in and read-out program routine. The control and decision-making unit includes further means that are responsive to a special instruction code, so as to interrupt a regular program routine (write-in—read-out) and to initiate a word-or character-skipping subroutine independently from the program routine. Upon completion of the subroutine, the control and decision-making unit returns to continue the program routine, but at a point that is different from that at which the interruption occurred. Specifically, the control and decision-making unit is equipped with means permitting the skipping of one or more words as character combinations on the tape so as to suppress their evaluation in the external device connected to the decoder.

Further features of the invention include measures to clock the data converter externally during the normal program routine and internally during the subroutine. The clock used responds to signals in a threefold manner. The memory write-in routine is governed by clock pulses exclusively derived from the tape and in a manner that does not require any special clock track on the tape, but there is provided a detector that responds every time the tape reader detects at least one bit in any signal track. During memory read-out, the cycle speed of such a memory read-out is determined by the rate at which the external device evaluates decoded data; there are provided adapter means to draw clock pulses from the external device whenever it is ready for the reading out of another character from the buffer memory. Finally, for preparing the entire device for operation, and also for carrying out the above-mentioned subroutine, an internal clock is provided that is normally inactive but is activated for clocking the converter when there is neither a memory read-out with evaluation nor a write-in in progress.

Further features of the invention include a transport control of the storage medium, such as a tape, via instruction code characters that are serially printed or otherwise serially located on the tape.

It is another feature of the present invention to subject each character as it appears in the input register to a test as to an even number of bits. Each correct character is defined by an even number of bits. Whenever an odd number of bits appears in the input register, further write-in is being interrupted, enabling the operator to correct the number of bits in the input register.

While the specification concludes with claims particularly pointing out and distinctly claiming the subject matter which is regarded as the invention, it is believed that the invention, the objects and features of the invention, and further objects, features, and advantages thereof will be better understood from the following description taken in connection with the accompanying drawings, in which:

FIG. 1 illustrates a block diagram of the general layout of a data converter according to the present invention;

FIG. 2 illustrates a tape portion including an example of the code characters printed on a tape used as data and instruction input for the data converter according to the preferred embodiment of the invention;

FIG. 3a illustrates a transistor "nor" gate that is the principal component used throughout the inventive device;

FIGS. 3b and 3c illustrate the block symbols used in the following figures to identify such a "nor" gate;

FIG. 3d illustrates a modification and simplification of the "nor" gate shown in FIG. 3a when it is employed as inverter;

FIG. 3e illustrates the block symbol used in the drawings for identifying an inverter such as shown as an example in FIG. 3d;

FIGS. 4a and 4b illustrate a flip-flop for setting and resetting operation composed of "nor" gates such as illustrated in FIGS. 3a through 3c;

FIGS. 5b and 5c illustrate alternative block symbols used to identify "nor" gates such as shown in FIG. 5a;

FIG. 6a illustrates a circuit network for a transistorized monovibrator or single-shot multivibrator;

FIG. 6b illustrates the block used in the drawings for identifying a monovibrator such as shown in FIG. 6a;

FIG. 7a illustrates a circuit diagram of an emitter-follower with transistor;

FIG. 7b illustrates the block symbol used throughout the drawings to identify an emitter-follower such as illustrated in FIG. 7a;

FIG. 8 illustrates in a block diagram the tape reader, the principal bit or sprocket detector connected thereto, the input register and a correcting device for the input register;

FIG. 9 illustrates a first output circuit of the input register shown in FIG. 8 which output circuit includes four different instruction code detectors;

FIG. 10 illustrates in its lower portion a block diagram for a manual-setting device in the inventive data converter, and in its upper part this figure illustrates a block diagram of the principal switch controlling the drive of the tape to be read-out;

FIG. 11 illustrates a block diagram of several switches constituting the principal elements of a switching and decision-making unit used to control the principal functions of the inventive data converter;

FIG. 12 illustrates a block diagram of a clock pulse timing, forming and gating device;

FIG. 13 illustrates in schematic block diagram the buffer memory of the inventive data converter which includes portions of input, output and timing circuits thereof;

FIGS. 13a, 13b and 13c illustrate detailed wiring diagrams of several blocks shown in FIG. 13;

FIG. 14 illustrates a block diagram of the buffer memory output register as well as a portion of the decoding unit;

FIG. 16 illustrates the portions of an external data-evaluating device including optional elements to be incorporated in the inventive data converter; FIG. 16 further illustrates somewhat schematically a block diagram of the connecting unit between the external evaluating device and the decoder unit shown in FIGS. 14 and 15;

FIG. 17 illustrates a pulse diagram of the master clear and erase operation;

FIG. 18 illustrates a pulse diagram of the normal memory write-in routine;

FIG. 19 illustrates a pulse diagram of the normal memory read-out routine;

FIG. 20 illustrates a pulse diagram of a parity error detection and correction routine;

FIG. 21 illustrates a pulse diagram of a word error and skip detection and correction routine.

*General description*

Figure 5A:
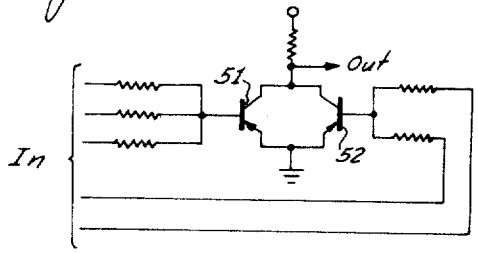
FIG. 5a illustrates a five-input "nor" gate using two transistors.

In the following the general arrangement of a data converter constituting the preferred embodiment of the invention shall be described with particular reference to FIGURES 1 and 2. The system shown in FIGURE 1 reads and decodes data stored on a tape 10 such as shown in FIGURE 2. This tape 10 stores data along six tracks $a$, $b$, $c$, $d$, $x$ and $p$. The data are stored on this tape in the form of printed contrast-producing rectangular areas. All printed areas aligned in a direction transversely to the direction of tape movement form one character. A character is thus defined by a unique combination of printed areas and unprinted space in the several tracks. Each such printed area in one track represents a bit. It is basically immaterial whether a bit-representing area results from printing or punching; however, the embodiment as described in detail below is designed to read tapes printed by an apparatus as set forth in copending application Ser. No. 133,122 filed Aug. 22, 1961.

It is significant for the present invention that each character has altogether an even number of bit-representing areas, i.e., each character has either two or four or six printed areas or bits and the characters are further distinguished from each other by the particular places, i.e., the tracks containing a printed area or that are empty. The characters thus defined are organized on the tape into words of, for example, 38 characters each, and the words are separated from each other along the tape by a blank space representing approximately 20 characters.

One significant aspect of the data converter presently described is to be seen in that a word as comprised of a plurality of characters includes instruction characters as well as data characters, whereby data and instructions are stored on the tape for serial read-out. At the beginning and at the end of each word special codes are being printed as instruction characters. There is a start-stop code defined by a printed area in track $x$ and a printed area in track $a$. This code could also be written as L000L0—character code. The other end of a word is limited by a stop-start code having printed areas in tracks $a$, $b$, $c$ and $x$.

FIGURE 2 further shows that decimal numbers 0 through 9 are encoded in the tracks $a$, $b$, $c$ and $d$ according to a pattern following binary representation of such decimal numbers. Additionally some of these decimal numbers are encoded by a printed area bit in track $p$. The purpose thereof is to establish always even numbers of bits per character. The purpose of employing only even numbers of bits per character is to eliminate errors. It has been found that in an otherwise proper and undamaged tape errors occur in that either one bit is missing or is so weakly printed that it will not register, or a dirt spot or the like simulates the existence of an additional bit. In either case the number of bits per character will appear to be an odd number; this fact is being used in the system of the present invention for purposes of word error correction. In particular, an odd number of bits in a character will in the following be described as a parity error.

Errors on a tape simulating the existence of two additional bits or the lack of two additional bits are practically nil. Furthermore, such situations of missing or adding two additional bits usually will occur only if the tape and the record, in general, are excessively faulty. For example, the tape may be torn or damaged to such an extent that at least a portion of this tape will not be used at all and has to be replaced, etc. In other words, errors other than parity errors in the number of bits per character will usually not enable an uninterrupted readout and encoding but will require re-recording. The detection of a parity error, however, occurs when most of the tape is quite usable, so that a correction of a parity error will only slightly slow down the continuous readout and evaluation of the tape. Practically uninterrupted readout of the tape containing a large number of words is thus made possible, even though minor errors—parity errors—might occur.

Tape 10 as shown in FIGURE 2 has also a special code character called error code, or word-skip instruction. This error code is defined here by one bar printed across all six tracks, i.e., it is assigned to the character defined by six bits. It will be observed that no other character has these six bits.

The purpose of employing this error code or word-skip instruction is the following: Assuming that during the recording procedure the person recording characters and words on the tape makes a mistake. He then proceeds as follows: After realizing that he made an error, he starts to write on the tape a new word which contains the start-stop code as usual, the error code, then a number of meaningless data selected at random, and the stop-start code to complete the word. The specific place of the error code within a word is not critical. This word serves to inform the data converter to be described below that the word previously recorded contains an error. Since the words are being read from the tape into the data converter in an inverted order, the word that contained the error code is in fact being read-out first. As will be described more fully below, during tape readout the inventive data converter responds to this error-code or word-skip instruction to carry out a subroutine program which erases from the buffer memory the word containing the error-code and will block the next following word, which in fact contains the error, from being evaluated.

In the block diagram shown in FIGURE 1 the photoelectric tape reading device scanning the tape 10 is designated with reference numeral 100. The tape reading device contains the photoelectric reading and detecting means to be described more fully below (FIG. 8). The photoelectric tape reader is positioned to concurrently or parallelly read all bits of each character, and to read serially the characters on the tape at a rate determined by the transportation speed of the tape 10. Since the embodiment presently described operates with six tracks, there are accordingly six photoelectric readout means or readers feeding six bit-transmitter channels designated in general with reference numeral 200. The outputs furnished by the six photoelectric reading elements in the tape reading device 100 are fed to an input register 150 holding the bits for a period of time determined by further evaluation procedures.

A bit-detector gate 180 is connected to channels 200 ahead of register 150 to furnish a main sprocket pulse. It is a significant feature of the present invention that the tape readout process and the process of storing the read-out bits and characters is synchronized solely by the tape transport and the readout speed itself. Since each character is represented by at least two bits, the detection of any bit serves to trigger the main sprocket detector 180 for furnishing the main sprocket synchronization pulse.

A correcting device 120, including bit-selecting and setting switches as shown in detail in FIGURE 8, serves to manually adjust, correct or select the content of the input register 150.

The output signals furnished by input register 150 are fed again through six channels 200 to the buffer 600 serving as temporary memory and explained more fully below with reference to FIGURE 13.

Four instruction code detectors are connected to the output circuit of input register 150. There is a detector 220 to furnish a pulse as soon as the start-stop code appears in the input register. There is a detector 240 furnishing an output as soon as a stop-start code is in the input register. There is a detector 280 furnishing an output whenever the error code is in the input register, and there is a parity-error detector 250 furnishing an output as soon as there is an odd number of bits in the input register 150. The four detectors comprise an instruction decoder that is illustrated in detail in FIGURE 9.

The output signals of these four detectors or instruction decoders 220, 240, 250 and 280 are fed to a switching and decision-making unit 400 and illustrated in detail in FIGURES 10 and 11.

The switching and decision-making unit 400 controls the data readout program routine and subroutine, in general. Among its principal functions is its control of a tape drive control device 350 which is a part of this decision-making unit and shown in detail in FIGURE 10. The tape drive control 350 starts and stops the data storage tape in specific response to code signals received from the detectors 220, 240, 250 and 280. The switching and decision-making unit 400 as a whole decides when the tape is to be transported, when it is to be stopped and which program steps are carried out while the tape starts or stops. As will be developed more fully below, during normal operation the switching and decision-making unit 400 decides that tape is to be transported after the start-stop code is being detected by detector 220. The tape is to be stopped when a stop-start code is being detected by detector 240. The tape is also to be stopped if a parity error is being detected by detector 250 so that a correction is being made possible through the use of correcting device 120; with the aid of unit 120 one can reset and correct the then odd number of bits in the input register 150.

These special code detector outputs furthermore govern the buffer program and the unit 400 includes decision-making elements that control the memory read-out and write-in for normal program routines in that first a word is being written into the buffer and then the same word is written out again.

The switching and decision-making unit 400 additionally decides when and how a subroutine program is to be carried out as soon as the error code is detected by detector 280. The subroutine then carried out will be explained more fully below with reference to word error detection and correction thereof. The switching and decision-making unit 400 is additionally prepared or operated by the manual setting device 300. The operator of the data converter sets the manual setting device 300 in accordance with the routine to be carried out. In particular he is able to determine whether the entire data-converting device is to operate in the automatic mode, or whether the tape readout process is to be carried out manually, i.e., if for the readout of each character a new manual actuation is necessary.

Additionally, the operator can initiate a manual erasing and clearing routine so as to empty the memory from any bit stored therein. Finally, the manual setting device responds to the starting signal furnished by the operator. During the automatic mode, this starting signal starts a cyclically-repeated memory write-in and read-out routine; during the manual mode, individual characters can be written into or read out of the memory.

It is a significant feature of the present invention that the data converter presently described is being clocked in a three-fold manner. During a normal tape read-out and memory write-in routine the clocking occurs through the signal furnished by the main sprocket detector 180 as long as data are being read out. No sync track is required or even used for the tape. After a word has been read out from the tape and the stop-start code instruction character has been received, the tape 10 is being stopped. At this point the addresses of memory 600 contain all the characters (data and instruction) pertaining to the word which just has been read out, one character in one address.

Next, the memory 600 is being emptied into an output register 750 and a decoder 700 (FIGURES 14 and 15) for use in an evaluating device 800.

The evaluation, for example, card punching, is carried out in accordance with the sequence determined by its own and inherent operational speed. Thus, during memory read-out and data evaluation, for example, by punching cards, the data converter of the present invention is being clocked by signals derived from the evaluation device 800 and these signals will be called external synchronization signals.

The third mode of clocking occurs during erasing, i.e., during the process in which neither the tape is being read out nor data are being read from the memory and into the evaluation device, but data are being erased from the memory and from any of the registers.

Clocking during this third mode of operation is governed by an erase clock contained in a clock unit 550 which will be described more fully below with reference to FIGURE 12. It will be observed that the clock unit 550 either receives the main sprocket pulses from detector 180, or it may receive external sync signals from the external evaluation station 800 and in addition it receives gating signals from the control and switching unit 400 and from the manual setting unit 300.

The clock unit 550 has a single output line 551 receiving all of the clock pulses from gate 552 regardless of the specific source that furnishes such pulses in any instant.

Since the clock pulses are being used in the different stations of the data converter in different relative time and phase relationship, there is provided a clock pulse forming, gating and timing unit 500 furnishing clear pulses alpha ($\alpha$), memory clock pulses beta ($\beta$) and program clock and phasing pulses omega ($\omega$). The clock pulse forming, gating and timing unit 500 additionally receives signals from several detectors, the switching and decision-making unit 400, as well as from the manual setting unit 300 so as to determine which particular type of pulses are needed to carry out their respectively assigned routine or subroutine.

It is to be pointed out that the evaluating device proper does not constitute a part of the present invention. However, as already mentioned above, specific evaluation processes are of primary interest and it is thus important which types of interconnecting elements are necessary for cooperation between the data converter and an evaluation device.

For example, the evaluation device 800 may be a card punch with read-in device operating in such a way that each character which is being read out from buffer memory 600 after decoding is newly encoded and used to punch the card in accordance with a specific machine code used for the card punching, for example, the conventional Hollerith code.

As will be explained below with reference to FIGS. 14 and 15, the decoder has as many output terminals as there are different character codes, and during memory read-out a specific character is represented by but one output signal at a specific decoder output terminal. In order to adapt the inventive data converter to a specific evaluating device, an encoder 900 can be included translating the completely decoded output signals developed by unit 700 into the specific code with which such evaluating device operates. There may be a plugboard included to selectively connect the decoder 700 with the encoder 900. By suitable selection of encoder units, the inventive data converter can be adapted to all kinds of data processing devices regardless at what code they are operating. From the standpoint of manufacturing, a specific encoder 900 may be incorporated into the data converter so as to operate a specific data evaluating device without necessitating the interpositioning of a separate encoder unit.

As will be developed more fully below, particularly with reference to FIGURE 16, it is sufficient for the description of the present invention to show how the relevant data from the external evaluation device 800 are being derived and are being fed into the data converter of the present invention. Only a few such data are needed and their mode of production and development is only to a minor extent bound to specific evaluating devices.

The data converter as outlined above in general terms thus is capable of carrying out, among others, the following routines and subroutines:

It reads out data from the tape parallel by bit and serial by character and intermittently serial by word. During the reading of one word from the tape there is carried out a write-in routine to load the memory 600. Assuming no error has occurred during write-in, the tape has to be stopped first before the next routine can be carried out. Thereafter the memory 600 is being read-out serially and strictly in synchronism with the evaluation of the decoded and newly encoded data.

During automatic operation there is continuous alternation as between write-in and read-out of the memory 600, while the tape is being transported intermittently; during the stop period of the tape the data previously read from the tape are now decoded and evaluated in the unit 800. This routine continues until either an error occurs or until all of the tape has been used up.

If a word on the tape is in error, such situation is discovered by detecting an error code. Now a subroutine is carried out in that the word containing the error code is being erased from the memory. Additionally, the following word is being skipped over. The subroutine described below serves to skip two words so that two words as they are in fact recorded on the tape are not being evaluated. Other subroutines will be mentioned below. After completion of such subroutine, the normal read-out, write-in and evaluation routine is continued as programmed but at a different spot on the storage tape.

The next procedure which can be carried out with the aid of the inventive data converter is the correction of a character in input register 150 not having an even number of bits. The data converter is designed to stop the normal routine immediately upon occurrence of a parity error, i.e., the tape is being stopped and the write-in routine for the memory is being interrupted when there is an odd number of bits in the register 150. Thereafter, the operator can charge the input register with the correct bit combination, and particularly with the correct number of bits, whereupon the write-in routine is being continued to change automatically to memory read-out as aforedescribed.

Additionally, the manually-initiated master routine and master clear-out and erase routine can be carried out either automatically or manually, address by address.

*Symbols*

Before describing in detail the several units illustrated by blocks in FIGURE 1, the following signals and symbols shall be defined. In general, Greek letters are being used only to describe periodically recurring pulses furnished as clock pulses or at clock pulse rate.

The output signal furnished by the main sprocket detector 180 is a normally negative clock pulse appearing whenever any character is being sensed by the tape reading device 100 and the main sprocket pulse is designated by the reference character gamma ($\gamma$).

Clock pulses derived from the external evaluating device 800 at the rate of data evaluation therein are called delta (δ).

Internally provided clock pulses bear reference character epsilon (ε).

The clock pulse forming and timing unit 500 furnishes the above-mentioned clear pulses alpha (α) for periodically resetting the input and output registers of the memory. The same unit furnishes the memory clock pulses beta (β) for clocking the memory 600 during all program routines and subroutines. And finally the same unit 500 furnishes program clock and phasing pulses omega (ω), which have been mentioned above for synchronizing the tape drive control to the alternation of memory write-in and read-out.

The output pulse of the start-stop code detector 220 is a negative pulse, —SC, occuring whenever the start-stop code is in the input register 150. The start-stop code signal is also used only as a negative pulse.

The stop-start code detector 240 furnishes a negative output pulse, —TC, when the stop-start instruction character is in the input register. The signal is being used also as a positive pulse, +TC. As will be developed more fully below, the same character when in the output register 750 is used to develop a pulse +TC2.

The output furnished by the word error detector 280 whenever the error code is in the input register is designated with character —EC. It is always a negative pulse or signal.

The parity error detector furnishes only a part of a signal designated by reference character +PC. An associated parity error switch (infra) furnishes parity error signals ±P.

The reason for this double nomination—start-stop and stop-start—is to be seen in the fact that either code can be used to start the tape while the respective other code stops the tape, so that a tape can be read in the same direction as it was recorded, or opposite thereto. The embodiment illustrated is wired so that the signal —SC in fact operates as tape start pulse, while signal —TC operates as tape stop pulse and in the following these simpler designations shall be used with the understanding of possible reversion of function.

The switching and decision-making unit 400 will furnish the following signals: an error signal E, either as a positive or negative signal, which signal will be developed when a word error is being detected.

The same unit 400 furthermore furnishes a write signal W, which is a positive signal developed whenever and as long as the writing-in or loading routine of the memory 600 is to be carried out. A complementary signal $\overline{W}$ is developed as long as there is no write-in period. Both signals are positive voltage blocks and they are mutually exclusive, i.e., when W is true, $\overline{W}$ is not true, and vice versa.

The write signal is supplemented by a write command pulse WC. This signal is actually identical with the write signal W but it is distinguished to indicate that the write command signal is furnished specifically for gating the buffer memory 600 and its input control circuit.

A read signal D is developed by the control unit 400, to cover the period of time during which the memory 600 is being read-out. There is a complementary signal $\overline{D}$ which is also a positive signal and which is developed as long as no read-out of the memory 600 occurs. There is a supplementary signal which is called read command signal DC designed specifically to govern the memory output circuit during read-out, but this signal DC is slightly delayed relative to the read signal D.

The switching and decision-making unit 400 additionally develops an erase signal B which is a positive signal to govern the subroutine of erasing the memory content without concurrent data evaluation. There is a complementary signal $\overline{B}$ which is a positive signal as long as no such erasing is carried out. From the leading edge of signal B a differential pulse B′ is derived to trigger an erase clock multivibrator (infra). A reset command signal or pulse RC is developed by unit 400 every time the memory is to return to run through another cycle of calling on the addresses successively, beginning with a particular one.

The manual setting device 300 furnishes the signal A, which is a positive signal, as long as the data converter is being set to run in the automatic mode. There is a complementary signal called M but which could also be called $\overline{A}$, which is a positive signal as long as the data converter is to be run in the manual mode.

The manual setting unit 300 further develops a start pulse S which is a positive pulse developed as soon as the operator has given the command that the data converter is to start. The start pulse is of relatively short duration and stands only for a limited period of time.

The manual setting unit 300 further is capable of developing a reset signal —R which is a negative signal to initiate the master clear and erase operation, to be described more fully below. Only during the manual mode, the negative reset signal —R is immediately succeeded by a short, negative reset pulse —RP being of short duration to initiate a subsequent routine to be more fully developed below.

From the memory device a pulse ME is developed which is a positive pulse of short duration developed as soon as the erasing of the memory has been completed.

The correcting device 120 develops a select signal SE developed as soon as the correction of the input register has been completed. This signal is being developed manually and at a positive level.

*Components*

For illustration of details of the inventive data converter, several block symbols have been used which will now be explained with reference to FIGURES 3a through 7b.

The principal element employed is a "nor" gate which may be transistorized as is shown in FIGURE 3a. In general, it includes a PNP transistor 30 with grounded emitter. The base electrode is resistively connected through a biasing resistor 31 to a positive source of voltage potential of, for example, about +12 volts. The collector electrode of transistor 30 is connected through a resistor 32 to a source of negative voltage potential of, for example, —12 volts. The output signal of this "nor" gate is developed at the collector electrode, there being an output terminal 33.

The "nor" gate shown in FIGURE 3a is illustrated as a three-signal input device, and there are provided three resistors 34, 35 and 36 having a common terminal connected to the base electrode of transistor 30. The respective other terminals of each of the resistors 34, 35 and 36 serve as signal input terminals.

The operation of this "nor" gate will be understood best from the FIGURES 3b and 3c. As long as all resistors 34, 35 and 36 receive positive pulses or signals of about equal magnitude but with each signal having any desired duration, a negative output voltage is developed at terminal 33. Thus, this "nor" gate operates as a combined "and" gate and inverter, producing a negative output upon coincidence of positive signals at all of its input terminals.

As long as one or more of the three resistors 34, 35 and 36 receive negative signals such as indicated in FIGURE 3c, the output terminal 33 has a positive potential. This situation includes the development of negative inputs at all input terminals. Thus, this "nor" gate operates as an "or" gate with inverter, permitting passage of any negative signal or positive signal, but once there is one negative signal present at one input terminal, further negative signals at other input terminals cause no effect. It is significant that in the network to be described more fully below many of the "nor" gates are at times used as "and" gates and during different phases of operation the same gates may serve as "or" gates.

FIGURE 3*d* illustrates a special situation of the "nor" gate shown in FIGURE 3*a*. The transistor 30 has its base electrode controlled by but a single input furnished through resistor 34. As soon as, for example, a positive signal appears across resistor 34 the collector of transistor 30 goes negative, thus furnishing a negative signal at output terminal 33. Accordingly, FIGURE 3*d* illustrates that a single input "nor" gate operates as an inverter. FIGURE 3*e* illustrates the symbol used for this specific situation.

Two such "nor" gates, as illustrated in FIGURE 3*a* et seq. with one, two or more inputs each can be interconnected in the manner shown in FIGURES 4*a* and 4*b* to establish a flip-flop. Throughout the invention "nor" flip-flops are being used. This is convenient but not mandatory. As can be seen from FIGURES 4*a* and 4*b*, such a "nor" gate type flip-flop has a set "nor" gate 41 and a reset "nor" gate 42. In either case, a "nor" gate flip-flop will respond to a negative triggering signal provided positive potentials were previously established at all of the inputs of that one "nor" gate. Thus, in order to set the flip-flope, input terminal 43 of "nor" gate 41 must be positive, and the flip-flop must have been reset previously so that the output of "nor" circuit 42 supplies a positive input to the second input terminal 44 of "nor" circuit 43. The setting side thus must have only positive inputs to operate as an "and" gate as shown in FIGURE 3*b*. A negative setting pulse at terminal 43 then operates this particular "nor" gate 41 as an "or" gate, thereby triggering the flip-flop. The signal $\theta$ developed at the output side of "nor" gate 41 will be positive. The other "nor" gate, 42, has only positive inputs so that its output is then negative ($-\theta$). Conversely, a resetting pulse applied as a triggering pulse to "nor" gate 42 passes as an inverted "or" signal, and now a positive signal $\bar{\theta}$ is developed at the output terminal of "nor" gate 42.

At this point it should be mentioned that throughout the data converter presently described, a specific signal may be used as positive and as negative signal levels so that, for example, information $\theta$ and $-\theta$ are concurrently true, even though one of them is developed from the other through an inverter. Such signals will not be regarded as complements but as information that has to have a particular signal level by virtue of its employment. For example, a positive $\theta$ may be used at a coincidence gate while concurrently the negative signal $-\theta$ is used to pass as trigger signals, such as shown in FIGURE 3*c* (upper input). Complementary signals, $\bar{\theta}$ and $-\bar{\theta}$, are thus being used also at positive and negative signal levels. Accordingly, implement and complement are employed at similar as well as at opposite polarity. However, the complement will be identified by a character only if used to initiate a specific function rather than merely inhibiting the function controlled by the implement.

Figure 5B:
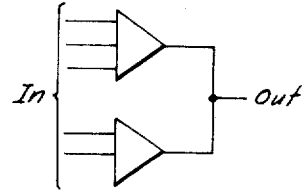
Figure 5C:
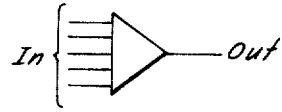

FIGURES 5*a*, 5*b* and 5*c* illustrate how an input "nor" gate can be wired for operating with input terminals in excess of three. Usually it is not advisable to drive a single transistor with more than three different inputs. However, there is no basic difference in logic function, and the block symbols shown in FIGURES 5*b* and 5*c* are used interchangeably when more than three inputs are being used. In either case, the circuit proper includes two transistors 51 and 52 having respectively interconnected emitter and collector electrodes and offering, for example, five input terminals at their base electrodes.

FIGURE 6*a* illustrates how two "nor" gates, one with a single input and one with a double input, can be interconnected with the aid of an additional biasing resistor as well as with the aid of a capacitor to furnish a monovibrator or a single-shot multivibrator. This network has a single input and a single output whereby the capacitor and the resistor determine the recovery time of this particular circuit. Usually this monovibrator or single-shot multivibrator does not serve as an inverter. In other words, the monovibrator is, for example, triggered by a negative pulse applied to one "nor" gate and a negative output stays on at the output side of the other "nor" gate for the duration as determined by the recovery time which in turn is determined by the RC network coupling the two "nor" gates together. Either one of the "nor" gates may be provided additionally with one or more gating terminals for blocking at times a response of the monovibrator.

FIGURES 7*a* and 7*b* illustrate that occasionally a gain increase is desired so that an amplifier has to be inserted in some of the command lines. For reasons of simplification, a very simple emitter-follower circuit is being used comprising a transistor 70 with a collector resistor 71 connected to a source of negative potential and a resistor 72 connecting the emitter to the source of positive voltage potential. In either case, a voltage of about ±12 volts can be used. The input signals are applied either directly or resistively to the base electrode of transistor 71. The emitter furnishes the output signal with increased current gain. In this case the input signal is not being inverted.

*Tape reading and input register*

In the following and particularly with reference to FIGURE 8, the photoelectric tape read-out process and system and the loading of the input register 150 are to be described. Additionally, it will be described how the main sprocket pulses gamma are being developed as well as how the bit content in the input register 150 can be corrected.

There are provided six photocells or photoelements 101, 102, 103, 104, 105 and 106 mounted in a common tape-reading head which may include a light source (not shown). These photocells, including pre-photocell optical means (lenses, etc.), are positioned to respectively scan tracks *a, b, c, d, x*, and *p* on the tape 10. The photocells 101 to 106 are arranged transversely to the direction of the tape movement (see arrow) so that bits pertaining to one character are being read-out concurrently, i.e., in parallel.

The six photocells 101 through 106 feed suitable amplifiers 111, 112, 113, 114, 115 and 116, respectively. One side of each such amplifier may be grounded while the respective other output line of each such amplifier connects to the set side of flip-flops pertaining to the input register 150. The input register has six register flip-flops 151, 152, 153, 154, 155 and 156. Flip-flop 151 has on its set side a "nor" gate 161 while the reset side is a "nor" gate 171. Accordingly, flip-flop 152 has "nor" gates 162 and 172; flip-flop 153 has "nor" gates 163 and 173; flip-flop 154 has "nor" gates 164 and 174; flip-flop 155 has "nor" gates 165 and 175; flip-flop 156 is finally composed of a "nor" gate 166 and of a "nor" gate 176. One input terminal of each of set-side "nor" gates 161 through 166 is connected to the output of amplifiers 111 through 116, respectively.

Another input terminal of each of the set-side "nor" gates 161 through 166 is connected to one terminal each of a multi-position bit-select and set switch 121 having a wiper arm 123 selectively connectible through a set-reset switch 124 to a source 127 of negative voltage potential. The wiper arm 123 of bit-select and set switch 121 can thus connect this negative voltage potential to either one of the second input terminals of "nor" gates 161 through 166. The setting of the select switch 121 permits the simulation of the occurrence of a bit in each of the register flip-flops. This select switch 121 is being used for correcting the input of the register 150 in case a parity error has occurred and has been detected. In particular, this bit-select and set switch 121 is being used when the parity error is of such a nature that a bit is missing, i.e., if the character which was previously read-out actually should have had one additional bit.

Actually, this bit-select and set switch 121 is an eight-position switch, and there are two blind contacts on either end. Normally this particular switch is in an off position and wiper arm 123 engages one of the blind contacts. This particular situation is shown in the drawing in FIGURE 8.

The bit-correcting device presently described and bearing the general reference number 120 includes additionally a bit-select-reset switch 125 having also eight contacts selectively engageable by a wiper arm 126. The set-reset switch 124 may apply the negative potential to the wiper arm 126.

It can be seen from the drawing that the set-reset switch 124 can apply this negative potential to either the wiper arm 123 or to the wiper arm 126. Normally, set-reset switch 124 engages a blind contact 122.

The six operating contacts of bit-select-reset switch 125 are respectively connected to second input terminals of the reset-side "nor" gates 171 through 176 of the input register flip-flops. When set-reset switch 124 is connected to apply the negative voltage potential of source 127 to the wiper arm 126, provided suitable register selection has been made previously by the wiper arm 126, any flip-flop unduly activated to produce a parity error can now be reset. This situation will arise when a parity error is being detected, and when it is found that in fact there is one bit too many in the input register.

After finding out which particular bit is improperly present, and since arms 123 and 126 are ganged, their adjustment selects a particular flip-flop of register 150 and actuation of switch 124 causes such flip-flop to be set or reset. Cooperation of the set-reset switch 124 with either wiper arm 123 or 126 permits selective adding or erasing of a bit to or from the input register to restore the proper code and proper combination of the register output for the character which was being read-out just prior to the parity error detection.

The parity error detection, as will be described more fully below, results in an immediate stopping of the readout process, and particularly the tape 10 is being stopped, so that the manual activation and operation of the three switches 121, 125 and 124, if necessary, can be carried out whereafter the read-out process can be resumed.

Operation of this manual bit-setting and correcting device 120 is as follows: As soon as a parity error is indicated, i.e., as soon as the tape has been stopped due to the occurrence of a parity error, the operator looks at the tape to detect the cause of the parity error. Most commonly, he will see that a bit was not printed very well so that the photocell scanning the particular track missed it; or the operator finds a dirt spot on the tape that caused a photocell to respond. It can be seen that employment of a data storage tape having visible bits is a great advantage in the rapid detection of errors.

After finding the cause of the parity error, the operator shifts the ganged wiper arms 123 and 126 to a position which corresponds to one particular flip-flop. At that point the set-reset switch 124 is still in the normal or neutral position engaging the blind contact 122. After having determined whether there is a bit too many or that a bit is missing, the switch 124 is being applied selectively to either the wiper arm 123 or the wiper arm 126, so that either a bit is being added to or a bit is being erased from a preselected flip-flop of the input register.

The read-out process is being resumed by first setting wiper arm 126 to engage contact 128 of switch 125. Contact 128 connects to the input side of an inverter 129. As soon as the set-reset switch has been reset to connect the negative potential of source 127 to arm 126, a negative signal is applied to the input side of inverter 129. Thereupon the inverter produces the above-mentioned positive select command signal SE. The purpose of this signal will be described more fully below.

The input register 150 can be reset by the above-defined clear pulse alpha. For this purpose the reset terminals of the "nor" gates 171 through 176 are interconnected to receive clear pulses alpha. It will be determined more fully below that the clear pulse alpha is being developed always immediately preceding the new loading of the input register.

Proceeding now to the description of the main sprocket detector 180, this network consists of a simple "or" gate having six input terminals respectively connected to the six amplifiers 111 through 116. The "or" gate is comprised of six diodes 181 through 186 having their cathodes connected to the amplifiers 111 through 116, respectively. The anodes of these diodes 181 through 186 are interconnected, and they connect through resistor 187 to a source of positive voltage potential. The joined anodes of these diodes serve as output terminals from which the main sprocket pulse gamma is being drawn. Each time at least one bit-area is detected by any of the photoelectric detectors 101 through 106, a pulse gamma is produced and maintained for as long as a bit remains in the range of any of the photoelectric detectors.

The input register 150 has altogether twelve output lines 200. They are designated in a manner permitting recognition of the tracks with which they are associated. Additionally these twelve output lines appear in pairs with a pair of lines always passing complementary signals. Thus the output lines 200a, 200b, 200c, 200d, 200x and 200p each pass a positive pulse or maintain positive signal potential after a bit in track $a$, $b$, $c$, $d$, $x$ or $p$, respectively, has been read out, and as long as no clear pulse alpha did reset all of the flip-flops in register 150. Correspondingly, the lines $200\bar{a}$, $200\bar{b}$, $200\bar{c}$, $200\bar{d}$, $200\bar{x}$ and $200\bar{p}$ have positive signal potential as long as no bit has been read out from the tracks $a$, $b$, $c$, $d$, $x$, $p$, respectively. Also, these six lines $200\bar{a}$ through $200\bar{p}$ maintain a positive signal level after occurrence of a clearing pulse alpha in input register 150 if no new bit is being read out.

It thus will be appreciated that the twelve lines which are the output of the input register 150 during operation are always kept in pairs at opposite potentials so that there are always six lines having similar potential. This fact is being used for decoding selected control characters (instruction code characters) as well as for the detection of a parity error. We thus proceed now to FIGURE 9 which in fact is a righthand continuation of FIGURE 8.

In FIGURE 9 there are illustrated four special signal detectors connected to operate as instruction decoders. There is a start-stop code (or just start code) detector 220; there is a stop-start code (or just start code) detector 240; there is an error code detector 280, and a parity error detector 250.

The start code detector 220 is primarily comprised of a seven-line input "and" gate. It includes two "nor" gates 221 and 222 of the type illustrated in FIGURE 3a and interconnected as shown in FIGURE 5a. The two "nor" gates have a common biasing collector resistor and interconnected collector electrodes to furnish a common output signal, thus establishing in fact a six-input "nor" gate. The six input lines are connected respectively to signal channels $200\bar{a}$, $200\bar{b}$, $200\bar{c}$, $200\bar{d}$, $200\bar{x}$ and $200\bar{p}$. As can be seen, that coincidence will occur at the L00OL0 code.

There is a third "nor" gate 223 having but one input so that it could be regarded also as an inverter. However, in the present case it is used to furnish a seventh input for this particular seven-input "nor" gate. Thus, the collector electrode of "nor" gate 223 is connected to the interconnected collector electrodes of the "nor" gates 221 and 222 and, additionally, this "nor" gate 223 has the same biasing resistor in the collector circuit as have "nor" gates 221 and 222.

The input terminal of this "nor" gate 223 is connected to receive the clear pulse alpha. The production of this clearing signal alpha will be described in detail with reference to FIGURE 12.

Coincidence of the six input terminals of "nor" gates 221 and 222 is established by concurrent appearance of positive bit-pulses in lines $200\bar{a}$, $200\bar{b}$, etc. Clearing pulse alpha is a negative pulse. Thus, pulse alpha, when applied to "nor" circuit 223, serves to block this detector 220 during the register clearing period. This is to prevent any accidental response of detector 220 during resetting. Upon register resetting, not all flip-flops 151 through 156 might respond in precise synchronism, so that accidentally and for a short period a positive signal coincidence might occur in lines $200\overline{a}$, $200\overline{b}$, $200\overline{c}$, $200\overline{d}$, $200\overline{x}$ and $200\overline{p}$. The clear pulse alpha is of sufficient duration that after its decay every flip-flop is in fact reset, and detector 220 will respond only if, immediately after clearing, the start code loads the input register.

The output of the "nor" gate of detector 220 is applied to a terminal 224. A negative signal —SC as representative of the start code instruction character will appear at terminal 224 after resetting and as long as the start code is in the input register 150. Thus, one can write $$-SC = a \cdot \overline{b} \cdot \overline{c} \cdot \overline{d} \cdot x \cdot \overline{p} \cdot \alpha$$

Proceeding now to the description of the stop code detector 240, there are provided two "nor" gates 241 and 242 forming also a six-input coincidence gate. The stop code detector has its six input terminals respectively connected to signal channels 200a, 200b, 200c, $200\overline{d}$, 200x and $200\overline{p}$.

The stop code detector 240 has also seven inputs and the seventh input is fed to the "nor" gate 243 supplementing the "nor" gates 241 and 242 to establish a seven-input "nor" gate 244. The input of "nor" gate 243 is furnished by a clock pulse omega, which is also produced in the device illustrated in FIGURE 12. The clock pulse omega clocks and phases changeover from memory write-in and read-out. Thus, the output of the stop code detector is clocked to become effective in strict phase relationship to all other signals phased by this clock pulse omega.

Accordingly, these three "nor" gates 241, 242 and 243 are capable of furnishing an output signal whenever the tape tracks furnish the following signal to verify the following equation:

$$-TC = a \cdot b \cdot c \cdot \overline{d} \cdot x \cdot \overline{p} \cdot \omega$$

If one looks at FIGURE 2, one can see that the stop code signal at the end of a word illustrated in FIGURE 2 is capable of verifying this equation.

The output of the stop code detector 240 is furnished to a terminal 244 from which these will be drawn the negative signal designated by —TC and described above. The signal —TC is used either directly or as a positive signal. Accordingly, terminal 244 is connected to an inverter stage 245, and the output thereof furnishes a signal +TC which is a positive stop code signal.

The signals —TC and +TC are both being produced whenever the stop code is in the input register and provided that a clock pulse omega has occurred during the storage situation. Although one of these signals is being derived from the other through signal inversion, the two signals cannot be regarded as being the complement of each other because both signals are being employed whenever the stop code is true and in the input register. The complementary of each signal is being used separately, i.e., "stop signal not in register" is identified by a $+\overline{TC}$ and a $-\overline{TC}$ signal. Accordingly, the equation $$+\overline{TC} = -TC$$

or the equation $-TC + \overline{TC}$ is not true as far as signal is concerned, even though the voltage levels may be of such a nature. In other words, only the two signals +TC and —TC are concurrently true. The complementary signals $+\overline{TC}$ and $-\overline{TC}$ are also concurrently true.

The error code or word-skip instruction character detector 280 is a six-input "nor" gate connected so as to furnish the error code signal —EC whenever a bit is detected by all photoelectric receivers scanning the six tracks. Accordingly, the six inputs of the error detector 280 are connected to signal channels 200a, 200b, 200c, 200d, 200x and 200p. That this is correct can be seen from FIGURE 2 since the error code is defined by a contrast area or bit in each of the six tracks. The output signal —EC is strictly a six-input coincidence signal and does not require any clocking.

Proceeding now to the description of the parity error detector 250, there are provided two "odd-even" gating circuits 257 and 267. Each of these "odd-even" gates is established by two sets of cascaded "nor" gates of the character described. Each of these "odd-even" gates 257 and 267 is connected to monitor the outputs of three channels each, comprising the detectors scanning tracks a, b and c and the detectors scanning tracks d, x and p, respectively.

The "odd-even" circuit network 257 is comprised of the "nor" gates 251, 252, 253 and 254 each having three input terminals connected to realize the following logic relations.

"Nor" gate 251 will produce a negative coincidence output when the following relation is true: $a \cdot b \cdot c$. The "nor" gate 252 is connected to the channels 200 to produce a negative output whenever the relation $a \cdot \overline{b} \cdot \overline{c}$ is true. The "nor" gate 253 is connected to the channels 200 whenever the relation $\overline{a} \cdot b \cdot \overline{c}$ is true. The "nor" gate 254 is connected to the channels 200 whenever the relation $\overline{a} \cdot \overline{b} \cdot c$ is true. The two "nor" gates 255 and 256 are connected to the outputs of "nor" gates 252, 253, and 251 and 254, respectively. The "nor" gates 255 and 256 have their outputs interconnected, thus establishing the output terminal of this "odd-even" gate 257.

It will be realized that as long as any one of the above relations is true, the "odd-even" gate 257 will furnish a positive output. Only if none of these relations is true, all inputs of the "nor" gates 255 and 256 are positive signals, and only then the "odd-even" gate 257 furnishes a negative output as indication of the following. "Odd-even" gate 257 will furnish a positive output signal as long as at least one (or even all) of the four above-mentioned relations is true. It is readily understood that neither one of these four relations is true if the relation $\overline{a} \cdot \overline{b} \cdot \overline{c}$ is true, or if the relation $a \cdot b \cdot \overline{c}$ is true, or if the relation $a \cdot \overline{b} \cdot c$ is true, or if the relation $\overline{a} \cdot b \cdot c$ is true. In either one of these latter four situations the "odd-even" gate 257 will produce a negative output. This means that "odd-even" gate 257 will produce a negative output pulse as long as tracks a, b, c, contain none or two bits. Thus, a negative output of "odd-even" gate 257 is an indication that the number of bits in the three tracks a, b and c is an even number. "Odd-even" gate 257 will produce a positive output if the tracks a, b and c together contain one or three bits, i.e., if the tracks a, b and c contain an odd number of bits.

The "odd-even" gate 267 is comprised of "nor" gates 261, 262, 263, 264 interconnected to channels representing the content of tracks b, x and p in a manner which is analogous to the monitoring of the content of tracks a, b and c. The "odd-even" gate 267 is completed by the two "nor" gates 265 and 266. Accordingly, the "odd-even" gate 267 produces a negative output when the tracks x, d and p have an even number of bits, whereas the output of "odd-even" gate 267 is positive if the three tracks d, x and p have an odd number of bits.

It will be appreciated that a parity error exists only if the number of bits in the tracks a, b and c is odd and the number of bits in the tracks x, p and d is even, or vice versa. In either case one of the gates 257 or 267 furnishes a positive output, while the other one furnishes a negative output. If the number of bits in the tracks a, b and c is even, and if the number of bits in the tracks d, x and p is even, no parity error exists, and both gates 257 and 267 furnish negative outputs. Also, if the number of bits in tracks a, b and c is odd and if the number of bits in the tracks $d$, $x$ and $p$ is odd, no parity error exists because, of course, the addition of two odd numbers produces an even number. In this situation both gates 257 and 267 furnish positive outputs.

In terms of producing a suitable electrical output it is, therefore, necessary to simply monitor whether or not the output signals furnished by the "odd-even" gates 257 and 267 have equal polarity or are of opposite sign. In case they are of opposite sign there is a parity error, and in case they are of equal sign no parity error exists.

For detection of parity error situations the output of "odd-even" gate 257 is fed first directly to an inverter stage 258, and additionally the output of gate 257 is fed to one input terminal of a three-input "nor" gate 269. The output of inverter 258 is fed to one input terminal of a "nor" gate 259. The output signal furnished by "odd-even" gate 267 is applied directly to a second input terminal of "nor" gate 259, whereas it is additionally fed to an inverter 268, the output of which feeds a second input terminal of "nor" gate 269.

Each of the "nor" gates 259 and 269 additionally receives a signal $+W$ which is used here as a positive gating-open signal. As will be developed more fully below, and particularly with reference to the description of FIGURE 11, the signal W as defined above is a "writing" signal developed during the write-in period for the memory. Detection of a parity error is of interest only during the write-in period. Since signal W is a positive pulse, either one of the "nor" gates 259 or 269 will operate as an "and" circuit only as long as one of its input terminals receives only positive pulses.

As also will be developed below, the signal W is not produced when tape portions in between succeeding words pass under the photoelectric receivers 101 through 106. Such tape portion is to pass as rapidly as possible, but a dust speck might be picked up as a single (i.e., odd-numbered bit). No stopping of the tape transport is desired for such situation. Thus, the utilization of the $+W$ signal for gating the parity error detector disenables same as long as no word is being read out of the tape.

"Nor" gate 259 will receive three positive input pulses only if the output of "odd-even" gate 257 is negative and the output of "odd-even" gate 267 is positive. Conversely, the "nor" gate 269 will receive three positive coincidence pulses only if the output of "odd-even" gate 257 is positive and the output of "odd-even" gate 267 is negative. In either one of these cases the output of "nor" circuits 259 and 269 will be of opposite polarity. The output signals of "nor" gates 259 and 269 are of opposite polarity only in case of the existence of parity error. This is being monitored by "nor" circuit 260 having its two input terminals connected to the output sides of "nor" circuits 259 and 269. Disparity of the input signals for "nor" gate 260 results in a negative output produced if there is a parity error during the tape read-out and memory write-in period. This signal was introduced above as $+PC$, parity error code.

It shall be assumed that the output signals of both "odd-even" circuits 257 and 267 are negative; then both the "nor" circuits 259 and 269 will furnish positive output pulses, because at the input terminals of either of them there is at least one negative signal. In this case the output of tthe "nor" circuit 260 is negative since it results from two positive (i.e., similar) input signals at its two input terminals. Thus, a negative pulse or signal at the output of "nor" circuit 260 is an indication that no parity error is being detected.

The "odd-even" circuits 257 and 267 furnish positive pulses when the number of bits in tracks $a$, $b$ and $c$ is odd and the number of bits in tracks $d$, $x$ and $p$ is also odd, so that in total there is an even number of bits in the six tracks. Now the two "nor" gates 259 and 269 both receive at least one negative input pulse. Accordingly, the outputs of "nor" gates 259 and 269 are both positive and again the "nor" gate 260 will furnish a negative signal which is indicative of the fact that a parity error is not present.

It will be appreciated that if no signal is in the input register 150, there are positive bits in all of the channels $200\overline{a}$, $200\overline{b}$, $200\overline{c}$, $200\overline{d}$, $200\overline{x}$ and $200\overline{p}$. This, of course, is also indicative of an even number of bits then present, because within the system a zero is counted as an even number. Thus, for example, during register clearing the parity error detector furnishes a negative signal which stands for absence of a parity error.

The utilization of the $+PC$ signal will be described more fully below with reference to FIGURES 11 and 12.

*Manual setting*

Before proceeding to the description of the general controls and decision-making unit of FIGURE 11, the manual setting illustrated in FIGURE 10 shall be described.

The manual setting unit 300 is illustrated in the lower portion of FIGURE 10. The manual setting device 300 will, of course, first comprise a main power switch which has been omitted. Next, there is provided a switch 310 selectively applying positive (ground) potential or negative potential to a line or junction 311. The existence of a positive signal or ground potential at junction 311 is indicative of the manual mode, that is to say, a positive signal at terminal or line 311 symbolizes the $+M$ signal which biases this line for as long as the entire data converter is operated in the manual mode If the switch 310 connects the negative potential to terminal or line 311, the data converter is set to operate in the automatic mode. The signal indicating automatic mode is also employed as a positive signal. For this reason the output of the terminal 311 is being fed to an inverter 312 developing at its output side a positive signal which is the $+A$ signal indicating the automatic mode.

It should be mentioned that these two signals M and A are used strictly in a complementary fashion. That is to say, the relations $M=\overline{A}$ and $A=\overline{M}$ are both true. Since both signals A and M are only employed at positive levels, the logic relations correspond to the arithmetic ones. Accordingly, the apparatus will find itself always being set to operate in one mode or the other, i.e., the data converter is always prepared for either manual or automatic operation, and, as long as power is being applied, there is no possibility that the inventive data converter is not at any time prepared for either manual or for automatic operation.

The manual setting device next includes a start switch 320. The start switch 320 applies trigger (positive-ground) potential to a start flip-flop 321. Flip-flop 321 is comprised of two "nor" circuits 322 and 323. The output signal of the flip-flop 321 used is a negative pulse drawn from "nor" gate 323 and being fed to a monostable or a single-shot multivibrator 324. Thus, the single-shot multivibrator 324 is connected to the flip-flop 321 in a manner so that a voltage drop toward a negative output signal at the output side of "nor" gate 323 will trigger the single-shot multivibrator 324.

It appears that for triggering the single-shot multivibrator 324 two switching operations for switch 320 are required. At first, the switch 320 will be activated to trigger the reset side "nor" gate 323 whereby the single-shot multivibrator 324 receives a positive pulse that appears at the output side of "nor" gate 323. This positive signal does not trigger the monostable circuit 324. Only if the switch 320 is thereafter being returned to the illustrated position, the flip-flop 321 reverts to its original state and the reversion of this produces a negative swing at the output of gate 323 which operates as a triggering pulse for the single-shot multivibrator 324.

The pulse furnished by single-shot multivibrator 324 during its recovery is a negative pulse developed at terminal 325 and for a duration which is being determined by the recovery time of the single-shot multivibrator 324.

This negative output pulse is then fed to an inverter stage 326. The output pulse of inverter stage 326 is a positive start pulse +S (supra) of a duration determined also by the recovery time of the single-shot multivibrator 324.

The manual setting device 300 includes, furthermore, a master clear switch 330. The master clear switch 330 governs a master clear flip-flop 331 being comprised of "nor" gates 332 and 333. In the illustrated position of switch 330 the flip-flop 331 is in the reset state. Normally, the switch 330 applies ground (positive) potential to the input side of "nor" gate 332, so that the output of "nor" gate 332 is negative, thereby furnishing the input signal for the "nor" gate 333. The output of the latter is thus positive. Accordingly, the output line of "nor" gate 333 is normally kept at a positive potential so that the ordinarily negative reset —R is not true and is thus not being developed.

Upon depressing and switching the master clear switch 330, a relatively positive potential is applied to the input side of "nor" gate 333 so that the flip-flop 331 is being set. Concurrently, a negative signal —R which is the negative reset signal for the entire device is being developed. It is important that this —R signal occurs immediately upon actuating the switch 330. This signal —R is being maintained for as long as the master clear switch 330 is not actuated again. Utilization of —R will be described more fully with reference to FIGURE 11.

After a second actuation of switch 330, the flip-flop 331 is reset to its original state, thereby developing a negative trigger pulse at the output side of "nor" gate 332. This negative pulse triggers a single-shot multivibrator 334.

Single-shot multivibrator 334 can be triggered only if the device is set to operate in the manual mode. It can be seen that the terminal 311, i.e., the line furnishing the +M signal during the manual mode, operates to pass +M as a gating signal to the monostable multiivbrator 34. As long as the device is operating in the automatic mode the single-shot multivibrator 334 will not respond, and the negative trigger pulse furnished by the "nor" gate 332 will not be utilized in monovibrator 334. However, if the device is set to be operated in the manual mode then the single-shot multivibrator 334 will furnish a negative reset pulse —RP for a relative short duration as determined by the recovery time of the single-shot multivibrator 334. The pulse —RP will succeed the signal —R since the latter decays after a second actuation of switch 330. It will be described more fully below that this reset pulse —RP is being used to clear the buffer storage unit and to initiate the subroutine of emptying the buffer device. This will be described more fully below under the heading of master clear and erase operation.

It is thus apparent that the manual setting unit is capable of furnishing the following signals: There is, first, a positive signal +M developed whenever the data converter is to be operated in the manual mode. There is a complementary signal +A which is a positive signal as long as the data converter is to be operated in the automatic mode. There is being developed a short start pulse +S of a duration determined by the recovery time of the single-shot multivibrator 324, and this start pulse +S is being developed as soon as a write-in operation is to be started. In case the device operates in the automatic mode it will be shown below that this start pulse +S commences the read-out of the entire tape; if no error occurs, no further manual actuation is needed. The manual setting device 300, upon the depression of the switch 330, develops, first, the —R pulse which is to reset several of the decision-making units in the control and switching unit shown in FIGURE 11, and, finally, in case the device has been set to operate in the manual mode, —RP pulse of short duration is developed upon twice depressing the switch 330.

Having described the development of signals and pulses in the manual setting unit 300 and in the various instruction code detectors monitoring the channels 200, it will now be described how the switching and decision-making unit shown in FIGURE 11 and the upper part of FIGURE 10 uses these signals and pulses.

*Switching and decision-making unit*

The unit 400 (FIG. 1) is a decision-making network provided to determine whether or not a tape is to be transported for read-out and so that the memory write-in can be carried out. This unit 400 furthermore makes the decision as to whether or not the memory shall be read-out, and it furnishes externally usable signals for operating the data evaluator. The unit furthermore decides whether and how by way of a subroutine the content of the memory shall be erased without being evaluated. Finally, this unit is to decide whether or not it is necessary to correct the input register.

There is shown a number of switches furnishing switching signals upon the occurrence of two or more code or manual command or clocking signals.

There is first provided a write switch or write flip-flop 410 comprised of two "nor" gates 411 and 412. The "nor" gate 412 constitutes the set side of this flip-flop, and it receives a single pulse as a command signal for switching action, which signal is the —SC start code pulse developed when the start code is being detected by detector 220. This switching action of this negative pulse —SC results in the production of the positive write signal +W. Concurrently thereto, the output side of "nor" gate 411 of this flip-flop 410 produces a negative write signal, which is being used as an inhibiting signal when the complementary signal $\overline{W}$ is absent. "Nor" circuit 411 of the write flip-flop 410 develops the $\overline{W}$ signal whenever no writing is desired. The signal $\overline{W}$ is a truly complementary signal, and it is used at the same polarity as is the signal W. Signal $\overline{W}$ occurs when the W signal is not present.

The reset input side of "nor" gate 411 is governed by two signals. One is the —R signal, which is the negative reset signal drawn from the clear flip-flop 331 in FIGURE 10. The second input for this "nor" circuit 411 is furnished by the negative stop code signal —TC that is developed whenever the stop code instruction is in the register 150.

It is apparent that the signals —SC and —TC will never be developed at the same time. It is also apparent that the signal —TC is effective only if the —SC signal has been received previously to place the flip-flop 410 into a state in which write signal W is being developed.

During development of the +W signal, the input of "nor" gate 411 receives a positive signal from the output side of "nor" gate 412 and it receives a positive signal potential (—R not being true) as long as the master clear switch 330 is not being activated.

Thirdly, "nor" gate 411 receives a positive pulse for as long as the stop code is not being found in the input register.

These three positive signals at the input side of "nor" gate 411 ready the reset side of flip-flop 410 for reset action which might occur either by a reset signal —R or by a stop code in the register as instruction that the word end has been reached.

The output side of "nor" gate 411 is additionally connected to an inverter 413 which in fact furnishes a signal WC which is identical to the output W of "nor" gate 412. The output signal of inverter stage 413 is a write command signal fed to the memory for controlling the write-in process of the memory. This separation of signals W and WC is desirable only for reasons of signal strength and rise time. Also, as will be developed more fully below, the write command signal WC (and other command signals) operate power stages in the frequency, whereas the signals such as write signal W only drive logic elements at low power level.

The decision-making unit 400 includes next a switching arrangement 420 which is comprised of two flip-flops 421 and 422. This particular switching device 420 receives as its primary input the —EC signal as instruction signal derived from the error code. —EC is used as a negative pulse occurring whenever the error code is being detected by error code detector 180 (FIG. 9) to exist in the input register 150. The —EC signal is applied as trigger signal to the input side of the two flip-flops 421 and 422.

Flip-flop 421 has a "nor" gate 423 and a "nor" gate 425, whereas the flip-flop 422 has a "nor" gate 424 and a "nor" gate 426. The —EC error code signal developed by the error code detector 280 is thus fed as a negative trigger pulse to the two "nor" gates 423 and 424. In either case the two flip-flops 421 and 422 are being set so as to furnish negative output signals respectively drawn from the output side of the "nor" gates 425 and 426. These two negative output signals are being fed to a "nor" gate 427.

It is apparent that as long as either one or both of the input signals applied to "nor" gate 427 are negative, the output of "nor" gate 427 will be at positive signal level. Only in case of the two flip-flops 421 and 422 are reset and the outputs are positive, the output of "nor" gate 427 will be negative.

As long as at least one of the flip-flops 421 and 422 is set, "nor" gate 427 furnishes a positive signal that is initiated, of course, upon the occurrence of an error code pulse. The positive output signal of "nor" gate 427 is, therefore, called +E. A concurrently developed negative signal —E is used separately and it is furnished by an inverter 428 having its input side connected to the output side of "nor" gate 427. Accordingly, the output side of the inverter 428 furnishes a —E signal whenever the output of "nor" gate 427 directly furnishes a +E signal. Additionally, during periods of time in which the two flip-flops 421 and 422 are reset, inverter 428 furnishes a positive signal $\overline{E}$.

The reset sides of "nor" gates 425 and 426 are governed as follows: Both "nor" gates 425 and 426 can receive —R reset signals for resetting; i.e., upon receiving a negative —R signal the error flip-flops 421 and 422 are being reset in a manner similar to the resetting of the write switch 410. It might be mentioned at this point that the —R reset signal affects all of the switches to be described in the following and in a similar manner.

It will be recalled that during normal tape reading a word that contains the error code is succeeded by a word that contains the error proper, i.e., that was recorded incorrectly. Thus, the error switch 420 is destined to be turned on by the error code and to be turned off after the word succeeding the one containing the error code has left the tape reader. The signal E is required as long as either of these two words is in the range of the reader. Bearing this in mind, the resetting of the switch 420 is carried out in two steps as follows: After an error code has appeared in the register 150, the next following start code pertains to the word that was incorrectly recorded. Thus, flip-flop 422 is being reset by a —SC signal. Normally, the —SC signal is ineffective as a reset signal for flip-flop 422 because in the absence of an error flip-flop 422 is not being set. After flip-flop 422 has been reset, its output, which is a positive signal developed at the "nor" gate 426, is being applied to "nor" circuit 427, but there is no change of the output thereof. The output of "nor" gate 426, furthermore, is being fed back to the input side of a "nor" gate 429. The "nor" gate 429 is thus being prepared by a positive pulse and is being gated open thereby so as to be ready to respond when receiving an ME pulse. Pulse ME is produced after the buffer memory has been emptied due to a subroutine clearing operation.

After this clearing and erasing of the memory is completed, i.e., after the ME pulse is being developed by the memory, as will be developed more fully below with reference to FIGURE 13, there is coincidence at the "nor" gate 429 resulting in a negative pulse which now will reset the flip-flop 421, thereby placing a second positive pulse to the input side of the "nor" circuit 427. At that moment the "nor" gate 427 has received two positive pulses and it thereby removes the +E error signal. Accordingly, the inverter 428 does not furnish the —E signal again. Removal of the ±E signal is an indication that the word error and word-skipping subroutine which is basically a clearing operation, has been completed. The specific utilization of these E and —E signals for purposes of controlling will be developed more fully below.

Proceeding now to the description of the third switch of this decision-making unit (FIGURE 11), there is provided a switch 430 which also can be called the read switch. This read switch is activated for memory read-out operation. The read switch 430 is a flip-flop having a "nor" circuit 431 on its set side and a "nor" circuit 432 on its reset side. Aside from receiving a gating signal from the output side of "nor" gate 432, "nor" gate 431 has two input terminals which are normally receiving positive potentials.

One input of "nor" gate 431 is drawn from the stop code detector 240. Normally, this detector 240 furnishes a positive signal $\overline{TC}$. It will be recalled that the stop code is being developed during tape reading and at the end of a word. Accordingly, the appearance of the end of a word symbolizes the fact that the word has been written into the memory, and upon appearance of the stop code in the register 150, the —TC signal is being developed as an indication that now the write-in of this particular word can be terminated. Moreover, appearance of the —TC signal can be used to commence the memory read-out and data evaluation process. Accordingly, the —TC pulse signal is one of the trigger signals for the set side of flip-flop 430.

The second input alternatively used as a trigger for the setting of the read switch and for memory read-out is the —RP pulse. It will be recalled that the —RP pulse is being developed only during the manual mode upon twice actuating the manual master clear switch 330 (FIGURE 10). Thus, during automatic tape read-out and during automatic subroutine and main read-out program routine, this signal —RP will not appear. Conversely, during manual operation the —RP sets the read switch. Since normally the —RP input line is at a positive potential, the "nor" gate 431 (set side of the read switch) is normally at coincidence with three positive pulses, which is a condition that this read flip-flop 430 is capable of switching and setting action. The output of "nor" gate 431 is being used as a positive read signal +D developed after switching or setting action of flip-flop 430. The +D pulse is the read signal which will be used to govern the memory read-out, as will be developed more fully below.

At this point it is advisable to mention "nor" gate 470 which actually pertains to the error switch 420 as well as to the read switch 430. It can be seen that the "nor" circuit 470 has three input terminals. A first one receives the output of the inverter 428 which is either the negative error signal —E or, if no error is present, it receives a positive potential. The second input of "nor" gate 470 is furnished by the output of "nor" gate 431 which is the +D signal developed whenever the read command is being given. The third input of "nor" gate 470 is the +A signal developed throughout automatic operation. Thus, it will be appreciated that during automatic operation, in the absence of an error and upon setting of the read switch, a negative coincidence signal is being developed at the output side of "nor" gate 470. This negative signal is used as an indication that a word has been stored in the memory without error so that proper reading operations may commence, which negative signal can be used externally.

The reset side, i.e., the "nor" gate 432 of the read flip-flop 430, receives altogether four signals. Of course, it first receives the signal from the output side of "nor" gate 431. The second signal is the —R signal which, as was stated above, enables manually-controlled resetting of the switch 430, for example, during a manually-initiated master clear and erase operation or otherwise.

Before proceeding in the description of the two other modes of resetting the read switch 430, it might be of interest to mention briefly that the memory can be emptied (i.e., read-out) in two ways. In one way, the external data evaluating device automatically empties the memory, step by step, and after the memory read-out has been completed, the stop code will appear in the output register 750 and in the decoder 900 from which it can be drawn as an indication that the last character of the word in the memory has been read therefrom and decoded. This fact is to terminate memory reading and requires a resetting of read switch 430; the corresponding resetting signal is called "reset-read 1." The other possibility of a completion of memory read-out is that an erasing procedure took place during which the memory has been emptied without data evaluation. This requires production of a resetting signal of the read switch 430, called "reset-read 2."

Proceeding now with the description of the resetting of read switch 430, the signal for the third input "nor" gate 432 and for resetting is being drawn from a "nor" gate 433. The output of "nor" gate 433 furnishes the negative "reset-read 1" signal which is developed as follows:

The "nor" gate 433 is capable of developing a negative resetting pulse or signal upon coincidence of positive signals at all of its three input terminals. The first input for this "nor" gate 433 is a +TC2 signal which, as will be developed below, is produced by a decoder similar to decoder 240 but connected to the output register 750. This signal can be called a "stop code 2" signal. The +TC2 signal is developed when, during memory read-out, the evaluating device has reached the point that it reads out the stop code signal from the memory, and the data evaluation of a word has been completed. The +TC2 signal is drawn specifically from the decoder 700 as a measure indicating that, in fact, another write-in process can be commenced. The production of this stop code 2 signal during normal automatic operation signals changeover from memory read-out to another memory write-in (or tape read-out) operation.

The second input of "nor" gate 433 is furnished by the program clocking signal omega which synchronizes and phases the resetting of switching device 430 to a particular phase with regard to the timing procedure in the entire network. Clock pulse omega is used as a positive pulse.

The third coincidence signal for the "nor" gate 433 is furnished by the output of an erase switch 440 which will be described more fully below. The signal presently used and furnished from erase switch 440 is a positive one whenever no erasing is being carried out. This signal can, therefore, be called a $\bar{B}$ signal symbolizing that erasing is not true. The $\bar{B}$ signal is a positive signal gating open the "nor" gate 433 for as long as there is no erasing in progress.

Accordingly, upon coincidence of the stop code 2 signal, +TC2, a clocking signal omega and the fact that no erasing takes place, "nor" gate 433 furnishes a negative "reset-read 1" pulse for resetting the read switch 430.

The "nor" gate 432 of read switch flip-flop 430 has a fourth input which is being drawn from a "nor" gate 434. The output of "nor" gate 434 is called "reset-read 2." The "nor" gate 434 receives two positive signals for its furnishing of the negative "reset-read 2" signal.

The first signal applied to "nor" circuit 435 is an ME pulse indicating that a clearing operation of the memory has been completed. The second input of "nor" circuit 434 is furnished by a "nor" gate 435, receiving two inputs, one is the +A signal rendering this one input of "nor" gate 435 positive for as long as an autoamtic operation is in progress. The second positive signal of "nor" circuit 435 is furnished by the output of inverter 428. It will be recalled that the output of inverter 428 is positive only if no error is present. This signal can actually be described as a positive $\bar{E}$ signal, positive if no error is in the system. Thus, during the automatic mode and in the absence of an error, the output of "nor" gate 435 is negative. A positive coincidence at "nor" gate 434 for furnishing a negative resetting signal, "reset-read 2" for read switch 430 can be developed only if either one or both of the inputs of "nor" circuit 435 are negative; that is to say, the "reset-read 2" signal for resetting read switch 430 can be developed only as long as the mode of operation is a manual one or if a word error is present, or both. Specifically, the "reset-read 2" signal will occur at the end of a master clear and erase operation that is run at the manual mode, or this signal will occur during a word-skipping and erase routine that interrupts a normal program routine during automatic mode. Only in either one of these situations a positive pulse will be developed by "nor" circuit 435 as gating signal for "nor" circuit 434, and upon subsequent production of an ME signal, the "nor" circuit 434 will now be able to furnish the negative "reset-read 2" pulse for the flip-flop 430.

Having described setting and resetting of read switch 430, this flip-flop 430 is being used in a twofold manner; i.e., there is, first, derived the positive signal D from the output of "nor" gate 431 of switch 430. Read-signal D is a positive signal for as long as reading out of the memory is required. The negative pulse concurrently developed by the "nor" circuit 432 is passed through a delay device 436. The thus delayed negative read pulse is inverted by an inverter 437 and a positive D.C., i.e., read command, signal is being developed having a slight delay with relation to the read signal D. The purpose of this will be developed more fully below, and at the moment it is sufficient to state that the read command signal +DC is being fed to the memory for controlling the reading proper of the memory.

Additionally, the output of "nor" circuit 432 furnishes a non-read signal $\bar{D}$, which is a positive signal developed as a complementary signal to the read signal when the read flip-flop is reset.

It should be mentioned that the "nor" gates 433, 434, and 435 play an important and additional role in the decision-making process carried out by device 400. In other words, the "reset read 1 and 2" signals are not solely used for resetting read switch 430. These additional uses of the two "reset read" signals will be developed next and during the description of elements 450 and 440.

Element 450 is a decision-making "nor" circuit providing a positive reset command signal +RC for as long as not all of its four signals are positive. The function of this +RC is to return the memory to the first address therein. The "nor" circuit 450 with its four inputs is connected as follows. It receives a negative pulse —TC from the stop code detector 240 upon passage of the stop code, i.e., upon passage of a word end through the tape reader. During other times, this one input for the "nor" circuit 450 is maintained at positive signal level.

The second input terminal of "nor" circuit 450 is connected to receive the negative reset pulse —RP developed by the manual setting device, as aforedescribed, provided that the device is being set to operate in the manual mode. During the automatic mode, this second input of the "nor" circuit 450 will never go negative, but will stay on as a positive gating-open signal.

The third input of "nor" circuit 450 is the "reset read 2" pulse developed by the "nor" circuit 434, as aforedescribed. This "reset read 2" signal is a negative pulse, as mentioned above, developed upon occurrence of the ME pulse at the end of a memory-erasing operation. The pulse ME will be developed either at the end of a manual-mode master clear-and-erase operation or, during the automatic mode, at the end of a word-erasing routine, skipping and suppressing such a word for external evaluation.

Finally, the fourth input of "nor" circuit 450 is connected to receive the "reset read 1" signal developed as a negative coincidence pulse by "nor" circuit 433 upon a coincidence of the stop code 2 signal, the positive program clock pulse omega, and the non-erase pulse $\overline{B}$—which is also a positive pulse.

It will be appreciated that either one of these pulses— the "reset read 1," the "reset read 2," the —RP, or the stop code pulse —TC—is capable of furnishing a reset command pulse, which is a positive pulse. To state it differently, the reset command pulse +RC is being developed whenever the read switch 430 is being turned off in some other way than through the manually initiated reset signal —R. A reset command pulse +RC is additionally furnished whenever the write switch 410 is being reset in some other way than through the —R pulse. Finally, the reset command signal +RC develops whenever the negative reset pulse —RP is being developed during the manual mode of operation.

The reset command signal as a positive pulse controls the memory as will be described below.

The next switch to be described is the erase switch 440, having two "nor" gates 441 and 442. The "nor" gate 441 constitutes the set side of flip-flop 440. Then the flip-flop is set, the output of "nor" gate 441 furnishes a positive signal +B, which is the above-introduced erase signal. The input of "nor" gate 441 is governed by a "nor" gate 443, furnishing the negative trigger pulse for setting erase switch 440 so as to furnish the +B signal. The "nor" gate 443 furnishes this negative trigger pulse only when its two input terminals do receive positive inputs as coincidence signals. One of the two input terminals for "nor" gate 443 is connected to receive the positive stop code +TC whenever the stop code is in the input register 150. Specifically, the +TC signal is being drawn from inverter 245 of stop code detector 240.

The second input pulse or signal for "nor" gate 443 is furnished by the positive error signal +E drawn from the output of "nor" gate 427 described above. Thus, existence of the E signal is a prerequisite for "nor" gate 443 to respond and to switch on the erase flip-flop 440. Accordingly, coincidence of an existing error (signal +E being true) and of the passage of the stop code at the end of the word, resulting in the production of the +TC signal, is required to produce a negative trigger signal at the output side of "nor" circuit 443, to set the erase switch 440 by applying a negative trigger pulse to the "nor" gate 441. To state it differently, "nor" gate 443, in cooperation with the error switch, responds to a serial appearance of the stop code instruction and of the error code instruction to turn on the erase switch 440. During manual operation, i.e., during a manually initiated memory-erasing routine, switch 440 is also being turned on by the —RP pulse.

The other "nor" gate 442 on the reset side of switch 440 receives turning-off pulses from the following sources. Again, as all the other switches, switch 440 can be turned off by a reset —R pulse drawn from the manual resetting device. A second resetting pulse may be drawn from the "nor" circuit 434. The "reset read 2" signal furnished by "nor" circuit 434 is used here as a negative resetting pulse, for turning the erase switch off upon concurrent occurrence of a memory empty signal +ME and of a positive output pulse furnished by a "nor" circuit 435, which positive output pulse, in turn, results if the device is in the manual mode and/or if a positive +E signal is being developed. In other words, the removal of the error signal E, which initially turned on the erase flip-flop 440, is now being used to turn flip-flop 440 off again, provided that the device is operated in the automatic mode. If there is a manual-mode master clear-and-erase operation, switch 440 has been turned on by the —RP pulse. Signal A is not true, so that "nor" gate 435 furnishes a positive pulse; and upon occurrence of +ME, a "reset read 2" signal turns flip-flop 440 off.

The next switch of unit 400 to be described is a parity error switch 460. It is comprised of a flip-flop having two "nor" circuits 260 and 461. The "nor" circuit 260 was already explained above as a part of the parity error detector 250. In particular, the output of this "nor" circuit 260 is a positive PC signal, indicating the presence of a parity error in the character then momentarily in the input register 150.

The "nor" circuit 461 supplements the "nor" circuit 260 to establish the parity error switch 460. The output of this switch 460 is the parity error signal; particularly, the "nor" gate 461 furnishes a negative signal —P used primarily for the purpose of indicating the existence of a parity error. Additionally, "nor" circuit 461 constitutes the reset side of the parity error switch 460. In effect, "nor" circuit 461 supplements "nor" circuit 260, so that, after the development of the parity error code +PC, a signal +P stays on for as long as flip-flop 460 is not being reset.

The parity error flip-flop 460 is being reset either by a negative main sprocket pulse gamma or by the reset signal —R; this reset signal that is manually initiated is also used here for resetting the parity error switch 460. Another negative reset pulse may be drawn from a "nor" circuit 462 provided that there is a coincidence of two positive pulses, +S and +SE, at the two input terminals of a "nor" circuit 462. It will be recalled that positive pulse SE is being developed after the completion of a correcting operation at device 120 and that this pulse SE is being drawn from the select switch 124, shown in FIGURE 8. The pulse S is the positive start pulse developed after the manually initiated starting, and the pulse S was developed by monovibrator 324 through inverter 326 (FIGURE 10).

As will be developed more fully below, the existence of a parity error during the memory write-in procedure causes the tape drive to stop momentarily. This stopping permits the correction of the number of bits in the input register, whereupon the write-in process is resumed by pressing the start switch again. Since this is a manual operation (even though it is carried out in the automatic mode), the start pulse S will then be developed to remove, together with the SE pulse, the parity error signal from the parity error switch 460.

The main sprocket pulse gamma, which is a negative pulse, is also fed to "nor" gate 461—not for resetting the parity error switch, but for temporarily blocking the setting thereof. Thus, signals ±P will be produced by an odd number of bits in the input register 150, but only after the concurrently produced sprocket pulse gamma has decayed. This, of course, means that the odd-numbered character on tape 10 has left the scanning and detecting range of the photoelectric character reader 100. The reason for this provision is that sometimes a bit is not properly printed, so that one photoelectric receiver responds rather late. Only after a character has passed completely under the reader can it in fact be determined whether the number of bits that energized the reader is odd or even.

The tape drive control unit illustrated in the upper portion of FIGURE 10 should be considered as constituting a part of the switching and decision-making unit, for this particular tape drive control unit 350 contains as its primary element a switch 360 operating on a decision-making basis and determining whether or not the tape transport is to advance the tape or whether the tape is to be stopped. The tape transport is intimately associated with the entire memory write-in and read-out routine.

FIGURE 10 illustrates the tape drive switch 360. The tape drive switch has a set side "nor" circuit 361, which is governed by two input terminals in addition to the gating signal derived from the output side of the reset side "nor" circuit 362. The reset side "nor" gate 362 has altogether four additional inputs for resetting the tape drive control switch 360.

The tape is started by a negative pulse drawn from the output of "nor" circuit 362, and the tape is stopped by a negative signal drawn from the output of "nor" circuit 361.

The tape start device 361 is indicated only schematically. This tape start device 361 may comprise a solenoid which urges a capstan in the tape transport device 353 into engagement with the tape to be transported, which capstan cooperates with a movable idler for transporting the tape until a stopping signal is received. Upon being reset, the tape switch 360 removes the tape start signal from the tape start device 351. A tape-stopping device 352 is operated concurrently and as long as a negative pulse exists at the output side of "nor" circuit 361. The tape stop device may comprise a solenoid-operated brake, which applies a braking force to the tape for an immediate stopping as soon as the negative tape start signal is removed from the device 351 and as soon as a negative stop signal develops at the output side of "nor" circuit 361. The tape should be stopped so that, from occurrence of a stopping command to a complete standstill of the tape, a period of time elapses that, multiplied with the tape speed, results in a distance smaller than the distance between succeeding characters on the tape. The tape transport, generally denoted with reference character 353, is being influenced by the tape start device 351 and the tape stop device 352 for respectively starting and stopping, as aforedescribed. Additionally, the tape transport mechanism may be governed by a tape ready switch 364, so that actually the tape can be started only if there is a spool placed on the tape read-out device. In other words, the tape ready switch 364 is a signaling switch that develops a ready signal after the tape has been put into the general transport mechanism.

The tape transport mechanism is not a part of the invention, and any known tape-transporting device proven useful in the art of teletyping or tape recording can be employed. If the tape reader is operated at a speed permitting a read-out of two hundred characters per second, the tape should start within two milliseconds and stop in one millisecond. This is well within the realm of possibilities. A tape-driving unit may be equipped with a fast tape advance and rewind device, such as is used in tape recorders.

Proceeding now to the description of the control of tape drive switch 360, the tape drive can be turned on by a negative pulse furnished by either one of two channels, provided that the respective other channel furnishes momentarily a positive output pulse. The first setting signal for this flip-flop 360 may be drawn from a "nor" circuit 354. This "nor" circuit 354 will develop a negative signal, provided that there is a coincidence of two positive pulses at its input side. Accordingly, the "nor" circuit 354 has two input terminals, one of which receives the start pulse +S that is developed after the start switch 320 has been pressed twice.

The "nor" circuit 354 is being gated open by a positive signal $\bar{D}$, which is the complementary signal to the read signal D derived from read switch 430 (FIG. 111). It will be recalled that signal $\bar{D}$ can be drawn from read switch 430 as long as there is no reading process in progress.

Assuming this is the case, a manually initiated start pulse S, drawn from monovibrator 324 via inverter 326, will then start the tape drive by setting flip-flop 360, and the utilization of the $\bar{D}$ signal is a safeguard that no manual operation can start the tape while the memory read-out is in progress. This safety measure is necessary because tape is to be transported only if characters are to be read out from the tape. Characters are being read out from the tape only when the read-out characters can be loaded into the memory. This, of course, is not possible if a memory read-out is in progress.

The second starting signal, i.e., a second negative trigger pulse for the set side "nor" gate 361 of flip-flop 360 may be drawn from a "nor" circuit 355, furnishing a negative output upon the coincidence of three positive pulses or signals. The first positive signal is the +A signal, i.e., the "nor" circuit 355 is gated open only during the automatic mode, and no starting signal for the tape drive can be drawn from "nor" circuit 355 in the manual mode.

The second positive pulse for "nor" circuit 355 is the +TC2 or "stop code 2" signal. This signal has already been mentioned above, and it will be repeated briefly that the +TC2 signal is furnished by the decoder unit 700 of the data converter. It is developed at the moment the evaluating device reads the stop code from the memory. Usually the stop code is the character that is being read last from the memory and as an indication that in fact the entire word previously stored in the memory has now been read out. The third signal applied to "nor" circuit 355 is the positive program clocking pulse omega, repeatedly mentioned above, and its development will be discussed more fully below in reference to FIG. 12.

The "nor" circuit 355 thus will start the tape after completion of an automatic memory read-out routine of a previously written-in word. After a word has been read out from the buffer memory, the memory is ready for another write-in operation. Memory write-in requires the tape to run under the reader 100. Thus, if the converter is set properly to operate in the automatic mode, "nor" circuit 355 will restart the tape drive for another tape read-out and memory write-in operation. This particular tape-starting operation will occur with the next clock pulse omega. The "nor" circuit 355 thus provides for the change-over from memory read-out to write-in and the start of another routine cycle.

The tape may be stopped by negative pulses developed in various ways and applied to the "nor" circuit 362 defining the reset side of flip-flop 360. As already mentioned above, there are four input channels for this "nor" circuit 362, so that there are four different situations in which it becomes necessary to stop the tape.

The first tape-stopping signal is the stop code signal —TC, which is a negative pulse drawn from stop code detector 240. In other words, as soon as the stop code appears in the input register 150, the tape drive is being stopped.

It is significant that the tape drive can thus be operated cyclically by one instruction code: the —TC pulse is produced when the stop instruction code is in the input register 150, and this stops the tape. The TC2 signal or pulse is produced when the same code is in the output register 750, and it starts the tape anew. Thus, one particular instruction code governs the continuance of memory write-in and read-out cycles. Furthermore, pulse —TC has been phased and clocked by pulses omega, and signal TC2 is likewise clocked and phased by omega, by and in "nor" gate 355.

The second pulse which might be used for stopping the tape is the manually initiated reset signal —R. It will be recalled that all of the decision-making switches can be reset manually by reset signal —R, and the tape drive switch is not excluded from this general provision.

The third signal capable of actuating the tape drive flip-flop 360 so as to stop the tape is drawn from "nor" circuit 356 having two input terminals, and a coincidence of two positive input pulses is capable of turning off the tape drive. The coincidence is to occur between a clocking signal omega and the positive parity error signal +P drawn from the parity error detector and particularly from the "nor" circuit 260 thereof (supra). It has been mentioned several times above and is now being verified that, upon occurrence of a parity error, the tape is stopped immediately, but that the stopping is synchronized to pulses omega.

At this point, it should be explained why the stopping of the tape is performed by a pulse omega. As will be explained more fully below, the pulse omega is developed with the trailing edge of any clock pulse. During memory write-in, and specifically during the period requiring parity testing, the pulse omega will develop only after a character has left the detecting range of reader 100. Any character or, more generally, any tape area momentarily in the scanning range of reader 100 will be positioned very close to the photoelectric device and will be subject to strong illumination. Also, provision is usually made for such a photoelectric reader not to be influenced by ambient light sources. Accordingly, any tape portion that is being scanned will at that moment be out of the operator's range of visibility. It will be recalled that existance of a parity error necessitates correction and that this, in turn, requires that the operator can inspect the tape to find out whether there is a bit missing or whether there is a bit too many. Thus, the parity-error switch must stop the tape drive and the write-in procedure only after the tape portion with the odd-numbered bit combination has left the detecting range of the reader 100. For this reason, the pulse omega delays the stopping of the tape until the character with the parity error has left the reader range. This condition for stopping the tape, and also for starting same, concurs with the condition that a change in program, such as from write to read or from write to subroutine, etc., is always a step that is not carried out until all the other steps of a respective preceding routine are terminated.

The fourth signal capable of turning off the tape drive flip-flop 360 is drawn from "nor" circuit 357 upon the coincidence of three positive pulses. The first one is again the program clocking pulse omega. The next positive pulse is pulse +M, which is the enabling signal for several manual operations. In other words, the "nor" circuit 357 is enabled to turn off the tape drive only during manual operation, provided that there is a coincidence with a third signal, which is the write signal +W. During a manual memory write-in operation, the tape drive can be turned off simply with the occurrence of each clock pulse omega. As will be explained during the description of the manual part of the operation, the tape is then being transported only from one character to the next one.

*Clock*

Figure 12:
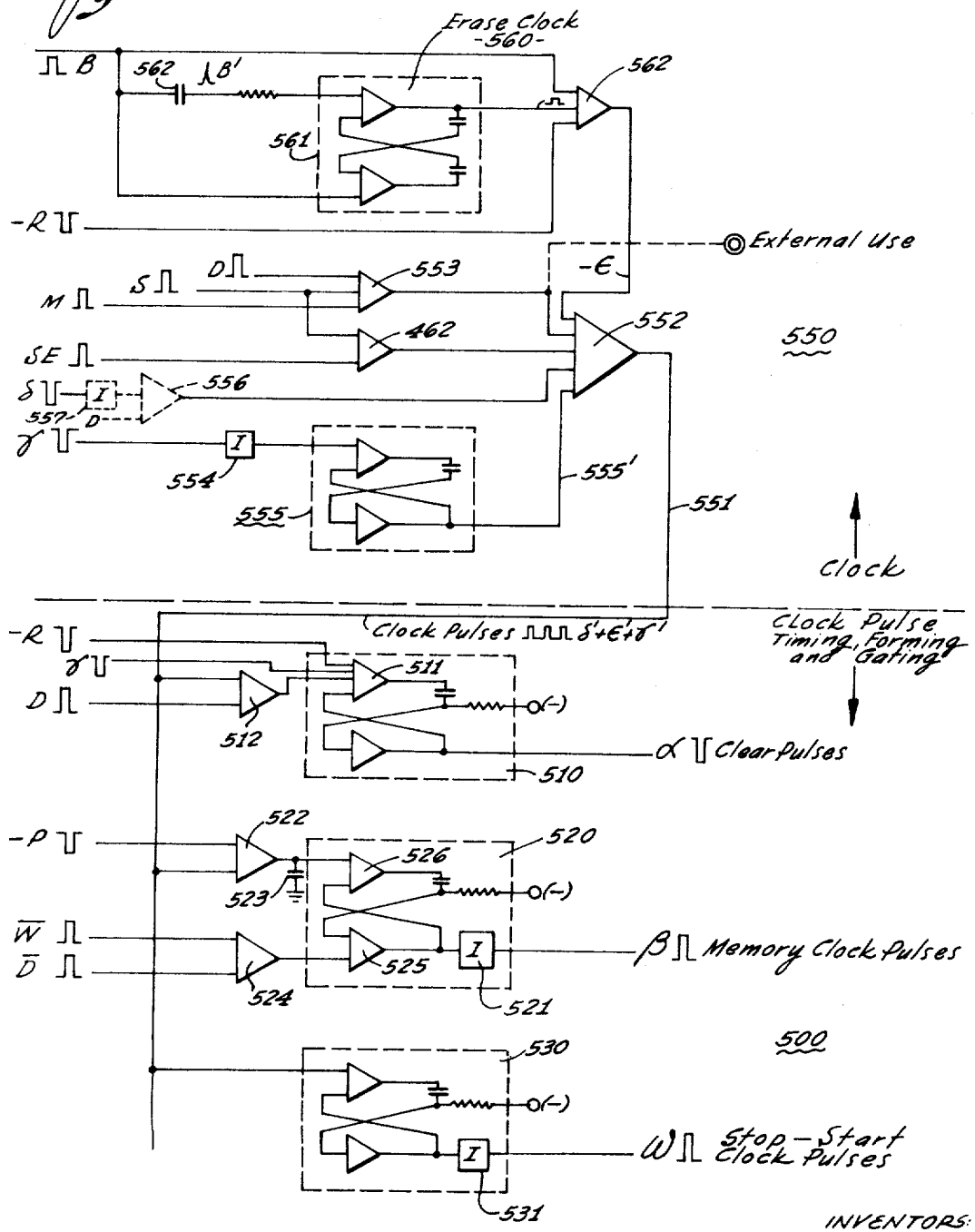
FIG. 12 illustrates in its upper portion a block diagram of the clock adapted to furnish its own clocking pulses as well as to use externally provided clocking signals; in its lower portion

Proceeding now to the description of FIG. 12, there will be shown as a special feature of the present invention a network permitting formation and phasing of clock pulses coming from different sources.

At first, reference is made to the upper portion of FIG. 12, showing the clock network 550. It is a specific feature of the present invention that the entire operation of the data converter can be run from three different clocking devices. During tape read-out and memory write-in operations, the characters of the tape furnish clock pulses which have been called main sprocket pulses gamma. No special track on the tape is necessary because no special constant-frequency relation is required during the write-in operation, nor is the memory write-in synchronized with a local oscillator. In other words, during memory write-in operation, it is only necessary that an indication be present as to when and how long a character is monitored by the tape-reading unit. The distance from character to character on the tape is entirely immaterial, and during this write-in operation these characters each produce more or less arbitrarily distributed main sprocket pulses to govern synchronism of the entire data converter.

During memory read-out, the data converter is clocked from an external sync source. The device evaluating the content of the memory is primarily governed by its own speed. Its own rate of progressing with the evaluation of data determines the speed of the memory read-out. Thus, the memory read-out process is clocked from regularly or irregularly produced pulses (called delta) drawn from the external evaluation device. Again, no synchronism is sought with a local oscillator. The inventive data converter furnishes its own clock source only during a clearing-and-erasing procedure carried out either manually or as a subroutine in case of a word error.

All clock pulses furnished by this unit 550 appear in line 551 as positive output clock pulses drawn from a "nor" circuit 552. This "nor" circuit 552 has five input terminals. Two of such terminals normally furnish positive gating-signal levels, so that a pulse train in either one of the three other terminals may pass through "nor" gate 552. The two first-mentioned terminals additionally serve for manual clocking.

A first input terminal of "nor" circuit 552 connects to the output side of a "nor" circuit 553. This "nor" circuit 553 goes negative upon coincidence of the manual setting signal +M, the start pulse +S, and the read signal D. Such coincidence occurs (See infra.) during a manually controlled read-out operation for one character.

The second input for "nor" circuit 552 is governed by the above-mentioned "nor" circuit 462, which, in effect, is also a part of the input control for parity-error switching device 460 shown in FIGURE 11. It will be recalled that "nor" circuit 462 furnishes a negative output upon occurrence of a positive signal SE, manually initiated after a bit correction in the input register 150 has been completed, and upon the concurrent occurrence of the positive starting pulse +S. As will be described more fully below, a manually set bit combination for input register 150 can be written into the memory by actuating the start switch 320 twice to produce start pulse +S. Since any memory operation requires a clock pulse (see infra), this "nor" circuit 462 thus enbales such single clock-pulse production by responding to +S and +SE signals. Thus, the output of "nor" circuit 462 operates as a clock pulse for a manually initiated memory write-in routine. These two circuits 553 and 462 furnish positive gating signals during an uninterrupted main program routine in the automatic mode. Periodic clock pulses may come from three of the following sources.

First, clock pulses may be derived externally, and these external synchronization pulses are designated with reference character delta (δ). If the external sync pulses δ are derived from a continuously running local oscillator of the external evaluating device, it is advisable to provide a gate 556 and an inverter 557. This gate 556 is blocked by a negative-signal level for as long as no memory reading is in progress. The +D read signal gates-open "nor" gate 556. Also, a second gating signal +A may be applied to insure that only during automatic operation can any pulse δ become effective. The clock pulses δ are passed through "nor" gate 552 to appear as positive clock pulses δ' in line 551.

The second source of periodic clock pulses is the sprocket-pulse detector 180, producing the sprocket pulses gamma. The output of the sprocket-pulse producer and bit detector 180 is fed to an inverter 554, thus furnishing a positive pulse with each sprocket pulse gamma and with each character actually detected by tape reader 100. The positive pulses drawn from the inverter 554 are not used directly. The sprocket pulses gamma, as will be recalled, occur for the duration of the time that at least one character-bit area is under the photoelectric reader 100 to produce a negative pulse. The ouput of bit detector 180 is restored to a positive level as soon as all the bits of a character have left the photoelectric reading device 100 (FIG. 8). Thus, as soon as such a gamma pulse decays, the output of inverter 554 swings towards the negative again. This negative swing is used for triggering a monovibrator 555.

The monovibrator 555 is triggered at the end of each sprocket pulse gamma and furnishes a negative pulse fed into a line 555' and having a duration determined solely by the recovery time of the single-shot multivibrator 555. Thus, the clock pulses furnished and delivered through line 555' to "nor" circuit 552 depend on the previous existence of a main sprocket pulse gamma, and at the end of such a main sprocket pulse the monovibrator 555 produces its own pulse, of a duration determined solely by the monovibrator itself.

This particular clock pulse at the output side of "nor" gate 552 is a positive pulse γ', occurring at a rate that is strictly determined by the occurrence of the main sprocket pulses γ and in a fixed delayed-phase relationship thereto. Pulses γ' have a duration which is independent from the duration of the main sprocket pulses.

It will be recalled that the duration of the main sprocket pulses gamma depends on the tape speed, but that the duration of pulses γ' is constant. It will be understood further that these pulses γ' will occur only if the tape is in fact being transported, so that clock pulses γ' will be furnished through monovibrator 555 and gate 552 only during tape transport and memory write-in operation. As will be seen below, the tape will never be stopped when a bit is still in the range of the reader, so that a main sprocket pulse gamma is never interrupted by tape stopping, and before the tape stops, the trailing edge of such a pulse gamma will always pass first. Accordingly, for each bit read and passed into the register 150, a pulse gamma is completed and a pulse γ' will be produced.

The third train of clock pulses is generated by an erase clock 560. The erase clock 560 has as a primary element a multivibrator 561, which is started by differentiating (capacitor 562) the leading edge of erase signal +B. The differentiated leading edge results in a trigger pulse B'. Thus, the erase switch 440 (FIG. 11) starts the erase clock 560, and particularly the multivibrator 561 thereof, so that it will oscillate at its own frequency for as long as the erase signal +B stands on its input side.

The output of this erase clock 560 is a train of pulses fed to a "nor" circuit 562. The erase signal +B of the erase switch 440 furnishes additionally a positive gating-open signal for the "nor" circuit 562, indicating that clock pulses may be derived from this "nor" circuit 562 for as long as the erase switch 440 is on. Additionally, the "nor" circuit 562 may receive a blocking signal, which is the reset signal —R. Conversely, as long as the reset signal —R is not being produced, there is a positive gating potential at the third input terminal for "nor" gate 562, so that, with each positive pulse derivable from multivibrator 561, there is a coincidence at all three input terminals of "nor" circuit 562, and negative clock pulses epsilon (ε) are being fed to the "nor" circuit 562.

It will be observed that signal +B, i.e., the erase signal, was produced during automatic operation when the erase switch 440 (FIG. 11) was triggered by concurrence of +TC and +E signals. The +TC signal as well as the —TC signal is produced when, during tape reading and at the end of a word, the stop code is in the input register 150. It will further be recalled that, with reference to FIG. 10, the stop code signal —TC, when produced, stops the tape drive. Thus, the erase signal B requires a standing tape, while sprocket pulses gamma can be produced only by a moving tape. It is thus apparent that the production of clock pulses epsilon and the production of the main sprocket pulses gamma do not overlap. It is repeated that the tape stops only after the respective last sprocket pulse has passed completely, so that there is no overlap of γ and ε.

*Clock timing-forming-gating*

The line 551 receives clock pulses γ', which are delayed relative to the main sprocket pulses gamma, or line 551 receives erase clock pulses ε' or external sync pulses δ'. The line 551 now leads into the clock-pulse timing, forming, and gating unit 500. As was mentioned repeatedly above, there are three kinds of pulses being drawn from this unit 500: (1) the train of clear pulses alpha, (2) the train of memory clock pulses beta, and (3) the program clock and phasing pulses omega.

The clear pulses alpha are produced as follows. There is provided a monovibrator or a single-shot multivibrator 510 having an input-side "nor" gate 511. The single-shot multivibrator 510 may be triggered manually by the —R reset pulse. In other words, there is a possibility of forming one clear pulse alpha during the manually initiated reset operation, during which the —R pulse has been resetting all of the switches described in detail above with reference to FIGURES 10 and 11.

During automatic operation or during manual operation other than the manual reset operation, this particular line through which the —R pulse arrives is positively biased so as to gate-open the "nor" circuit 511 for any other negative trigger pulse. A second negative pulse for triggering the monovibrator 510 is derived from a "nor" circuit 512. Such a negative pulse is furnished by "nor" circuit 512 upon coincidence of two positive pulses, one of which is any kind of clock pulse running through line 551. Additionally and as a gating signal, the positive pulse +D is applied to the second or gating terminal of this "nor" circuit 512. In other words, clock pulses in line 551 initiate the production of clear pulses alpha at clock-pulse rate only during the memory read-out operation indicated by a positive pulse +D. In this case, the clear pulse alpha is needed only for clearing the output register 750.

A third input of "nor" circuit 511 connects to the sprocket pulse generator 180. When the tape is running during memory write-in, the clear pulses alpha are thus produced always upon appearance of a bit at the input side of the input register 150. Specifically, clearing pulse alpha will always be produced by the leading edge of a main sprocket pulse gamma. The reason thereof is to be seen in that the clear pulse has as one of its functions the resetting of input register 150. The clear pulse alpha thus resets the input register by means of a clear pulse that is derived from a main sprocket pulse gamma. This main sprocket pulse has a duration that is longer than the clear pulse and, in effect, results from a character-and-bit combination read from the tape and to be stored next in the input register 150. In other words, each character, when being read out from the tape by the photoelectric reader 100, does not charge the input register immediately; but a main sprocket pulse resulting from the same character is used via the monovibrator 510 to first clear the input register 150, and upon decay of clear pulse alpha, the register 150 may be loaded. Further, during manual memory read-out, a pulse α can also be produced, since an output is then derived from "nor" circuit 553, +D then being true. A single-shot clock pulse, derived through "nor" circuit 462, remains suppressed by the closed gate 512. This is reasonable, since "nor" gate 462 produces such an output only when a manually set bit combination in register 150 is to be written into the memory; no clearing is needed here.

Each clear pulse alpha is produced as a pulse of rather short duration, as determined by the recovery time of monovibrator 510, and such a clear pulse starts immediately upon the appearance of the leading edge of any clock pulse in line 551 or of a pulse gamma. The clear pulse alpha is used in addition to inhibit momentarily the appearance of a start code signal at the output side of the start code detector 220. The clear pulse alpha is being fed to the start code detector 220 so as to avoid the accidental appearance of a start code during the clearing operation. In other words, the negative clear pulse alpha blocks the production of a coincidence signal of the detector 220 for as long as a clearing operation is in progress, so that no accidental "start code" bit combination can become effective during clearing. After clearing and after the resulting new setting of the input register through the photoelectric detector output, the star code signal—if in the register indeed—is permitted to produce its output pulse —SC.

Proceeding to the description of the memory clock 520, it is comprised of a monovibrator having an output-side "nor" gate 525 connected to an inverter 521 so as to produce the memory pulses beta at a positive polarity. The production of the memory pulses beta results from a trigger signal applied to a set-side "nor" gate 526. A "nor" gate 522 governs gate 526. "Nor" gate 522 responds to the coincidence of two signals. First a parity error must be absent, so that "nor" circuit 522 receives a $\bar{P}$ signal which is positive and which indicates that there is no parity error present. The signal $\overline{P}$ is being used as a gating signal. The "nor" circuit 522, during such periods of the absence of parity error, then gates the clock pulses appearing from any source in line 551 to trigger the memory clock 520. A capacitor 523 slightly delays the production of each monovibrator output pulse, so that the monovibrator pulses beta appear with a slight delay in comparison to the leading edge of any pulse appearing in line 551. The phase relationship and duration of these pulses α, and also of β and γ, can be seen in FIGURES 17 through 20.

The memory clock 520 is further gated in a negative sense, and the output of a "nor" circuit 524 is used to inhibit production of memory clock pulses beta if there is neither a writing nor a reading operation in progress. The "nor" circuit 524 responds to a coincidence of a positive $\overline{W}$ signal and of a positive $\overline{D}$ signal. Coincidence of a $\overline{W}$ signal and of a $\overline{D}$ signal, each as a positive pulse, occurs, for example, when space in between two words on the tape passes under reader 100, and neither a memory write-in procedure nor a memory read-out routine is being carried out. Since pulses beta govern the memory, no control of the memory should occur unless by write-in or by read-out.

It should be mentioned at this point that the phase relationship between the clear pulses alpha and the memory clocking pulses beta is not a fixed one, but different according to whether there is a memory write-in or a memory read-out in progress. It will be recalled that the pulses alpha and the pulses beta are being produced by clock pulses derived from different sources during write-in and read-out procedures. The write-in procedure is clocked directly by the sprocket pulses gamma, whereas the read-out procedure is governed by externally developed sync pulses delta. During memory write-in, the train of clear pulses alpha is derived directly from the leading edge of sprocket pulse gamma, while the memory pulses beta are developed at a fixed delay, commencing at the trailing edge of sprocket pulse gamma (see FIG. 18). During memory read-out or during erasing, clear pulses alpha commence at the trailing edge of either pulse δ' or ε', and the memory pulses beta are developed with a delay from the same leading edge of the used clock pulse δ' or ε'. The delay is, of course, always longer than the duration of the clear pulses alpha, so that pulses alpha and beta never overlap (see FIGS. 17 or 20).

The reason for this difference in delay for different parts of the program is the following. During memory write-in, the input register has to be erased first; then the input register 150 is being loaded with a particular character while the respective character on the tape is still monitored by the reader. The parity-error testing is delayed until after the character has left the reader 100, in order to give any incompletely printed bits an opportunity to energize the reader, and only completely missing bits may cause the parity-error response (the inhibition of the parity-error switch 460 by pulse gamma). On the other hand, no untested character may be written into the memory, so that the memory clocking must be delayed until the presence or absence of the parity-error signal ±P can be determined. No such delay is required during memory read-out, so that clearing of the output register and clocking of the memory can follow each other directly.

The program phasing and clock pulses omega are being produced as positive pulses by a monovibrator 530, delivering negative pulses to an inverter 531 so as to furnish the positive pulses omega. Monovibrator 530 is connected so that it is being triggered by the trailing edge of each clock pulse appearing in line 551. Thus, the pulse omega follows immediately each clock pulse appearing in line 551.

It was repeatedly mentioned above that the primary function of this program clocking and phasing pulse omega is to synchronize the tape drive switch 360 to the operating clock pulses. The tape is restarted after a successful memory read-out has been completed by means of the stop code 2 signal. Since this pulse omega occurs after each sync or clock pulse in line 551, completion of all functions governed by any clock pulse is required before the tape is started again. Also, the pulse ω synchronizes the stopping of the tape. Since in between each sprocket pulse gamma and each such pulse omega there is a delay equal to the duration of pulse γ' (recovery time of monovibrator 355), the tape will not stop until the last character clearly has left the range of reader 100. Further purposes of the delay between pulses α, β, and ω will become apparent from the description of specific phases of operation.

*Memory*

Proceeding now to the description of FIG. 13, the memory and its immediate control will be described next. It is a significant feature of this buffer device that all periodic or cyclic functions performed by and in the memory device 600 are controlled and synchronized by the clock pulses beta.

The buffer or memory is comprised primarily of a ring-core matrix 601. For purposes of the present invention, in this embodiment the matrix is established by six lines, in view of the six tracks used for each tape. The maximum number of characters per word stored on the tape is forty, so that the matrix also has forty columns. Thus, there are provided two hundred forty ring cores, arranged to provide forty character addresses with six cells each. The six input or write-in lines of the matrix—611, 612, 613, 614, 615, and 616, respectively—are governed by digit drivers 621, 622, 623, 624, 625, and 626, wired as gated amplifiers, one of which is illustrated in FIG. 13a. All these gates 621 through 626 receive a common gating signal from a blocking oscillator 610. FIG. 13a illustrates this blocking oscillator 610 in detail and comprised of a transistor 617 connected in emitter-follower configuration having a transformer feed-back loop. The blocking oscillator has a transformer input circuit 618, which includes a rectifier diode 619. The write command signal WC derived from the write switch 410 (FIG. 11) biases the diode 619 to conduction, so that a clock pulse from a blocking oscillator 640 may pass during the write-in period. Oscillator 640 actually serves only as a pulse shaper for clock pulses beta, so that the output of oscillator 640 can still be regarded as pulses beta. The output furnished by oscillator 610, particularly by the emitter circuit of transistor 617, is fed as a clocking signal to each of the digit drivers 621 through 626. Specifically, driver 621 is shown in FIG. 13a. Its principal element is a transistor stage 627 with feedback loop. The input circuit of transistor 627 is coupled through a transformer to channel line 200a. A bit in channel line 200a (output of flip-flop 151 of input register 150—FIGURE 8) serves as a gating signal, and the clocking signal from oscillator 610 triggers the digit driver so that transistor 627 can furnish a driving current of sufficient strength into matrix input line wire 611.

Accordingly, the driver stages 621 through 626 are gated-open by signal levels in any of the channel lines 200a, 200b, 200c, 200d, 200x, 200p corresponding to input register bits and upon occurrence of a write command signal +WC and in synchronism for the duration of the occurrence of clock pulses beta. Lines 611 through 616 may be energized for ring-core switching accordingly. It is apparent that channels 200a through 200p individually govern the write-in lines 611 through 616 respectively. The bits in input register 150 stand at the input side of the drivers 621 through 626 for the entire period in between successive readings of successive characters on the tape. Such character bits, however, are applied to lines 611 through 616 only during the clocking, as governed by the pulses beta drawn from oscillator 610.

The ring cores of matrix 601 are additionally traversed by write-in column wires in the usual manner. The column wires on one side all terminate at a common bus, which can also be called the write-in bus 638. With their respective other sides, the column wires connect through diodes—such as diodes 631, 632, 633, 634, 635, and 636—to the stages, respectively, of a forty-way current switch 630. The cores traversed by one column wire constitute one address. Of course, for simplification, only six such column wires are being shown, whereas presently there are altogether forty such column wires.

The forty-way current switch 630 is of the shift-register type; it is a circuit network which, upon receiving pulses, shifts activation of its output channels from one to the next. In the present device, this means that with each input, received in a manner to be described more fully below, a positive potential is applied to the anodes of the aforementioned diodes 631, 632, etc. In other words, during operation, first a positive potential is applied to the diode 631 while all the other diodes remain cut off, and a current is driven through the column wire running through the cores pertaining to the first address. Magnetic saturation occurs at those cores that are traversed by an energized write-in line. With the occurrence of another shifting pulse, the positive potential is removed from the anode of diode 631, and positive potential is applied to diode 632 to open up the second address and so on, until all of the forty diodes have received positive anode potentials and all of the forty addresses have been opened.

The current, however, may flow through the write-in column wires only if concurrently a negative potential is applied to the bus 638 throughout the write-in period.

In order to apply a negative biasing potential to the write bus 638, there is provided a power inverter 637, which, in effect, converts the positive command pulse WC to a negative pulse of suitable potential, whereby the impedance of the power inverter 637 at the output side thereof is such as to maintain its potential, even though a considerable amount of ring-core switching current is flowing into bus 638. In other words, the power inverter 637 serves to increase the signal power level as from the level which suffices for the low-powered logic circuits as aforedescribed to a level enabling the driving of the ring-core matrix. The column write-in wires are energizable for write-in only for the duration of the command signal +WC and for as long as such a signal is applied to the input side of the power inverter 637.

The forty-way current switch 630 is operated by a two-phase driver 628 which receives modified, i.e., amplified, clock pulses beta from the network 640. The two-phase driver can, in effect, be regarded as a power flip-flop, alternatingly activating its output channels 628A and 628B with each memory clock pulse beta. A current-stabilizing circuit in driver 628 establishes a constant current level in these channels 628A and 628B. The memory column write-in and read-out current is actually furnished by this driver 628, and the current-steering switch 630 distributes this current successively into the forty addresses. The two-phase driver 628 shifts the activation of column wires from one to the next one and at a rate determined by the clock pulses beta.

The forty-way current-steering switch 630 can be reset by signal +RC derived from "nor" circuit 450 in FIGURE 11. The logic signal RC is subjected to a power gain increase in a pulse amplifier and forming state 629, such as a blocking oscillator. Thus, the steering switch 630 is not a ring circuit and memory write-in as well as read-out can be terminated before the forty-way current current-steering switch 630 has run through a complete cycle. It is possible to use words having less than forty characters, and the memory can be reset without having to run through a complete cycle.

The read-out process is governed by the read command signal +DC developed in the network shown in FIGURE 11. This signal +DC is fed to a read power inverter 647, which has a positive power gain and it stabilizes the output voltage to a level which can be maintained during read-out and ring-core switching action. Magnetic switching reverses the state of magnetization of any ring core pertaining to matrix 601 and having been magnetized previously during write-in.

The read inverter 647 produces a negative potential applied to a read bus 648 serving as a common return line for read-out column wires which run individually through the cores, address by address. Actually, each such read-out wire runs through each core twice so that with a similar current there is twice the flux for read-out as compared with the flux induced for write-in. The individual read-out wires terminate in the cathode of diodes 641, 642, 643, 644, 645 and 646. Only six such diodes are shown, but there are, of course, altogether forty such diodes.

The anodes of these read-out circuit diodes connect individually to terminals of a word-format defining plugboard 690. Plugboard 690 has forty individual connections to the forty read-out diodes 641, 642, etc.; these connections can be regarded as establishing the plugboard output. The plugboard is with its input side, i.e., with altogether forty input-side terminals, connected to the channels of the forty-way current-steering switch 630. The purpose of this plugboard 690 is to connect the anodes of the diodes 641, etc., and the respectively associated read-out column wires to the forty-way current switch in any desired pattern. The current steering switch 630 is operated in a fixed succession of stages, and memory write-in follows this succession. The plugboard 690 modifies and selects the succession with which the read-out wires are activated. Therefore, the several addresses may be read out in a different succession than the original write-in.

It will be recalled that the tape read-out is carried out in a manner which can be described as intermittently serial by word, serial by character in each word, and parallel by bit. The tape read-out follows strictly the word format as present on the tape, and memory write-in is carried out in a similar manner. The bits of each character are being written into the cores of one column (address) in the parallel mode, and the serial-by-character write-in is carried out by the successive activation of columns (addresses), also following word format on the tape. The memory read-out procedure is carried out similarly, i.e., serial by character, parallel by bit; but the plugboard 690 permits alteration of the succession in which the columns and addresses are being called on for the serial character read-out process so as to change the format of a word. This provision is subject to inversion. That is, the plugboard may be used to change the word format during memory write-in, and during memory read-out the word is read out at the format with which it was stored.

The purpose of this plugboard 690 is to newly define the format of a word. This plugboard 690 enables easy adaptation of the tape-code word format to a different word format used in the evaluating device, since the latter word format may differ from the tape format.

The bits per character are, of course, also being read out in the parallel mode. For this reason, any one of the forty read-out column wires, as respectively governed by diodes 641, 642, etc., traverses all the cores of one column (address). For purposes of reading out the content of the memory matrix 601, the clock pulses beta are again used to run the two-phase driver 628. The driver 628 runs the forty-way current-steering switch 630, either through all the forty stages or until the reset command signal +RC is received. Specifically, for read-out, the forty-way current-steering switch 630 applies positive potential to diodes 641, 642, 643, etc., but in a succession determined by plugboard 690. A search and column-call current may flow successively through the read-out column wires as governed by diodes 641, etc., because during the read-out period, bus 648 receives a negative potential through the read-out inverter 647.

As far as the power supply is concerned, the write-in as well as the read-out processes use the current drawn from the two-phase driver 628 and distributed by the current-steering switch 630. However, write-in of a storage wire requires coincidence of a line and of a column pulse, while read-out uses only a magnetization reversing pulse in a read-out column wire. Thus, any read-out wire traverses the cores of its addresses twice, i.e., the read-out column wires have twice as many windings as the write-in column wires have.

All magnetic ring cores arranged on one line are also traversed by a read-out line wire, and there are six such read-out lines wires 651, 652, 653, 654, 655, and 656. Whenever a column read-out wire is activated by a read-out or search current, as governed and distributed by the current-steering switch 630, on the one hand, and as returned into the open-biased read-out inverter 647, on the other hand, a voltage pulse will be induced in all line wires 651 through 656 traversing those cores which have their magnetization reversed by this read-out or search current. This read-out procedure is a parallel-by-bit operation, so that voltage pulses in the six read-out wires 651 through 656 are being induced representative of a character by way of a particular bit combination.

It will be appreciated that bit pulses occurring in wires 651 through 656, respectively, reproduce the bit combination of a character originally read out of the tape—particularly from tracks $a$, $b$, $c$, $d$, $x$, and $p$ thereof—and then loaded in this particular address during the previous write-in period. There are provided six sense amplifiers 661, 662, 663, 664, 665, and 666, one of which is shown in FIG. 13c. These sense amplifiers have their signal input terminals respectively connected to the read-out wires 651 through 656. Each sense amplifier is a two-stage transistor amplifier, with a gating terminal provided in each stage. The output stage includes a transistor amplifier 667 that receives gating signals from a sensing amplifier strobe 680, which, in effect, is a gating network, furnishing gating pulses upon coincidence of a read command pulse DC and of a clock pulse beta as modified by network 640. The network 680 comprises a blocking oscillator 681, gated-open by the read command signal DC and triggered by the modified pulses beta. The output oscillator 681 is amplified by a transistor amplifier 682, governing the emitter currents in transistors 667 for biasing and gating same.

The first stage of each sense amplifier, such as 661, includes a transistor 668, the collector current of which governs the base bias of transistor 667. The emitter of transistor 668 is biased from the read power-inverter 647, and the base connects to read-out line wire 661. It will be understood that again this read-out process is governed exclusively in synchronism, as far as frequency-and-phase relationship is concerned, by the production of the clock pulses beta.

FIG. 13b illustrates a portion of a circuit network that can be used as the current-steering switch 630 to operate upon the memory matrix for calling on the addresses thereof in serial order. There are shown three magnetic ring and switching cores—for example, 3601, 3602, and 3603. The output signals, furnished by the two-phase driver 628 (FIG. 13) into the two signal lines 628A and 628B, are alternatingly applied to cores operating in succession. Thus, each of the two cores illustrated, 6301 and 6303, has a winding 6321 and 6323, respectively, connected in series and in between line 628B and line bus —B. The winding 6322 on core 6302 is connected between line 628A and a bus —A.

It will be recalled that lines 628A and 628B receive alternatingly current pulses from the two-phase driver 628, and alternation is had in synchronism with the production of the memory call pulses beta.

Each core has additionally two windings for interconnecting juxtaposed cores. Thus, there is a winding 6331 of core 6301 which is connected in series with the winding 6342 of core 6302. This series connection circuit is connected to bus A and to a diode 63n. The cathode of this diode 63n connects to the write bus 638.

Core 6301 has additionally a winding 6341 connected in series with a winding of the preceding core (not shown) which returns also to bus —B. With its other side, winding 6341 is connected to the anode of diode 63n—1, whose cathode also connects to the write bus 638.

Core 6302 has additionally a winding 6332, connected also to bus B and connected further in series with a winding 6343 of core 6303, and further connected to the anode of a diode 63n+1, whose cathode also connects to the write bus 638.

The mode of interconnecting the windings on the cores can be readily derived for all of the cores constituting the steering switch 630. The lines, bus A and bus B, interconnect alternatingly to the windings on the several cores.

Additionally, it can be seen that each of the windings 6341, 6342, and 6343 connects to anodes of diodes 64P, 64Q, and 64R, respectively. This connection is made through plugboard wires 691, 692, and 693. These plugboard wires pertain to the plugboard 690, and this connection symbolically illustrates the way of connecting the memory read-out diodes to the current-steering switch in a selective manner.

The cathodes of the diodes 64P, 64Q, and 64R are interconnected to the read bus 648 as heretofore described. The operation of this device is readily detectable. It will be assumed that a current flows into the line 628B and that this current passes through the windings 6321 and 6323 and from there to the bus B. It may be assumed further that this current produces a flux change in the core 6301, but not in any of the other cores. The flux change in core 6301 results in a voltage induced in winding 6331, and the current in bus B is steered through this series connection of windings 6331, 6342, and into the diode 63n, provided there is a memory write-in in operation. Of course, if the steering switch controls the memory read-out, the current would then flow through the plugboard connection 691, the diode 64P, and into the read bus 648. The same current, when flowing though winding 6342, prepares the core 6302, so that, with the arrival of the next pulse beta and with current flowing through line 628A and into bus A, a flux change in core 6302 induces a voltage in winding 6332; and the current is being steered through this winding and into the series connection of windings 6332 and 6343 and from there into either diode 63n+1 or into diode 64Q. With the arrival of the next pulse beta, the current is steered to flow through the winding 6333 of core 6303, etc. Each of the switching cores has a reset winding 6311, 6312, 6313, respectively, connected in series and to the output of the reset oscillator 629 (FIGURE 13). Upon appearance of the reset command signal +RC, all of the cores are being reset in such a manner that they are placed magnetically in one particular direction of saturation. The very first core of the chain of cores, however, is connected to the reset oscillator 629 in such a manner that a reset command pulse in effect biases this very first core of the steering switch 630, so that, with the arrival of the very first pulse beta, this first core of the steering switch is opened and permits the current conduction into the first read-out or write-in column of the first address. In case of similar word format for write-in and for read-out, the first address is the one that is governed by diode 631 during write-in and by diode 641 during read-out. In case of change in word format, a different address may be called on first during read-out.

Additionally, it should be mentioned that reset device 629 initially activates the two-phase driver 628 in such a manner that, after such a reset operation, it will always start, with the arrival of the very next pulse beta, to activate one particular line—for example, always line 628A—provided that the very first core of this steering switch has a winding which is connected to line 628A.

Whenever the forty-way current switch 630 has run through a complete cycle, i.e., has activated all of its forty stages successively, the last stage or switch core furnishes an output pulse; there may be positioned a special winding on the last core, or an output line taps current from one of the windings already present. This pulse is being delivered through a line 671 to the input side of a single-shot multivibrator 670 having "nor" gates 671 and 672 interconnected in the manner outlined above. The output of this single-shot multivibrator 670, particularly the output furnished by "nor" gate 672, is amplified by an emitter follower 673, whose output is the ME pulse, utilized in a manner previously explained with reference to FIGURE 11.

This pulse ME can also be called the "erasing of memory completed" signal. Monovibrator 670 receives a gating signal through an inverter 674. The input side of inverter 674 is connected to receive erase signal +B developed during the erasing procedure by erase switch 440. Thus, any pulse applied to the input side of "nor" gate 671 during the normal operating cycle is being suppressed and is not being used by monovibrator 670. Only during the erasing procedure the monovibrator 670 is, in effect, being gated-open by the +B signal, and after the cycle switch 630 has reached the fortieth stage, the +ME pulse is being produced.

*Output network*

It will be appreciated that amplifiers 661 through 666 furnish the input pulses for memory read-out channels 770a, 770b, 770c, 770d, 770x and 770p. The bits applied to these read-out channels during the memory read-out period are faithful reproductions of the original character code signals which were stored on tape 10 and read out therefrom. The difference is that the rate at which the characters successively appear in these read-out channels 770a through 770p is independent from the original tape read-out procedure. As will be described more fully below, the rate of memory read-out is determined solely by the speed with which the bits appearing in these read-out channels 770a through 770p can be evaluated and exploited in the respectively used evaluating device.

Channels 70a through 770p are connected, as shown in FIGURE 14, through inverters 751 through 756 to the input or set side of flip-flops 761 through 766. Flip-flops 761 through 766 respectively comprise set-side "nor" gates 771, 772, 773, 774, 775, and 776. The output sides of the inverters 751 through 756 are respectively connected to the input terminals of "nor" gates 771 through 776. The elements as described thus far constitute the output register 750, destined to furnish output signals which are maintained in the output register for as long as they are needed for evaluation. The bits in the output register 750 are erased therefrom only when the next character, i.e., the next bit combination, is being read out from memory 600. It will be recalled that the memory is being clocked by pulses beta and that each pulse beta is preceded by a clear pulse alpha (FIGURE 12), which clear pulse is applied to input and output registers.

Each of the output register flip-flops has a reset side comprised of "nor" gates 781, 782, 783, 784, 785, and 786. The inputs of these "nor" gates 781 through 786 are interconnected; and they lead to an emitter follower 787, to which are applied the erase pulses alpha, developed by the clocking network shown in FIGURE 12. The output circuit of flip-flops 761 through 766 is designated again by characters 700a, 700$\bar{a}$, 700b 700$\bar{b}$, etc., through 700p and 700$\bar{p}$. These channels are the input lines for decoder 700, and they are being activated and receive bit pulses in precisely the same manner as channels 200a through 200$\bar{b}$ during the memory write-in period. Each different character is characterized by a code that is a specific combination of six bits (see FIGURE 2). By selecting six out of these twelve read-out channels which are complementary in pairs, all the different bit combinations can be represented by coincidence signals.

The decoder unit 700 now comprises pairs of "nor" circuits used as "and" gates and having input lines; i.e., each such "and" gate has six input lines connected to a specific combination of read-out channels selected from channels 700a through 700$\bar{p}$.

Figure 15:
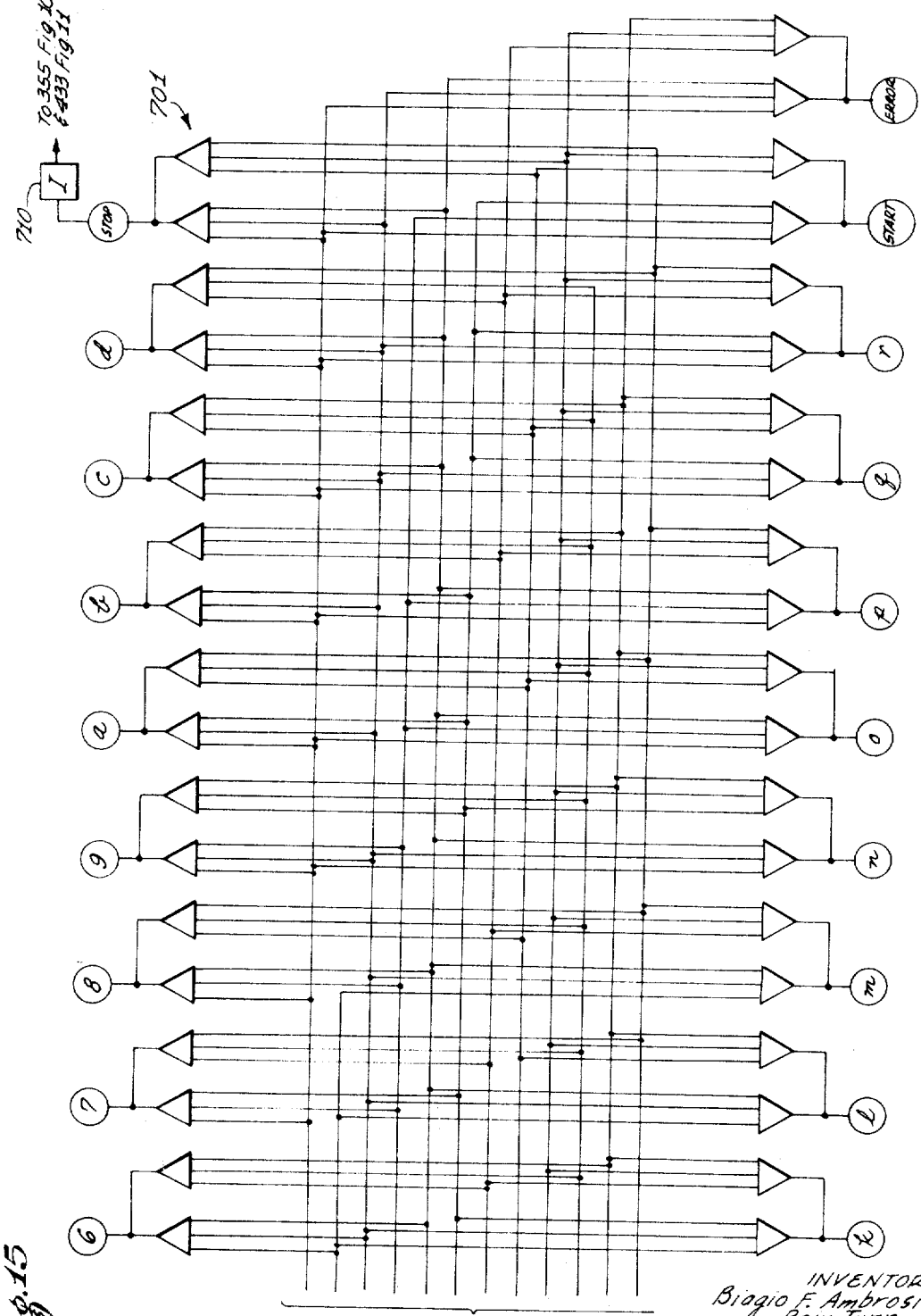
FIG. 15 illustrates further a block diagram of further portions of the decoder unit.

A comparison between FIGURES 14 and 15, on the one hand, and FIGURE 2, on the other hand, reveals that each "and" gate produces a coincidence pulse for a particular character shown in FIGURE 2. There are shown altogether thirty-two such "and" gates; each "and" gate is composed of two "nor" circuits in a manner described previously. For each particular character, as a unique combination of bits in the six tracks, one and only one output signal is produced by one "and" gate. The outputs furnished by these thirty-two "and" gates are signals which have been completely decoded and which can be read out from the memory after a previous tape read-out routine. In view of this completed decoding, it is now possible to re-encode these characters in any desirable away. Since each character is distinguished as one signal appearing at one output terminal, no limitation as to the re-encoding exists.

FIGURE 15 illustrates further the production of the "stop code 2" signal +TC2; it is derived from "nor" gates 701 responding to a coincidence of $a$, $b$, $c$, $\bar{d}$, $x$, $\bar{p}$ in the output register 750, which represents the stop code (see FIG. 2). Thus, there are similar stop-instruction code detectors or decoders connected to the input and output registers.

Proceeding now to the output circuit of decoder 700, the only condition set for the data-evaluating device 800 is the requirement that, after the evaluation of each signal appearing at any of the decoder output terminals has been completed, an indicating signal must be developed. The device 800 is connected through an encoding device 900 to the output terminals of the decoder 700, as illustrated in FIGURE 15. The encoding device 900 may be of any configuration and may furnish any code, since its input is comprised of as many different channels as there are different characters.

FIGURE 16 illustrates that, in a punching device used for data evaluation, there may be provided a synchronous relay 801 which is being used to close a contact 802 every time a hole or a group of holes representative of a read-out character is to be punched. A delay line 803 delays the effectiveness of the closing of contact 802, so that the relatively fast-operating signal logic of the inventive data converter will not overtake a relatively slow evaluation process such as card punching. After the delay has elapsed, a monovibrator 804 will respond. After triggering of the monovibrator, an output pulse appears at terminal 805. This may be the external sync pulse or clock pulse delta. This pulse delta is then fed to the clock and to the clock-pulse timing, forming, and gating device illustrated in FIGURE 12; and the resulting pulses alpha, beta, and omega control the memory read-out process, furnishing the read-out characters, each as a decoded bit, at one output terminal of decoder 700. There will be one decoded bit at the output decoder 700 per clock pulse delta.

Relay 801 and monovibrator 804 may be components directly installed in the data converter in case the evaluating device does not itself produce a pulse or signal at a signal level permitting immediate use of a clock pulse delta. In case the evaluating device has a local oscillator as a clock pulse source, elements 801, 805 and 804 might not be required. However, gate 556 in FIGURE 12 is required. Conversely, if the evaluating device is of such a nature that a relay pulse for relay 801 can be derived therefrom only when there has been a bit evaluation, then gate 556 in FIGURE 12 is not required.

In any event, the external evaluation device serves to close a loop which enables the inventive data converter to operate in a memory read-out sequence determined by the speed of the data evaluating; means have to be provided to insure that a pulse delta influences the clock 550 for calling for the character only when there has been a data evaluation proper of the preceding character drawn from the memory. There are no limitations set for a period of time within which relay 801 has to respond. Relay 801 will respond after evaluation of a previously read out character, and it is immaterial how long this evaluation takes. After due completion of evaluation, the pulse delta, as an externally produced sync pulse, signals the completion of the evaluation of the previously read-out character, and this signaling operates to read out the next character from another address.

As schematically indicated in FIGURE 16, the encoder unit 900 may include a plugboard and encoding "nor" gates. As a simple example, there is shown an encoder component substituted by a "nor" gate 901 having eight inputs. As will be recalled, the output signals of decoder unit 700 are negative coincidence pulses, and one pulse in one decoder output terminal represents one decoder character.

For the re-encoding it is presumed that a specific punch relay 821 will be activated for eight different characters. Thus, a "nor" gate 901 is provided to respond to eight decoded characters, and for any one of the eight decoder output signals a positive signal appears at the output of "nor" gate 901, which positive signal is applied to an inverter 902 as an encoded bit. The resulting negative output of inverter 902 opens a transistor 820 to conduction, and the relay 821 connected to transistor 820 controls a punching process. Of course, for each decoded bit at decoder 700, more than one such punch control relay will be actuated so as to establish a new and different code. The completion of punching is signaled to relay 801.

The evaluating device 800 may further include a start relay 811, driven by a transistor 813. Transistor 813 receives a short pulse, capacitively derived from the "nor" gate 470 of FIGURE 11. Again, elements 810, 811 and 813 may be components installed in the data-converter unit for selective use in case the external evaluating device is not equipped to handle low-power signals derivable from the "nor" gate 470. Additionally, there may be provided a relay 812, driven by a transistor 814 for the duration of the reading period.

*Master clear and erase operation*

In the following, the first and initial phase of operating the data converter, as shown in FIGURES 1 through 16, will be described. This operation is a master clear, reset and erase program routine that is required to precede tape read-out, because the several flip-flop switches, etc., in the inventive data converter may assume arbitrary states of conduction and nonconduction after power is being applied to the entire system. The master clear operation is destined to establish the normal state of preparedness, as among the several switches, and from this normal state a memory write-in and the tape-read routine may proceed.

The master clear and erase operation is initiated manually and it includes a subroutine that is similar to an erasing routine carried out in case of a word error.

The master clear and erase operation will be understood best by following the pulse diagram plotted in FIGURE 17.

At first, switch 310 is set to manual, thus producing the +M signal. The master clear switch 330 is normally in the illustrated position (FIGURE 10). In this position the "nor" circuit 333 furnishes a positive voltage which is an indication that no reset pulse —R is being developed. As soon as the master clear switch 330 is activated (first line in FIGURE 17), the flip-flop 331 changes it state and immediately applies a negative pulse to the output side of "nor" circuit 333. Accordingly, the —R pulse is developed immediately upon activation of the master clear switch 330 (fourth line in FIGURE 17).

The —R pulse which is a reset signal is now being applied to the reset side of each of the flip-flops, i.e., it is applied to the write flip-flop 410, it is applied to the two error flip-flops 421 and 422, it is applied to the read switch 430, to the erase switch 440, to the parity error swtch 460 (all in FIGURE 11) and to the tape switch 360 (FIGURE 10). Additionally, the —R pulse triggers the single-shot mutivibrator 510 to produce a single clear pulse alpha (see FIGURE 12). Since at this moment the tape is not moving, the "nor" circuit 511 of monovibrator 510 is positive at its gamma input. Since the read switch 430 is being reset by the —R pulse, the output of "nor" circuit 512 (FIGURE 12) is also positive, so that in fact this —R pulse will produce and trigger a single clear pulse alpha.

The clear pulse alpha resets the input register 150 and the output register 750. The clear pulse alpha is also applied to the start code detector 220. Thus, during this clearing period the start code detector 220 is prevented from responding. Since the clear pulse is applied to all of the flip-flops of input register 150, these flip-flops might momentarily produce a simulated start code output. In view of the resetting action produced by the clear pulse alpha at its end thereof, none of the code pulses such as ±SC or —TC or —EC or +PC is being furnished by any of the special code detectors. This fact assures that the —R pulse does in fact reset the write switch 410 because, for resetting, the "nor" circuit 411 at the resetting side of flip-flop 410 must be gated open by a positive pulse indicating that the stop code is not present.

In a similar manner, both flip-flops 421 and 422 can be reset because neither an MC nor a —TC pulse is in existence at that moment. The read switch 430 can be reset because a —SC pulse is not present, thus the "nor" circuit 431 is also gated open for a resetting action. The erase switch 440 can be reset because absence of any error results in a positive output pulse at "nor" circuit 434, so that the "nor" circuit 442 and the reset side of erase switch 440 are ready for resetting action which is being carried out by the —R pulse. The parity error switch 460 can be reset because neither a sprocket pulse gamma nor an SE pulse is yet in existence, so that the "nor" circuit 461 can indeed respond to a —R pulse. Finally, the —R pulse may reset the tape flip-flop 360 because neither a start code pulse —TC nor pulse omega nor a parity error pulse nor a write signal W is in existence so that all other inputs or "nor" circut 362 are positive enabling the flip-flop 360 to respond to the reset signal —R to apply braking power to the tape drive.

It will be appreciated that if the reset pulse —R is being applied for a sufficiently long period of time, all of the switches will in fact be reset even if this requires certain preliminary resetting steps. In other words, as long as a —R pulse is being applied for a sufficient duration, all resetting sides of the flip-flops will come into a state of preparedness enabling the —R pulse to indeed reset all such flip-flops.

Of course, it will be appreciated that either one of the switches mentioned above can be turned off by this —R signal and during this initial procedure only if they had been on for any accidental reason. For any flip-flop that is already off the — R pulse remains ineffective.

The master clear and erase operation requires that the selector switch 310 is set to the manual mode, as stated. Accordingly, the +M signal is applied as a positive gating pulse to monovibrator 334. The complete master clear and erase operation requires that the master clear switch 330 be returned to its original position. (In case of push button operation, such button is thus being pressed for the second time.) This return of switch 330 removes the —R pulse and the master clear flip-flop 331 reverts to a state in which the "nor" circuit 332 goes negative. This latter pulse flank operates as a trigger signal for the reset pulse flip-flop 334 which now produces the —RP pulse.

The —RP pulse furnished by monovibrator 334 as a pulse of fixed duration immediately succeeding the reversion of the master clear flip-flop into its original state is utilized in a threefold manner (see FIGURE 11).

The —RP pulse is at first applied to set, i.e., trigger the erase switch 440, and it is accordingly being applied to the set side of "nor" circuit 441. As a result thereof, the leading edge of the reset pulse —RP initiates the erase signal +B.

The second function carried out by the —RP pulse is the triggering of the read flip-flop 430. Accordingly, the leading of the —RP pulse initiates the production of the +D pulse and, after a slight delay, of the read command signal DC. (See also FIGURE 17.)

The third function carried out by the —RP pulse is its passage through the otherwise prepared and gated open "nor" circuit 450. Prior to the production of the —RP pulse, the "nor" circuit 450 has all of its inputs at a positive signal level, thus producing a negative coincidence output. Within the arrival of the —RP pulse a pulse of like duration is being passed through the "nor" circuit 450 as a positive reset command pulse +RC.

The reset command signal +RC is delivered to reset pulse former 629 so as to be useful in the current steering switch 630 (FIGURE 13) for resetting it to position 1. Production of the signal B will operate to furnish a trigger pulse B' as well as an enabling signal potential for the erase clock 560. Now the erase multivibrator 561 starts to oscillate at its own speed. Concurrently thereto the erase flip-flop signal +B serves as a gating open signal for the "nor" circuit 562. Since the signal —R is no longer in existence, the third input of "nor" circuit 562 capable of receiving the —R pulse is again kept at a positive signal level. Thus, the pulses epsilon are being disclosed from the erase clock.

It will be appreciated that the erase clock 561 will continue to furnish clock pulses epsilon until the erase flip-flop 440 is reset to remove the signal B and/or until the —R pulse is for any reason applied to block the gate 562.

The negative pulses epsilon enter the main clock input gate 552 and are transmitted to the clock pulse line 551 as positive clock pulses ε'.

The clock pulses ε' are first applied to the "nor" circuit 512. It will be recalled that the read flip-flop 430 was triggered by the —RP pulse and that the +D pulse is presently in existence. Accordingly, the "nor" circuit 512 is an open gate permitting the +ε' pulses to pass through as inverted pulses so as to appear as negative pulses at the input side "nor" gate 511 of monovibrator 510. Thus, the leading edge of each clock pulse ε' produces a clear pulse alpha.

It will be recalled that the initiation of the master clear operation resulted in the immediate production of an alpha pulse to completely erase any content in the input and output registers. However, this was a single-shot operation. The present production of the pulse alpha is the first one of a train of periodically produced pulses as governed by the erase clock 560, and the leading edge of each such erase clock pulse ε (or ε') triggers an alpha pulse.

The +ε' pulses are additionally applied to the "nor" circuit 522. The "nor" circuit 522 has a second input connected to receive the —P signal when produced. At the present time there is no parity error in existence so that in the absence of any parity error the "nor" circuit 522 is being gated open, and the arrival of the first and of all succeeding +ε pulses causes the "nor" circuit 522 to produce a train of negative pulses. The capacitor 523 together with a not illustrated resistor will cause delay of this negative pulse in triggering the monovibrator 520. The output of the inverter 521 produces the memory clock pulses beta that are delayed by a constant period of time to appear after each clear pulse alpha. Thus, the repetition rate of the memory clock pulses beta is the same as that of the clear pulses alpha, but there is a phase shift in between these two pulses slightly larger than the width of the clear pulses alpha. This phase shift is independent from the pulse train frequency.

The trailing edge of each epsilon pulse triggers monovibrator 530 so as to produce a +omega pulse. The duration and phase relation of the pulses epsilon, alpha, beta and omega are easily detectable in FIGURE 17.

The first pulse alpha resulting from the erase clock is actually ineffective because the registers 150 and 750 were previously emptied as aforedescribed. The first pulse beta operates upon the memory circuit (see FIGURE 13). Since the read command signal +DC is developed and in existence, the read inverter 647 biases the read bus 648. The first pulse beta, therefore, reads out the respectively selected first column and address of the memory matrix 601. Additionally, this pulse beta advances the current steering switch 630 to activate the next column selected for read-out by plug board connection 690. Since the memory erasing covers all of its addresses, the specific plug connection is entirely immaterial.

Whatever content is in the first matrix column and is being read out appears now immediately in the read-out register 750, and any of the outputs of the decoder unit 700 may be activated. However, at this point the content of the memory may be entirely arbitrary and is of no interest whatever. It is, therefore, of importance that no signal is being fed into the evaluating unit that may already be connected externally to the decoder output. This is the reason for the provision of the "nor" gate 470 shown in FIGURE 11. The "nor" gate 470 produces a negative signal upon a coincidence only of a signal indicating proper reading, indicating automatic mode and indicating absence of an error. The negative output signal of gate 470 is being used for triggering the external evaluating device. Absence of a negative coincidence pulse to be drawn from "nor" circuit 470 will maintain the external evaluating device in an inactivated state. Since the clear operation requires manual setting, no negative starting signal is developed at "nor" gate 470. The production of decoded signals in the memory output register as well as the decoder unit thus remains ineffective during the clearing operation because the external evaluating device remains at rest (see FIGURE 16—relay 811 to remain open).

This clearing subroutine will now continue to empty the buffer memory from whatever signals happen to be stored therein. Periodically with each erase clock vibration the pulse pair alpha and beta is being produced respectively clearing the output register 750 and triggering a read-out of another column and address to charge the output register; the output register is being erased by the next clear pulse, etc.

This subroutine continues until all columns and addresses are being read out so that the buffer memory is emptied. This is signified by a pulse from the last stage of steering switch 630 which pulse is being applied through line 671' to the "nor" circuit 671 of the monovibrator 670 (FIGURE 13) to produce the pulse +ME. It will be recalled that the erase signal +B through inverter 674 operates as a gating signal for gating open monovibrator 670 so that production of pulse ME by the monovibrator 670 is not inhibited.

The pulse +ME enters the "nor" circuit 434 (FIGURE 11). The "nor" circuit 434 has a second input which receives positive signals for as long as one of the inputs of "nor" circuit 435 is negative. Since the automatic erase operation is carried out when the device is set to the manual mode, the input of "nor" circuit 435 for receiving the +A signal is, therefore, negative so that the output of "nor" circuit 435 is positive. Accordingly, the "nor" circuit 434 is gated open by the positive output of "nor" circuit 435, and the +ME pulse is passed through as a negative pulse which is a reset-read 2 pulse. The negative reset-read 2 pulse from the "nor" circuit 434 resets the read switch 430 as well as the erase switch 440. Accordingly, immediately upon arrival of the pulse +ME the read and the erase flip-flops are being turned off concurrently. As shown in FIGURE 17, the leading edge of the pulse +ME coincides with reversion of the +B and +D signals to zero or negative potentials, so that the arrival of the pulse ME terminates the production of the signals +B and +D.

Additionally, the reset-read 2 pulse is passed through the "nor" circuit 450 to produce another reset command pulse +RC. This means that at the end of the master clear operation the steering switch 630 is again being reset by the +RC pulse.

The termination of the signals +B and +D of course means that multivibrator 561 ceases to oscillate so that the erase clock 560 is being stopped. Accordingly, with the arrival of the pulse +ME, production of the epsilon pulses will be discontinued and even whatever epsilon pulse was already in existence is being stopped short. This situation can also be derived from FIGURE 17. Thus, there will be produced one more pulse omega, but no further pulses alpha and beta.

It will be appreciated that at this point the only device which is not being cleared might conceivably be the output register 750. This is no disadvantage because after a master clear and erase operation no read-out of the memory will be carried out, but the first step after such a general clearing operation is a memory write-in operation which means that after a master clear and erase operation there still is no evaluation of any data. The very first tape read-out and memory write-in step, however, results in a production of a clear pulse alpha so that at the beginning of memory write-in operation the memory output register 750 is being cleared indeed.

Otherwise, the data converter unit presently described is now ready for tape read-out procedure.

*Automatic memory write-in and tape read-out*

The automatic tape read-out and memory write-in operation is the basic operation for which this data converter is primarily designed. This operation is, of course, initiated by setting the selector switch 310 to prepare the data converter to operate in the automatic mode, and the +A signal is being produced as a positive signal to be maintained throughout this automatic operation. The write-in routine can be followed best from FIGURE 18.

At first, the start switch 320 (FIGURE 10) is being operated twice so that the start flip-flop 321 is turned on and off again. Upon resetting flip-flop 321 the monovibrator 324 is being triggered and the inverter 326 now furnishes the +S start pulse. The +S pulse enters the "nor" circuit 354. Since the $\overline{D}$ signal is true, i.e., there is no memory read-out in progress, the "nor" circuit 354 receives a positive signal at its second input, so that the positive pulse +S is passed through the "nor" circuit 354 as a negative setting pulse for tape control switch 360. The output of "nor" circuit 355 is, of course, positive because neither a signal W nor any other code signal is presently being developed. "Nor" circuit 355 produces a positive pulse so as to gate open a "nor" circuit 361 at the set side of flip-flop 360. Thus, upon arrival of the start pulse +S flip-flop 360 is set to activate the tape start device 351 and to deactivate the tape brake device 352, and the tape is being started.

Soon characters enter the detector range of photoelectric receivers 101 through 106, and the first bit read by any of the photoelectric receivers will result in a response of the sprocket pulse generator 180 and a sprocket pulse gamma is being produced indeed.

This pulse gamma passes directly into clear pulse generator 510 as well as into monovibrator 555 to produce a pulse γ. However, if this very first bit does not pertain to a start code character, only the pulse alpha will be used for clearing the registers 150 and 750 and nothing further happens, because memory write-in requires the existence of a write signal W and of a write command signal WC developed by the decision-making unit in FIGURE 11; neither signal W nor signal WC is yet in existence.

For reasons of simplifying the description, it may be assumed that the very first character and bit combination under the photoelectric receivers 101 through 106 is the start code character.

As soon as this first clear pulse alpha decays, the start code signal then still in amplifiers 111 through 116 triggers the appropriate flip-flops of input register 150. Looking for a moment at FIGURE 2, it can be seen that this start code is represented by bits in tracks *a*, *b*, *c* and *x*— the start instruction is given by LLL0L0. FIGURE 9 illustrates that the −SC signal is not prevented from being produced after the clearing signal alpha decays, so that "nor" gate 224 receives also a positive signal. This −SC signal is maintained at the output side of the start detector 220 until the next clear pulse arrives. FIGURE 18 illustrates the beginning and duration of the −SC signal.

The −SC signal has as its primary function the triggering of the write switch flip-flop 410 (FIGURE 11). Thus, as soon as the start code signal −SC appears in the detector 220, the write signal W is being produced at the output of "nor" circuit 412. The inverter 413 produces the negative write command signal WC. The write command signal WC activates the power inverter 637 (FIGURE 13) as well as the blocking oscillator 610, so that the memory write-in power bus 638 receives negative potential and blocking oscillator 610 is gated open so as to permit the very first memory clock pulse beta to activate the digit drivers 621 through 626.

The trailing edge of the still first main sprocket pulse produced with the appearance of the start code triggers the single-shot multivibrator 555. Accordingly, a first clock pulse γ appears in line 551. This clock pulse, and particularly the leading edge thereof, is applied as a positive pulse to one input terminal of the "nor" circuit 512. However, since no reading operation is in progress, no signal D opens "nor" circuit 512 so that this pulse γ' is being suppressed as far as the clear pulse generator 510 is concerned. This is, of course, correct because the −alpha pulse as clear pulse was already produced directly by the leading edge of the sprocket pulse gamma.

However, this first clock pulse γ' is a positive pulse which after a delay is effective in monovibrator 520 to produce a first memory clock pulse beta, and upon decay of pulse γ' a stop-start program clock pulse omega is produced by monovibrator 530.

The memory clock is blocked only if a parity error exists or if neither a signal W nor a signal D exists.

Production of the memory pulse beta is not exhibited because a −P parity error pulse is presumed not to be in existence so that the second input of the "nor" circuit 522 is gated open to accommodate the first clock pulse in line 551. Also, the "nor" gate 524 opened the memory clock 520 prior to decay of pulse gamma, and, of course, of pulse γ'.

It is important to note that the write signal +W is being produced before the first main sprocket gamma pulse decays, i.e., prior to the first pulse γ'. Since, with the production of signal W, the output of the "nor" circuit 524 (FIGURE 12) goes positive, this blocking of the memory clock 520 is removed. The blocking existed as long as neither writing nor reading operation was in progress. Thus, there must be a start code signal in the register 150 to trigger the write switch, and to enable the memory clock before the first memory address can be called.

With the production of the first memory clock pulse beta, the blocking oscillator 610 opens the digit driver stages 621 through 626. Additionally, the very first memory clock pulse as modified by oscillator 610 activates the driver 628 for appropriate switching action, so that, in fact, the start code is being read into the very first column of the memory matrix 601.

Looking at FIGURE 18, it can be seen that each character which has been read out from the tape by the photoelectric receivers appears in the input register 150 from the end of a clear pulse to the beginning of the next clear pulse, i.e., the beginning of the next main sprocket pulse. This time relation is illustrated in FIGURE 18 particularly with regard to the signal —SC, but it is true with regard to any content of the input register 150 and for each and every character read from the tape.

The +omega signal is being developed whenever the same character signal is still in the input register 150. Looking at FIGURE 9, it is apparent that the pulse omega has as one of its primary functions the periodic opening of the stop code detector 240 so as to monitor whether the stop code is in the input register 150. Of course, the very first pulse omega will not find the stop code in this detector for the simple reason that the very first pulse omega was produced by a start code. But any of the characters subsequently read from the tape may be the stop code, and pulse omega probes just that, but after each code character has already been written into the memory.

The memory write-in routine will now progress at a rate controlled solely by the transport speed of the tape. Each main sprocket pulse detected by the main sprocket pulse detector 180 results in the production of a clear pulse to first empty the input register. Next, the main sprocket pulse gamma and particularly the trailing edge thereof triggers the production of a pulse γ′, succeeded immediately by the production of the memory pulse beta and somewhat later by a program clocking and gating pulse omega. The memory clock pulses beta cause the characters to be written into sequential memory address in that they concurrently activate the line governing drivers 621 through 626 and, of course, each clock pulse beta is pulse-shaped and amplified by oscillator 610 and the responsive two-phase driver 628 switches the steering switch 630 to activate successive addresses.

Assuming that no parity error or no word error occurs, this write-in routine continues until after the stop code is in the register 150. The stop code detector 240 does not immediately produce an output, because the production of the output pulse ±TC by stop code detector 240 is strobed by a gating pulse omega. Thus, at first when the stop code is in the input register 150 the concurrently produced main sprocket completes its action in that it first produces a clear pulse alpha and next it triggers the monovibrator 555 to produce a pulse γ′. This pulse γ′ produces a memory pulse beta so that the stop code is also being written into the memory in exactly the same manner as other characters are being written into the memory. Finally, at the end of this pulse γ′ the last pulse omega is produced and coincidence occurs at the stop code detector 240; positive and negative stop code pulses ±TC are being produced. It will be recalled that the stop code symbol on the tape identifies the end of a word thereon.

The stop code pulses ±TC are being used to perform the following functions: First, the —TC pulse is applied to the "nor" circuit 411 at the reset side of the write flip-flop 410, and the write flip-flop is being turned off, so that immediately thereafter the pulse W decays and the pulse W̄ is being produced.

Of course, also with resetting the write flip-flop 410, the write command signal WC is removed and the write-in column wires of the memory are immediately blocked because the bus 638 ceases to be biased for current production.

Concurrently thereto, the —TC pulse turns on the read switch 430 in applying a negative trigger pulse to the "nor" circuit 431; no —RP pulse being present. The —TC pulse is furthermore passed through the reset command "nor" circuit 450 to produce a memory reset command signal +RC which, in fact, resets the steering switch 630 (FIGURE 13). Thus, at the end of a write-in routine the reset command signal +RC places the steering switch 630 into the position permitting anew the running through of all of the addresses, beginning with the first one and with the next pulse beta. Of course, the production of the read signal as a positive pulse +D is succeeded after a delay of about 10 microseconds produced by a delay device 436, by the production of a positive read command signal +DC which causes the power inverter 647 to apply biasing potential to the bus 648 permitting the read-out columns to operate.

The concurrent removal of the positive D̄ signal substitutes for the reappearance of the W̄ signal, so that "nor" gate 524 continues to gate-open the memory clock monovibrator 520 (FIGURE 12).

The most important function to be performed by the —TC stop code pulse is the stopping of the tape. As can be seen from FIGURE 10, the —TC pulse is applied to the "nor" circuit 355 for resetting the tape flip-flop 360 whereupon the breaking device 352 is activated. The tape thus will come to a standstill immediately. With the stopping of the tape due to control by the —TC pulse, the write-in and tape read-out process of a word is completed indeed.

It will be recalled that the memory write-in was initiated upon occurrence of a start pulse and is now terminated with the production of a stop pulse, and, in the meantime, all characters, not exceeding thirty-eight and printed on the tape in between a start code and a stop code, have been read into the memory. The number of all characters written in the memory is immaterial as long as it does not exceed forty. The periodic production of the sprocket pulses gamma kept the routine of the memory write-in going until the stop code signal was detected by the detector 240, and upon occurrence of the then next following +omega pulse the tape was stopped, the write-in switch was turned off and the read switch was turned on. Concurrently, the memory register 601 has been reset in that the steering switch was particularly being reset.

Returning for the moment of FIGURES 11 and 16, it can be seen that in the absence of an error and with the device set to operate in the automatic mode, the arrival of the pulse +D results in a coincidence at the "nor" circuit 470. The resulting negative output of "nor" circuit 470 is used, setting in motion the externally-controlled read-out process.

Proceeding now with the description of this automatic operation, there appears now an immediate changeover from memory write-in to read-out routine. In FIGURE 19 the first six lines illustrate the left-hand margin the changeover from write-in to read-out. There are shown the end portions of signals W and WC and their termination; and there is further shown the production of the —TC signal switch stopped the tape, the production of the RC signal which was used to reset the memory, particularly the current steering switch, and the turning on of the read flip-flop to produce read signal D and the slightly delayed read command signal DC. Also, the negative signal derived from the data converter for external use during automatic operation and operating as an external start signal and being derived from "nor" circuit 470 is shown in the seventh line of FIGURE 19.

Looking at FIGURE 16, the external start pulse derived from "nor" circuit 470 may be fed to a capacitor 810 to produce a start trigger pulse (see eighth line of FIGURE 19), and for the duration of this trigger pulse the start relay 811 is being actuated (line 9 in FIGURE 19). FIGURE 16 furthermore shows that the signal D̄ also furnished by the read flip-flop 430 is used for preparing the stop relay 812. Upon decay of the D̄ signal, the stop relay 812 will cause the external operation to stop.

It is immaterial whether or not the two relays 811 and 812 pertain directly to the data converter of the invention and are incorporated structurally in such a data converter, or whether they are parts or elements of the external evaluation device which is being provided with jackets or other terminals to receive directly such signals as furnished by gate 470 and by the read switch 430 of the data converter.

It may be assumed that now external operation starts in that the external data evaluating device is being set into motion. It may further be presumed that the sync relay 801 operates its contact 802, the trailing edge of which is delayed by the delay network 803, and after such a delay the single-shot multivibrator 804 is being triggered to produce the first external sync pulse delta for use in the inventive data converter. It can also be said that the single-shot multivibrator 804 may be a part of the inventive data converter and may be incorporated therein. The principal function here is to be seen in that at some part of the external evaluating device there is derivable a suitable sync pulse clocked and strobed in synchronism with the operation of the external evaluating device or clocking and strobing same. This latter pulse wherever and however produced is then subjected to a suitable delay, and for this reason a suitable delay device 803 may also be incorporated in the inventive data converter eventually with an adjustable time constant. The monovibrator 804 when triggered produces a pulse of such a duration and such a signal level that makes it possible for the monovibrator output to be used as a clock pulse in the inventive data converter.

Looking now at FIGURE 12, there is shown the input for this pulse delta which may include a gate 556 that is open during automatic memory read-out. It will be appreciated that at that moment the tape is not in motion, so no sprocket pulses gamma are being produced. Also, no erase operation is in progress so there is no pulse +B available, and, accordingly, the erase clock 560 does not run. Thus, the "nor" circuit 552 is in fact ready and gated-open to receive and pass the externally produced pulses delta into the line 551. The resulting clock pulse δ' is being used exactly as, for example, the pulse ε derived from the erase clock is used. Thus, the leading edge of clock pulse δ' produces first a clear pulse alpha. This clear pulse alpha is of no interest presently as far as the input register 150 and the start code detector are concerned, but it clears the output register 750 and prepares the same for receiving read-out bits. Immediately succeeding the clear pulse a memory pulse beta will be produced.

Turning for a moment to FIGURE 13, it is apparent that clock pulses beta, though presently produced in response to the pulse delta as derived from the external evaluating device, operate upon the memory 600 in a similar manner as aforedescribed. The clock pulse beta can drive the two-phase driver 628 to actuate in steps the current steering switch 630 in precisely the same manner as was described above with reference to the write-in procedure. The sequential calling on the several memory addresses is controlled by the clock pulse beta which is being passed into the driver 628 for stepping the current steering switch 630. The blocking oscillator 610 is closed during memory read-out so that the digit drivers 621 through 626 will not be activated; this is, of course, due to the lack of any write command signal. It will be recalled that a read command signal +DC was produced at the end of the write-in cycle. Accordingly, the read power inverter 647 biases the read bus 648 to conduction.

Thus, the present calling on the first buffer address results in a current as steered from switch 630, for example, into the column wire as governed by diode 641 and into read bus 648.

The first clock pulse beta as modified by oscillator 640 opens the oscillator 680 which receives also the gating signal +DC. The output of oscillator 680 (see transistor 682 in FIGURE 13c) opens the sense amplifiers 661 through 666 so that the read-out channels 770a through 770p may receive the bits stored in the first address and now to be charged into the output register 750. In accordance with the content of the first address or column called on, the flip-flops 761 through 766 will be set or remain reset in accordance with the bit pattern presently read-out, and the decoder unit 700 now receives a signal and will produce at one of its outputs a particular coincidence signal which is then being evaluated.

At the end of each such evaluation the circuit breaker 801 will produce a pulse which, after due delay, will result in the triggering of the next pulse delta which is passed into the clock 550 (FIGURE 12). The resulting pulse δ' as effective in line 551 produces the next pair of pulses alpha and beta. Pulses omega produced after decay of pulse α' have no effect. The external evaluating device closes the loop for the cyclical operation of memory read-out and data evaluation, as stated above. Any respective next pulse delta is used first for triggering the clear pulse alpha to clear the output register 750, and immediately thereafter a memory pulse beta is produced for opening the next memory address for read-out of the content thereof in the manner aforedescribed, and the character read-out is charged into the decoder unit 700 for evaluation by device 800.

The addresses of memory 601 are being called on now in a succession as determined by the plugboard 690. This plugboard 690 ultimately determines the sequence of calling on the several read-out columns and addresses in the memory matrix 601.

It will be recalled that the stop code was also read into the memory. Accordingly, after the memory read-out has almost been completed, the stop code instruction will be read from the memory. As soon as this stop code is in the output register 750 a decoder pulse is indeed being produced. This pulse is the +TC2 pulse developed by inverter 710 (FIGURE 15) as a positive trigger pulse that is being applied to the "nor" circuit 433 (FIGURE 11). Since the B̄ signal is true, i.e., there is no erasing in progress, the existence of the stop code signal in the output register 750 and the production of the next pulse omega produce positive pulse coincidence at the "nor" gate 433, and the so-called reset-read 1 pulse is being produced so as to trigger the reset side of the read flip-flop 430, whereupon the read signal D is being removed.

As one can see from FIGURE 16, the decay of the +D signal causes a response of the stop relay 812 so that, in fact, now the evaluating device is being stopped. It will be appreciated that this is a second link between the inventive data converter and the evaluating device, in that the evaluating device is in fact stopped as soon as the data converter has stopped the memory read-out operating mode.

The reset-read 1 signal is applied additionally to the "nor" circuit 450. Since there is no code whatever in the input register, since no reset pulse −R is being produced, and since, finally, there is no reset-read 2 pulse being produced, the "nor" circuit 450 is gated open by three positive inputs at three of its four input terminals and the negative reset-read 1 pulse is passed through the fourth terminal as reset command signal +RC to reset the memory, and particularly to reset the steering switch 630 (see the fourth line from the top in FIGURE 19 for the production of this +RC pulse in relation to the decaying +D pulse).

The stop code 2 signal +TC2, furthermore, is applied to "nor" circuit 355 (FIGURE 10) which is connected to the set side "nor" circuit 361 of tape control flip-flop 360. The stop code 2 signal is also strobed in the "nor" circuit 355 by the pulse omega that strobed the "nor" circuit 433, so that the tape is in fact being started when the read switch 430 is being duly reset.

It will be appreciated that, in lieu of the two inputs TC2 and omega for the "nor" circuit 355, one could use a single input responsive to the reset-read 1 signal. In other words, one could connect the output of "nor" circuit 433 in FIGURE 11 to one of the inputs of "nor" circuit 355; the starting command for the tape would be insured, also, and in both instances the resetting of the read switch and the starting of the tape will be strobed by the omega pulse.

It will be appreciated that due to the utilization of this +TC2 pulse for terminating the memory read-out process, resetting the memory, and restarting the tape, there is a breakless changeover from the memory read-out process of one word to the automatic resuming of the tape read-out, so that the next word can be read from the tape and can be written into the memory as soon as the memory is emptied by termination of the read-out and evaluation routine. The "nor" circuit 355 (FIGURE 10) permits the restart of the tape only during the automatic mode. For this reason, the +A signal is applied as a gating signal to this "nor" circuit 355, absence of which would suppress the stop code 2 signal. This is important, since during the master clear and erase operation (+M then being true), the stop code 2 signal might develop accidentally in the decoder 700, but this should not start the tape.

In the foregoing, actually a flawless cycle of write-in and read-out operation was being described. This was preceded by a master clear and erase operation and then, upon setting the device to automatic, a memory write-in with tape read-out was carried out. After the receiving of the stop code signal TC, signaling the end of a word, the data converter was switched over to memory read-out. After emptying of the memory during read-out and reading therefrom the stop code as stop code 2 signal has switched the data converter to automatic tape read-out and memory write-in operation. It is, of course, apparent that this alternating memory write-in and memory read-out will continue until either the tape is empty or until one of the error situations occurs which will be described in the following.

Parity error

The situation of a parity error will be explained particularly with reference to the pulse diagram shown in FIGURE 20. For describing this parity error situation it is presumed that a memory write-in routine is in progress, and that this write-in routine had been started by the reset-read 1 pulse after the successful completion of a memory read-out. Thus, FIGURE 20 will be understood best if regarded as a continuation of the situation shown along the right-hand margin of FIGURE 19.

Completion of a prior memory read-out was signaled by a TC2 signal (first line in FIGURE 20). The second line in FIGURE 20 shows the production of the reset-read 1 pulse, and it will be recalled from the foregoing that the production of the reset-read 1 pulse at "nor" circuit 433 resulted from coincidence of a strobing pulse omega, of a stop code 2 signal then being in the output register 700, and of the absence of an erase signal, $\overline{B}$ accordingly being true. Concurrently, the TC2 signal restarted the tape, and for this reason the fourth line in FIGURE 20 shows the tape start flip-flop 360 as now being turned on. Of course, nothing happens until the first character is under the photoelectric reader, and the first sprocket pulse gamma is being produced by the "or" gate 180. The first sprocket pulse gamma produces again the clear pulse alpha and it may be said that with the appearance of this pulse alpha also the output register 750 is being emptied completely (TC2 removed). The input register 150 is being readied by this first clear pulse alpha to receive the bit combination that is responsible for the production of this first clear pulse. Since we are in the middle of an automatic routine, it is, of course, natural that this first character is the start code producing the signal —SC. The pulse —SC turns on the write flip-flop to produce a pulse W and also the write command signal +WC. This procedure does not require a detailed description at this point because it embraces the same events described with reference to FIGURE 18. Thus, at the end of the first sprocket pulse gamma a monovibrator 555 (FIGURE 12) output pulse in line 551 produces a pulse γ'. As a result thereof, the pulse forming device 500 produces a pulse beta, and at the end of this first pulse γ' the first pulse omega is being produced.

The start code is now being written duly into the memory by this first pulse beat. The next character now may be presumed to contain a parity error, i.e., it shall further be presumed that tracks a, b and c have an even number of bits, and that tracks d, x and p have an odd number of bits. Of course, even this odd-numbered character produces a main sprocket pulse (γ2) and there is a clear pulse (α2) being produced which removes the start code from the input register 150.

With the decay of the clear pulse α2, the odd-numbered bit combination appears in the input register. It will be recalled that a parity error is indicated by the fact that the outputs of the "nor" combinations 257 and 267 in FIGURE 9 are of unequal polarity.

Specifically, tracks a, b and c may have an even number of bits (zero or two), so that "nor" gate combination 257 furnishes a negative signal and, accordingly, inverter 258 furnishes a positive signal. Tracks d, x and p are assumed to have an odd number of bits, so that gate 267 furnishes a positive signal (see FIGURE 20). Accordingly, in such a case the outputs of the "nor" circuits 259 and 269 are of unequal polarity, and a positive and a negative pulse at the input side of "nor" circuit 260 is responsible for the production of the parity error code signal +PC.

It should be observed that the "nor" circuit 260 does not immediately develop the +PC signal upon the appearance of a disparity of the character momentarily in the input register. The parity error switch 460 remains reset for as long as the negative sprocket pulse gamma is applied to the "nor" circuit 461. When the tape has moved to remove the faulty character from reader 100, the sprocket pulse gamma is removed, and the +PC signal is thereby converted into a +P parity error signal by flip-flop action. The signal P will remain until the flip-flop 461 has been reset and regardless of any change at the input side of "nor" circuit 260. The reason for this measure was explained above, and it is repeated, that in case of an incompletely printed bit on the tape, it might at first appear that there is a parity error, but when finally the incomplete bit is detected, no error exists. Only when a bit is no longer detected by any reader 101 to 106 can one be sure that all bits or detectable bit portions of the character have been detected and that the character is now out of the range of the reader. It has to be observed, further, that the clearing of the input register by a pulse alpha succeeding immediately the leading edge of a main sprocket pulse, and the subsequent setting of flip-flops of the input register 150, in accordance with the character, will not be carried out at precise synchronism among these input register flip-flops, nor is there a requirement for such synchronism so that there may be short moments in which an odd number of input register flip-flops appears to be set. This could cause a transient signal and for a short time there may appear a difference in polarity of the signals as applied to the two input terminals of "nor" circuit 260. This might suffice to set flip-flop 460. In order to suppress the effect of such temporary dispolarity, the parity error flip-flop 460 is inhibited from responding during the time in which the flip-flops of the input registers are being reset and set anew, which is the time of the duration of a sprocket pulse gamma.

The existence of a parity error is effective in various parts of the inventive data converter. Looking at FIGURE 11, it is first apparent that the existence of a parity error immediately results in the production of the +P and the —P signals respectively drawn from the outputs of "nor" circuits 260 and 461, because "nor" circuit 260 constitutes the set side of flip-flop 460. The —P signal is fed exclusively to the clock pulse timing, forming and gating device 500 and is particularly effective in blocking the "nor" circuit 522 immediately upon appearance of a parity error signal —P, which means that immediately upon the appearance of a parity error the positive bias is removed from the single-shot multivibrator 520, and the production of the memory clock pulse beta is inhibited. A pulse beta normally is produced somewhat delayed after decay of a pulse gamma. The undelayed production of signal −P now safely inhibits subsequent beta pulse production. Accordingly, it is made sure that as soon as a character with an odd number of bits appears in the input register and the character on the tape has left the reader, the write-in process for the memory is being stopped.

The next effect of the parity error is the applying of the pulse +P to the "nor" circuit 356 in the tape control device shown in FIGURE 10. At the end of the respectively occurring sprocket pulse $\gamma'$, the start-stop program clocking pulse omega is still being produced for strobing and immediately upon occurrence of this pulse omega there is coincidence at the input side of "nor" circuit 356 so that, in effect, the tape flip-flop 360 is being reset and the tape stops. The stopping of the tape can be seen in the fourth line in FIGURE 20 in which the tape start flip-flop 360 is shown to reset at the appearance of this particular pulse omega.

It can be seen that there exists a condition for pulse $\gamma'$: its duration must not exceed the pause in between succeeding pulses gamma within a word. The pulse omega strobing, i.e., phasing and timing the stopping of the tape drive, must be effective prior to the appearance of the next character under the reader 100.

Since now the tape has been stopped, no new sprocket pulses will be produced so that the parity error flip-flop 460 will not be reset until certain steps have been taken. Now the correcting device 120 shown in FIGURE 8 is to be used. Since the faulty character is visible to the operator, he will find why there is an odd number of bits in the register 150, and he will detect the cause thereof. The ganged switches of the bit adding or setting switch 121 and the bit subtracting or resetting switch 125 are now being set by him (time $t_1$ in FIGURE 20) to influence the particular flip-flop, the corresponding track of which contained an error or was not being read out properly, etc. Next, he applies set-reset switch 124 to either set or reset the previously selected flip-flop (time $t_2$). The manually carried out correction of the input register results now in an even number of bits in the input register, and it is assumed that, in particular, the bit number in tracks $d$, $x$ and $p$ is being made even. Thereupon there is a change of signals in the input of the parity error detector, and particularly the output of inverter 268 goes positive again. FIGURE 20 illustrates this changeover in signals for the time $t_2$.

At the end of the correcting operation the switches 121–125 are being placed by the operator into the position in which arm 126 engages contact 128 so that by means of switch 124 a negative input is applied to the inverter 129 (time $t_3$) and a +SE signal is being produced with +SE signal is applied to the clock and particularly to "nor" circuit 462 thereof (FIGURES 11 and 12).

The corrected character will now be written into the memory by pressing the start switch 320 twice, resulting in an operation of the start flip-flop 321 with a subsequent production of the start pulse +S (see the third line in FIGURE 20, right-hand portion). The concurrent occurrence of start pulse S and of the pulse SE, both as positive signals, produces a coincidence in "nor" circuit 462 (FIGURE 11) which provides a reset pulse for the parity error flip-flop 460. Thus, as one can see from the diagram of FIGURE 20, with the initiation of the start pulse S, the signals +P and −P indeed are removed from the network of the data converter.

The start pulse +S when passed through the gated-open "nor" circuit 462 appears as a single-shot clock pulse in "nor" circuit 552. Thus, a single-shot clock pulse is passed into line 551. As a result thereof, a memory clock pulse beta, which was being suppressed before, is now being produced, because upon termination and correction of the parity error situations, the parity error signal −P is being removed as a blocking signal from the gating entrance of "nor" circuit 522. There is now a positive gating-open signal applied to this gating input of the "nor" circuit 522, and the single-shot clock pulse, manually initiated, can enter and pass through and to the monovibrator 520. As a result, a single memory clock pulse beta is being produced.

Since the write flip-flop 410 and the production of the write signals W and WC were not impaired nor interrupted by the existence of a parity error, the pulse beta immediately causes memory write-in of the now corrected signal as stored in input register 150.

This manually-initiated clock pulse also produces a pulse omega which remains ineffective (unless the corrected character was the stop code). The start pulse S, of course, also restarts the tape through the "nor" gate 354.

The arrival of the first new character on the now restarted tape in the photoelectric detector range results in another main sprocket pulse $\gamma 3$, and the leading edge thereof now produces a pulse $\alpha 3$. It will be recalled that the manual writing in of the corrected character was not accompanied by the production of a pulse alpha which is understandable since the pulse in line 551 affects the monostable circuit 510 only during read process; a clock pulse in line 551 requires a positive pulse D for gating-open the "nor" circuit 512. During a period of time other than the memory read-out period, the clear pulse alpha can be produced only by a sprocket pulse directly. It will be also be recalled that the existence of a parity error resulted in the stopping of the tape so that during the manipulation of correcting the register content, the tape was, in fact, stopped and no sprocket pulse had been produced. Now, after the restarting of the tape, a next sprocket pulse arrives and results in the production of a clear pulse which now clears the input register 150. It can be seen from FIGURE 20 that the clear pulse $\alpha 3$ and the pulse omega which resulted from the pressing of the start switch S, might overlap, which is not of interest.

After decay of clear pulse $\alpha 3$ another character bit combination will appear in the input register 150, and the automatic operation will be resumed. In FIGURE 20 it is assumed that in each of the groups of tracks $a$, $b$ and $c$ and $d$, $x$ and $p$ there is now an odd number of bits, so the outputs of inverters 258 and 268 go negative. The reset switch device 120 will be turned off at some time whereby the pulse SE is being removed from the network. It is not critical when this is being done because the pulse SE was seen operating in conjunction with the start pulse. So, as long as the start switch is not being depressed again, any continued existence of the pulse SE is not critical.

Word-skip routine

Another situation might raise in that a word as recorded contains an error. Either it is completely incorrect or it contains uncorrectable bits.

The human recorder while preparing the recording tape discovers that he has made an error. He is instructed then to proceed as follows: He records a word with random bits and in this word he includes a record of the error code which is a bit in each one of the tracks. The recording device is presumed to put the error code next to the stop code (see FIGURE 2). During tape read-out the words appear under the reader in inverse succession so that the word with the random bits and with the error code will be read out first. Particularly during a normal write-in routine it will occur that after a start code and a number of characters have been read from the tape and used as usual, there will appear the error code. The inventive data converter is now set so that it erases and suppresses in effect any word containing the error code and the following word which actually contained the error. This word error erasing is being carried out as a word-skip subroutine which automatically interrupts the word evaluation cycle upon appearance of a special code signal, the error code; a selected number of words is being skipped and the device resumes automatically the evaluation process with the next following word.

Reference is now being made to FIGURE 21 which illustrates the pulse diagram of this particular word-skip subroutine. The time from which the several pulse diagrams are plotted (lefthand margin) is set in the beginning of a write-in routine so that the tape start flip-flop 360 is on, the write signal W and command signal WC are produced, and main sprocket pulses appear at regular intervals. Now, as the first illustrated clear pulse decays it appears that the error code is in the input register code 150. The error code pulse —EC is being drived from the error code detector 280 (FIGURE 9). The pulse —EC now is applied to the error switch 420 comprised of the two flip-flops 421 and 422 (see FIGURE 11), and the two flip-flops are being turned on. Accordingly, both inputs for "nor" circuit 427 go negative and a signal +E and a signal —E are being produced. All of these events transpire simultaneously with the decay of the very first clear pulse alpha and appearance of the error code in input register 150.

The signals ±E are used in several different ways. The main sprocket pulse gamma which was produced by the character representing the error code, of course, also produces a γ' pulse fed to line 551 and a memory clock pulse beta, as well as an omega pulse, results therefrom. The error code is momentarily being written into the memory by a normal write-in procedure.

The error signal +E is being applied also as a negative pulse to the input side of the circuit 470. Accordingly, the "nor" circuit 470 is inhibited from producing a coincidence pulse as a negative starting pulse to be applied to the external device for as long as the error signals ±E exist. Thus, the error signal applied as a negative signal to this "nor" circuit 470 blocks specifically the response of start relay 811 (FIGURE 16). Furthermore, the error signal —E has been applied as a negative pulse to the "nor" circuit 435. During automatic operation (presently described) and in the absence of an error this "nor" circuit 435 receives positive coincidence pulses and thus produces a negative pulse at its output side which, in effect, blocks the "nor" circuit 434. Now, with the existence of an error, the output of "nor" circuit 435 during automatic operation is inverted into a positive pulse operating as a gating-open signal for "nor" circuit 434. "nor" circuit 434 is thus rendered capable of transmitting a pulse ME when produced later on. The error code character responsible for the production of the error signals ±E thus prepares the data converter for the substitution of the normal routine by the word-skip subroutine. It will be recalled that during the master clear and erase operation the situation was similar with regard to the gating-open of "nor" circuit 434. However, the master clear and erase operation required the existence of a manual setting so that signal A was not true while there was an absence of an error signal. In either case, the output of "nor" circuit 435 is positive during such special operations only.

It will be recalled that the error code signal was recorded on the tape immediately next to the stop code. Accordingly, and since the tape presently is still in transport, this stop code will arrive next under the photoelectric detector and reader 100, and the main sprocket pulse resulting therefrom will first produce, as shown in the drawing of FIGURE 21, a clear pulse alpha, thus removing the error code from the register 150. Upon decay of this clear pulse, the stop code is in the register 150. Another pair of pulses beta and omega is being produced, and the stop code is written into the memory, since the stop code detector 240 is strobed by the pulse omega. This last-mentioned pulse omega produces a pulse pair of +TC and —TC.

At the time $t_5$ (see FIGURE 21), the pulse —TC, of course, stops the tape drive in that it resets the flip-flop 360 (see line 1 in FIGURE 21). The pulse —TC also carries out its other functions, such as resetting the write flip-flop 410, to remove the write signal W and the command signal WC. All this is similar to the termination of a normal write-in routine.

The production of the signal +E indicating the existence of an error gates open the "nor" circuit 443. The pulse +TC that is being derived from the stop code detector 240 through the inverter 245 in FIGURE 9 can now pass through the gated-open "nor" circuit 443 and a negative trigger signal arrives at "nor" circuit 441 at the setting side of the erase flip-flop 440. Accordingly, with the arrival of this pulse TC the erase flip-flop is being set and the erase signal +B is being produced. This is the main step in interrupting the normal program routine.

The —TC signal, of course, also turns on the read flip-flop 430 in the usual manner since the —TC pulse is being applied directly to the "nor" circuit 431 on the setting side of the read flip-flop 430 so that in due sequence the pulse +D and, with slight delay, the read command signal +DC are being produced.

Finally, the pulse —TC is being passed through the "nor" circuit 450 for the production of the reset command pulse +RC. This reset command pulse resets the steering switch 630 of the memory to the first stage.

It will be appreciated that, with the exception of the turning on of the erase switch, the routine carried out thus far is similar to the normal termination of a memory write-in procedure and the changeover to the memory read-out procedure for data evaluation, but the setting of the erase switch during the automatic mode signals the interruption of the regular program routine and the insertion of a subroutine. The duration of the subroutine is governed by the existence of the error signal E.

The data converter is now in a state of operation in that the memory is being readied for read-out. The external evaluating device is not being started, but the erase flip-flop 440 is being turned on. With the production of the signal +B, the erase clock 560 is being started (see B' in FIGURE 21), and the first full oscillation results in the production of an epsilon pulse which is being passed through gate 552 as a clock pulse, and immediately pulse triplets alpha, beta, and omega are being produced. The pulses beta run the memory now in a manner similar to that outlined with reference to the master clear-and-erase operation, whereby the content of the memory is read out but suppressed.

It is a feature of the inventive data converter, and a specific example of the concept of an automatically introduced word-skip routine, that with the detection of a word error the master clear-and-erase operation is being initiated and carried out automatically. The erasing routine is being carried out at a rate determined exclusively by the erase clock 560.

It is presumed, though not necessary, that the stop code is always written into and read out of the last memory address. When the stop code is being read out from the memory and decoder 700 as a +TC2 signal, the tape starting flip-flop 360 is turned on. Of course, the turning on of the tape drive is strobed by the last omega clock pulse produced by the erase clock and there is, of course, still automatic operation so that positive coincidence at the "nor" circuit 355 sets the tape flip-flop 360 (FIGURE 10). The steering switch 630 furnishes a pulse for the "nor" circuit 671 in monovibrator 670 (FIGURE 13). The erase signal +B has opened this monovibrator 670. As a result thereof an ME pulse indicative of the fact that the content from the memory has been erased is being produced (pulse $ME_1$ in FIGURE 21). The pulse ME is passed as a positive pulse to the "nor" circuit 429. However, since the output of flip-flop 422 and "nor" circuit 426 is negative, no coincidence exists and the output of "nor" circuit 429 is not capable of producing a resetting pulse for the flip-flop 421. The pulse ME further is passed into the "nor" circuit 434 to produce a reset-read 2 pulse. It will be recalled that during this word error routine the "nor" circuit 435 produces a positive signal for gating open "nor" gate 434. The reset-read 2 pulse, which is a negative output pulse of "nor" circuit 434, performs the following actions: First of all, it stops the erase clock 560 since it resets the erase flip-flop 440. Accordingly, the erase clock stops immediately. Next, the reset-read 2 pulse resets the read switch 430 so that the read signals D (and +DC) are being removed from the circuit. Finally, the reset-read 2 pulse is passed into the "nor" circuit 450 to produce a reset command pulse +RC which resets the steering switch 630 (see pulse RC$_2$ in FIGURE 21).

The next following character of the presently moving tape is used to produce the sprocket pulse gamma, and a clear pulse alpha, of course, erases any content from the input and output registers. It may be assumed that the character presently under the photoelectric detectors and producing the presently considered main sprocket pulse gamma is the start code, which start code is now indicating the beginning of the word in which, in fact, the error occurred. Appearance of this start code is denoted for time $t_6$ in FIGURE 21. The start code now appearing results in a —SC pulse which, as can be seen from FIGURE 11, resets the error flip-flop 422. This resetting action now produces a positive gating pulse for "nor" circuit 429 for the next following ME pulse, which, however, will appear only later. The positive output of the reset side of "nor" circuit 426 of flip-flop 422 has no effect on the "nor" circuit 427, because as long as there is at least one of its inputs negative "nor" circuit 427 will produce a positive signal. Thus, the production of the signals ±E is not terminated. The —SC signal also sets the write switch 410.

The word containing the error is now, in fact, being written into the memory in the usual manner. At the end another stop code is being detected. This stop code as strobed by a pulse omega at time $t_7$ terminates the write-in procedure in the manner as outlined above (see pulse —TC'). It stops the tape also at time $t_7$. As can be seen from FIGURE 10, the —TC stop code signal directly resets the flip-flop 360 independently from the existence of an error signal or any other signal.

The —TC pulse is used additionally in various manners. It will be recalled that one of the functions of the stop code is to produce a reset command signal +RC for resetting the memory, and particularly of the steering switch 630 thereof. Additionally, the stop code pulse TC turns on the read switch 430 again to produce a pulse D. Finally, the pulse TC operates again to turn on the erase switch 440, still at time $t_7$, since the "nor" circuit 443 (FIGURE 11) is still being gated open by a +E signal drawn from "nor" circuit 427. Thus, the erase clock 560 (FIGURE 12) is being turned on again.

It will be recalled that the continued existence of the error signal E still inhibits the furnishing of an output by "nor" circuit 470, so that even for the second word, which now in fact does contain the error, the external device is not being started. The erase clock 560 starts to run, and the clock pulses epsilon produce pulses alpha, beta, and omega.

Clear pulses alpha are being produced, since the ε′ pulses can pass through open gate 512 because a +D pulse exists during this memory read-out and erase operation. The pulses beta cause the memory to be read out at the rate determined by the erase clock 560. The absence of an output pulse at "nor" circuit 470 prevents the content of the memory from being used externally.

Just prior to the end of memory read-out, there will appear the stop code 2 (TC2) signal at decoder 700 to restart the tape drive. In FIGURE 10, the TC2 pulse is strobed by a pulse W during automatic mode. At the end of the read-out operation of the faulty word, time $t_8$, the pulse ME2 is being produced, which pulse ME2 (FIGURE 21) is permitted to pass through the "nor" circuit 434 during this error operation, and the resulting reset read 2 pulse thereby resets the read flip-flop 430 as well as the erase flip-flop 440, thus terminating this erasing and read-out operation subroutine.

Now, additionally, this pulse ME is permitted to pass through the gated-open "nor" circuit 429 to reset flip-flop 421 so as to remove the signal E. Removal of the signal E again means a blocking of the "nor" circuit 434. Removal of signal E opens the "nor" circuit 470, and it closes the "nor" circuit 443. Since the tape has been started, automatic write-in procedure can now be resumed, as indicated at the righthand margin of FIGURE 21, showing the start code of the next word, and showing further the resulting write signals W and WC, clear pulses, etc. The concurrent removal of signals E and V, together with the restarting of the tape, i.e., the concurrence of a pulse TC2 and of a pulse ME, terminates the subroutine and returns the data converter to normal program routine and to the write-in of the next word on the tape.

Manual operation

It will be recalled that the master clear and erase operation was carried out with the switch 310 being set to operate in the manual mode and to produce a pulse +M. It will further be recalled that the setting into a manual operation did not inhibit the automatic erasing and the automatic production of memory pulses by means of the multivibrator-erase clock 560. It will further be recalled that the correction of a parity error was carried out manually by manipulating the switches in the correcting device 120 (FIGURE 8). In this connection it will be recalled that a corrected character can be written into the memory manually by operating the start switch 320.

The manual operation described in the following covers more fully and particularly a manual writing into the memory as well as manual read-out. It is, of course, assumed that the switch 310 is set to the manual mode so that the pulse or signal +M is being produced throughout the following routine. As far as the tape drive switch 360 is concerned, it can be seen from FIGURE 12 that the absence of the +A signal inhibits the "nor" circuit 355 from producing a pulse upon the occurrence, if any, of a signal +TC2 at the decoder output so that no automatic starting of the tape drive is possible. However, the lack of the +A signal does not inhibit manual starting.

A manual writing-in operation in general is initiated by setting the mode switch 310 to manual; the +M signal exists throughout this mode. For writing into the memory one character only, the operator now presses the start switch 320 twice; thereby the flip-flop 321 is being set and reset, and the trailing edge of flip-flop 321 produces the start pulse S. The "nor" circuit 354 is open during the absence of a D signal, and this permits the +S pulse to pass as an inverted trigger pulse to the set side 361 of the tape drive switch 360 and the tape is, in fact, being started. Contrary to automatic operation, now a +M signal is applied to one terminal of the "nor" circuit 357.

After the tape has been started and as soon as a first character on the tape 10 comes into the range of the photoelectric receivers 101 through 106, the sprocket pulse detector and generator 180 will produce a first sprocket pulse gamma. This production does not depend on any particular mode of operation.

The single pulse gamma is fed as a clock pulse to the timing, forming and gating device 500 (FIGURE 12) and particularly to the set side "nor" gate 511 of the monovibrator 510. The triggering of this monovibrator 510 is also independent of the mode of operation so that a clear pulse alpha is produced in any event after the tape has been started to run for any reason, and after the first character has reached the photoelectric receivers. Accordingly, the first clear pulse alpha clears the input and output registers 150 and 750, respectively.

As soon as the clear pulse alpha decays, a particular character is now in the input register 150. Looking at FIGURE 11, the top portion thereof, it can be seen that the pulse W, i.e., the activation of the write switch 410, is also independent from the mode of operation, and looking at FIGURE 13, it can be seen that the existence of a signal +WC, i.e., the write command signal, is essential for memory write-in in any mode. Thus, in the automatic as well as in the manual mode, it is necessary that a start code signal is first being received.

Assuming that the first character read by reader 100 is, in fact, a start code signal, a —SC pulse will be developed by detector 220 (FIGURE 9), triggering now the write switch 410 so that the signals W and WC are, in fact, being produced.

Returning for a moment to FIGURE 10, it can be seen that upon production of signal W the second positive gating pulse is applied to the "nor" circuit 357. The tape so continues to run, and when the start code character leaves the detector range of the photoelectric reader 100, there appears the trailing edge of the sprocket pulse gamma, and the monovibrator 555 is being triggered. The manual setting and the production of the +M signal reflect on the "nor" gate 552 only when there is existing a pulse +D (see "nor" circuit 553), or when a manual correction of the content of the input register 150 is being carried out, so that there is a signal SE at "nor" circuit 562. Neither situation is presently true; thus, during the presently conducted operational steps, the usual γ′ pulse for the write-in operation is being produced, as a single-shot pulse, and in effect a beta and omega pulse are being duly produced. The memory clock pulse beta triggers the memory control device in a manner previously described and the start code character presently in the input register 150 is being written into the memory. At the end of this γ′ pulse a pulse omega is being produced which now is permitted to pass through the "nor" circuit 357, and the tape drive switch 360 is being reset, i.e., the tape is being stopped by this pulse omega. Stopping occurs in between characters on the tape relative to reader 100.

It can be seen that the condition for the duration of the pulses γ and γ′ outlined above is also of importance here. The trailing edge of the γ′ pulse produces a pulse omega to turn off the tape drive. In manual operation it is necessary that this trailing edge plus the duration of pulse omega does not appear before the next leading edge of the next pulse gamma. This means that the tape speed must result in a spacing in between two gamma pulses that does not exceed the recovery time of the monovibrator 555.

The fact that the tape has been stopped does not impede the continuance of the W signal, i.e., the write switch 410 remains on. Thus, the next character and all of the next following characters on the tape can be written into the buffer memory.

The next character can be written into the memory simply by repeating the initial step, i.e., in pressing the start button 320 twice. Accordingly, again a pulse +S is being produced, the flip-flop 360 is being set again, the tape will start, and another character will enter the detector range of the photoelectric receivers 101 through 106 and read out this next character. There is again at first the production of a sprocket pulse gamma, and, of course, this results in the production of a clear pulse alpha. Upon decay of the sprocket pulse gamma a pulse pair beta and omega is being produced which results first in a write-in operation of this particular character then in the input register 150, and the pulse omega again stops the tape.

It will be understood that the tape is being transported from character to character, and for each transporting step the switch 320 has to be depressed twice. The production of the pulse S operates also as a tape read-out command signal in that a single character that is being read out is also being written into the memory.

If, for any reason, a parity error occurs, the production of the pulse +PC and the concurrent production of the pulse ±P indicating the existence of a parity error signal are also effective as in the automatic mode. The pulse —P immediately blocks the "nor" circuit 522, and no memory clock pulse beta is produced. The character is not written into the memory. The pulse omega continues to be produced so that the next pulse omega stops the tape through gates 356 and 357.

The correction of the parity error is then carried out in the same manner described above, and it will be recalled that the corrected character is being written into the memory by depressing the start switch 320 twice whereby the pulse pair beta and omega is derived through gates 462 and 552. The manual operation of writing into the memory is then continued.

It can be seen further that any combination of manually set bits and characters can be written manually into the memory. In other words, the tape reading unit can be overridden completely. Again, the device is set to the manual mode to produce the signal +M. There either may be no tape loaded into the reader at all, or the tape ready switch in FIGURE 10 is open, or both. The tape drive and control unit can thus be completely overridden so that, in fact, there is no tape being read out. The photoelectric receivers 101 through 106 will produce the no-bit output for any channel.

Now the register 150 is being charged as follows. The register is being loaded by manually operating the correcting device 120 and by reading into the various flip-flop stages of the input register 150 the bit combination as is desired. After this has been completed, the switches 121–125 are operated so as to apply a negative pulse to the inverter 129, and a positive pulse +SE is being produced. This positive pulse +SE now prepares the "nor" circuit 462 for the gating of pulse +S. The manually set register content is thereafter being read into the memory by pressing the start switch 320 twice, whereby a pulse +S is being produced. The start pulse +S passes through the gated-open "nor" circuit 462, and the "nor" circuit 552 produces a single clock pulse having the duration of start pulse S, and no parity error is in existence. If a parity error exists, the character will not be written into the memory, and suitably placed lamps inform the operator about his mistake.

Upon pressing start switch 320 twice and after the usual delay, the monovibrator 520 is triggered, and a single memory clock pulse beta is produced. Production of a pulse alpha is inhibited, and such a clear pulse is not needed. It is, of course, understood that the manually charged register 150 can be written into the memory only if the command signal WC is being produced, or if the write switch 410 has been turned on previously and is still on. It is, of course, possible to design the power inverter 637 so as to be selectively operated manually so that the WC signal is simulated. Alternatively, the memory may be prepared for such manual write-in operation by first simply charging the register 150 manually with a bit combination that represents the start code. The mere presence of this combination results in a coincidence at the start code detector 220. The resulting —SC pulse immediately triggers the write switch 410 since this write switch does not require any gating operation.

Thus, a purely manual operation is possible in charging the register 150 appropriately through the manipulation of the correcting device 120 and after completion of each manipulation, i. e., after the charging of the register with the desired character, the switches 121–125 are operated to produce a pulse SE whereupon the start switch 320 is activated twice and the character just set is being written into the memory.

After having in any way, i.e., by way of using characters on the tape or by manipulating the correcting device 120, or both, written into the buffer memory several characters, it is necessary to terminate the write-in procedure.

This, of course, does not mean that the operator should just stop doing anything, but it will be recalled that during the automatic mode, the stop code instruction terminated the write-in; the same holds true for the manual mode. It will be recalled that at termination of write-in the current steering switch 630 is being reset by the pulse +RC and it will also be recalled that this pulse +RC is being derived from the gate 450 (FIG. 11). The pulse +RC can be produced manually as follows: The termination of the write-in operation also requires the resetting of the write switch 410. Thus, a writing-in operation can be stopped in charging the register 150 with the stop code. Again, this can be done by bit simulation through the device 120 or by reading from the tape the stop code when it has arrived under the reader 100.

Immediately upon writing the stop code into the memory, pulse omega produced strobes the development of the —TC pulse at the output side of the stop code detector 240. As can be seen from FIGURE 11, the pulse —TC immediately results in a resetting of the write switch 420. Additionally, the —TC pulse is applied to the reset command gate 450 and the resulting pulse +RC resets the steering switch.

It will be understood, of course, that it is also possible to manually control read-out of the memory. Read-out of the memory, as it will be recalled, requires the existence of the read-out command signal DC since the read inverter 647 is to bias the bus 648, and the read-out amplifiers 661 to 666 have to be activated. The signal DC is being produced by the read switch 430 when turned on. During the automatic cycle the read switch 430 is turned on by the same signal (—TC) that turns the write switch 410 off. This holds true also for the manual mode. Thus, the stop code read into the register 150 above will also turn the read switch 430 on, and the signals D and DC are being produced. Neither the write nor the read switch depends on mode signals A or M.

The memory is being read-out by pressing the start switch 320 twice. It can be seen from FIGURE 10 that the production of the pulse +S does not start the tape, because the signal $\bar{D}$ is not true as a positive signal so that the second input of the "nor" circuit 354 is negative and the existence of a pulse +S at the second input of "nor" circuit 354 is ineffective. Thus, the tape drive switch 360 will not be set. It is repeated that the other mode of turning on the tape drive switch 360 is inhibited by the lack of the +A signal so that the "nor" circuit 355 is also blocked. Thus, contrary to the read and the write switches, the tape drive switch is mode depending.

The production of the pulse S, however, is now effective in "nor" circuit 553 shown in FIGURE 12. "Nor" circuit 553 produces a negative output upon coincidence of the +M signal which is true, of a +D signal which is also true, and of a +S signal just produced. A single-shot clock pulse is simulated at the output side of "nor" circuit 552, which clock pulse has a duration of the S pulse. The "nor" circuit 512 is also gated-open by the +D signal, and a clear pulse is now produced immediately. This pulse alpha clears the output register 750; it also clears the input register 150 from the previously read-in last signal. But for memory read-out, clearing of the input register is not essential. A memory clock pulse beta is being produced next, and read-out of the first address is being had in a manner as aforedescribed. Thus, after the production of a pulse beta, the character in the first address is passed through amplifiers 661 through 666 into the output register 750, and at one output terminal of the decoder 700 there will appear a single bit signal that is representative of the character content of the first read out address of the memory. There is also being produced a pulse omega, which pulse omega is not being used.

The reading out of the memory can be terminated at any time, whenever desired, in two different ways. In one way, the operator simply presses the erasing and resetting switch 330 at least once; the pressing of the switch 331 means a continued production of the —R resetting signals whereby all of the switches, including the read switch 430, are being reset. Of course, another depression of the switch 330 produces a —RP pulse which initiates a master clear routine outline above. This might be advisable so that after a manual write-in, read-in cycle, an automatic erasing and clearing operation is carried out to cover the entire data converter and to prepare the same for any succeeding operating step as desired.

An alternative manual termination of the read-out process is, of course, also possible in that in case the stop code was being written into the memory manually, a reading out of this stop code results in the production of the pulse TC2. A pulse omega now produces positive signal coincidence at the "nor" circuit 433 (FIGURE 11), and the output signal produced by "nor" circuit 433, called reset-read 1, turns off the erase switch and is also transmitted as a reset command signal through the gate 450 so that, in fact, in this manner the steering switch 630 is being reset.

Whether or not the data produced at the output of decoder 700 during the manual read-out procedure are being used in an external evaluating device or not is of no concern for this particular data converter. It can be seen that the external start command device, "nor" circuit 470, will produce an output only in the automatic mode, since it requires gating by the +A signal. Specifically, "nor" circuit 470 produces a start signal for external use during the automatic operation after the read switch is set, and provided there is no error in existence. A somewhat similar signal combination is present at the output of "nor" circuit 553 of the clock device shown in FIGURE 12 during manual mode. The "nor" circuit 553 produces a coincidence signal upon occurrence of the +D, the +S and of the +M signal. The output of "nor" circuit 553 was used as a single-shot clock pulse during manually-controlled read-out. The question of an error signal is not relevant during this phase of manual operation. Thus, it is possible to use the output of "nor" circuit 553 externally for starting an evaluating process in an evaluating routine of the manually read-out character. It is, therefore, advisable to provide a jacket which leads to the output terminal or terminals of "nor" circuit 553 so that a proper connection can be made, for example, to a start relay such as 811 in FIGURE 16.

*Modifications*

Figure 22:
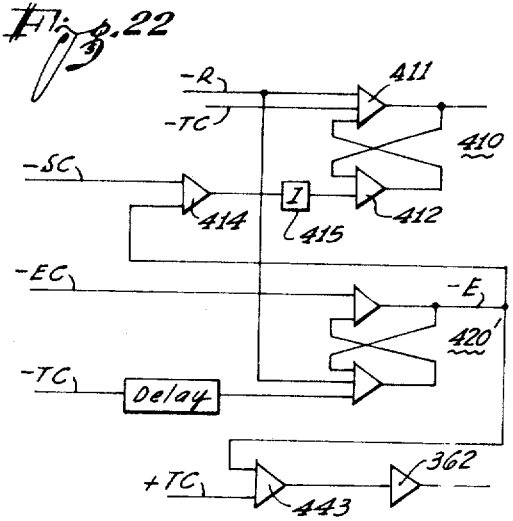
FIGS. 22 and 23 illustrate block diagrams of modification of the data converter for providing alternative modes of a word-skip subroutine.

FIGURE 22 illustrates a modification of the control device to carry out a modified word-skip program or subroutine. This modification assumes that the error code as instruction character on the tape indicates that the very next word has to be skipped. Thus, the error code is printed on the tape ahead of the start code character pertaining to the faulty word. The occurrence of this error code as instruction character signals that but one word is to be skipped. This modification operates further on the premises that the word following the error code will not be written into the memory at all, so that neither a write-in nor a read-out operation is carried out with respect to this particular word succeeding the error code. Accordingly, the modification shown in FIGURE 22 includes a "nor" gate 414, the output terminal of which connects to an inverter 415 for governing the set side "nor" gate 412 of the read switch 410, otherwise connected and used as aforedescribed. This "nor" gate 414 has two input terminals. One is connected to receive the start code signal —SC derived from the start code detector 220 as aforedescribed. However, this signal —SC is effective only if there is no error signal being developed. In other words, the "nor" circuit 414 is normally gated-open by a positive signal which can also be identified as a negative signal —E keeping this "nor" gate 414 open for as long as no error code has been received.

However, as soon as the error code character enters the input register 150, it sets the single error switch 420' which is the substitute for the two flip-flops 421 and 422 in FIGURE 11. Switch 420' produces the —E error signal, thereby blocking the "nor" gate 414 so that the start code when entering next into the input register 150 is prevented from turning on the write switch 410.

It will be recalled from the description of the operation above that memory write-in requires the production of the signal W and of the write-in command signal WC. This signal pair is produced anew every time a new word enters the detector range of the reader 100. In the absence of such command signals, the memory remains inactive, and particularly the successive inputs standing at the digit drivers 621 through 626 will not become effective, since the inactivated blocking oscillator 610 does not open the digit drivers.

Using the modification of FIGURE 22, there is no necessity for having the erase clock run at all, because there is provided no memory read-out period for the faulty word. The word succeeding the error code is skipped over entirely without affecting the buffer memory at all. The "nor" circuit 443 controls and sets the erase switch 440 in the preferred embodiment. (FIGURES 1 through 16). In the present modification (FIGURE 22), it is suggested to disconnect the output of "nor" circuit 443 from erase switch 440 (connection shown in FIGURE 11), and to reconnect it to the input of the reset side of the tape drive switch 360, and particularly the input of "nor" gate 362 thereof which, in the preferred embodiment (FIGURE 10), directly connects to the stop code detector 240. Presently, there is provided a direct connection between the output of the "nor" circuit 443 and input of "nor" circuit 362. Accordingly, the tape will be stopped by the stop code signal only if there is no error in existance. If, however, the error code had been detected, and if that following word was not being written into the memory, there is no need to stop the tape and, accordingly, after an error signal has appeared, the next following stop code will not stop the tape drive. The error switch 420' may be reset by the stop code —TC, but it is advisable to use a slight delay or to use the trailing edge of the —TC pulse so that the —TC pulse will have already decayed at the input side of "nor" circuit 443 when the error signal is being removed. The tape now continues to run until the next start code, which was not preceded by an error code, enters the input register 150.

Figure 23:
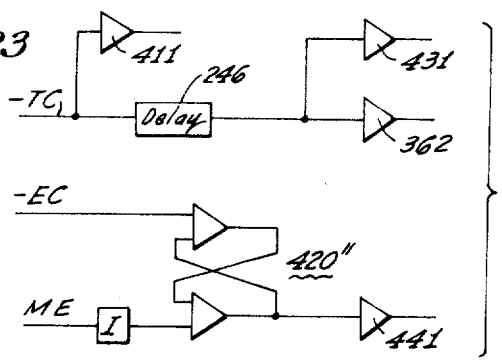

FIGURE 23 illustrates another modification in which the error code instruction appears on the tape always after the stop code and behind the word which is to be skipped over. It will be appreciated that in this case the word that is to be skipped has already been written into the memory.

This modification of FIGURE 23 includes a delay device 246 which delays the effectiveness of the —TC signal to such an extent that the tape continues to run and the tape switch is not being turned off until after disappearance of the stop code; specifically, the tape must travel for a distance as measured from the stop code which would put the error code character on the tape, if present, into the range of the detector or tape reader 100.

It will be recalled that the words are being printed on the tape in a succession which provides for a space in between succeeding words that is larger by about one order of magnitude than the space normally provided in between succeeding characters within one word. It will further be recalled that during a normal read-out operation the tape will stop after the stop code has entered the input register 150. The particular place of stopping is not critical. The only condition is that the tape is to be stopped before the next start code of the next word enters the range of the tape reader. Thus, in general, the tape does not have to be stopped right after the appearance of the stop code. Accordingly, in this embodiment the delay device 246 is provided for delaying the stopping proper of the tape for a certain distance that is about equal to the space in between characters within a word plus the length of a bit measured in tape transport direction. The tape recording device is provided with a means to print the error code or skip code instruction character on the tape very close to the stop code so that the tape, after the stop code has appeared on the register, will continue to cover at least that distance. Accordingly, upon tape reading, the tape will not stop until the reader has had a chance to monitor whether or not there is an error code printed after the stop code.

The delayed output of the delay device 246 is, of course, effective in the reset "nor" gate 362 of the tape switch 360. The error code is not written into the memory because the —TC signal turns off the write switch. If this is undesirable, the delayed output of the delay device 246, rather than the TC signal, can be used to turn write switch 410 off. The concurrent production of pulses alpha, beta and omega by each of the characters is not impeded by this modification.

In this particular modification the "nor" circuit 443 is not necessary at all because the erase switch 440 can now be set by the signal E directly, because the error code instruction signal ±E appears as the very last signal of a word and prior to the effective and desirable stopping of the tape as described. Thus, there is no necessity of having a coincidence produced by a TC and an E signal as in the preferred embodiment.

The error switch 420" for this modification will be set as aforedescribed by the —EC error code and it will be reset by the ME signal or by the reset-read 2 signal for completing and stopping the erasing operation.

After such erasing operation, the tape will be re-started by the +TC2 signal which is always the last one read out of the memory.

Even though the error code appeared after the stop code during memory write-in, the error code is either not written into the memory as stated, or the plugboard 690 insures that it will be read out of the memory prior to the stop code.

The output of the delay device 246 will also have to be connected to the set side "nor" gate 431 of the read switch 430, so that the memory read-out and the development of the signals D and DC are, in fact, being delayed until it has been decided whether there is or there is not an error core printed behind the stop code on the tape.

It will be recalled that above it was mentioned that start and stop codes can be used interchangeably. This modification shall be explained briefly. Assuming, for example, that the tape is to be read-out in the opposite direction as the one described above, all that is required is to reverse the connections of the "nor" gates 221 and 222 on one hand with those of the "nor" circuits 241 and 242 on the other hand. In this case, the start code will then be used as tape stopping instruction, and the stop code will be used as a start write-in instruction. Additionally, it then would be necessary to connect the input side of the inverter 710 in FIGURE 15 to the decoder output terminal 700-start.

It has to be observed that, in case of an inverse direction of read-out, two situations have to be distinguished. If the tape drive is adjustable in such a manner that the tape can be transported in either one of two directions without exchanging the spools, no further provisions are necessary. If, however, the tape read-out direction as such is determined and fixed so that the spools will have to be exchanged for inversion of tape read-out, then the following additional changes in the circuit network have to be made. A selector switch may be provided permitting the selective connection of the output of amplifier 111 to the "nor" circuit 166, while the output of amplifier 116 is connected to the "nor" circuit 161. The output or outputs of amplifiers 112 and 115, respectively, can connect to the outputs of "nor" circuits 165 and 162. And, finally, the "nor" circuits 163 and 164 will then be connected to the output of amplifier 114 and 113, respectively. No further switching operations or means for providing such switching operations are necessary in order to enable the data converted to operate for read-out in either one of the two directions of possible tape movement.

The invention is not limited to the embodiments described above, but all changes and modifications thereof not constituting departures from the spirit and scope of the invention are intended to be covered by the following claims.

What is claimed is:

1. A data converter for operative interpositioning between a data-evaluating apparatus and a data storage medium containing characters comprised of a combination of bits arranged in parallel tracks, and in a serial-by-character and parallel-by-bit relationship, comprising:
    a plural channel reader for serially reading said characters, parallel by bit, one channel per track and bit;
    an input register connected to said reader for temporarily storing all read-out bits pertaining to one character;
    a buffer memory having a plurality of addresses and having an activatable input circuit connected to said input register for storing said read-out characters parallel by bit in individual addresses, there being a buffer output circuit including a character decoding adapted for connection to said evaluating apparatus;
    an instruction decoder connected to said input register and monitoring each character in said register for specific instruction codes prior to loading of such character into said memory, and including means for providing first and second control signals in response to respectively two code characters respectively preceding and succeeding a group of said characters other than instruction characters;
    a control circuit connected to said instruction decoders for alternatingly activating said memory input and output circuits, respectively in response to said first and second control signals; and
    means for controlling memory input and output character flow rates in respective response to the supply rate by the reader and the demand rate by the evaluating device.

2. A data converter for reading data stored in a storage medium, serial by character and parallel by bit, comprising:
    a plural channel reader for serially reading out said characters, one channel per bit;
    a buffer connected to said reader and having a plurality of addresses;
    means responsive to special instruction codes serially stored in said storage medium for alternating buffer operation between a write-in and a read-out program routine;
    interrupting means responsive to a special bit combination for interrupting said program routine;
    means responsive to said interrupting means for advancing said buffer through a subroutine independent from said program routine; and
    means responsive to the completion of said subroutine to return said buffer to continue said program routine at a point different from occurrence of the interruption.

3. A data converter for reading data that are stored in a storage medium in several tracks, and in a serial-by-character and parallel-by-bit relationship, comprising:
    a plural channel reader for serially reading said characters, one channel per track and bit;
    a clock-pulse forming network selectively responsive to clock pulses furnished by and derived from said storage medium, and from an external evaluating device,
    a buffer having a plurality of addresses and having input means connected to the reader and being connected for cyclically calling on said addresses in synchronism with said clock pulses as derived from any of said sources for storing characters in said addresses at the rate determined by the clock pulses derived from the storage medium, the buffer further having output means for passing characters from the addresses and at a rate as respectively called by to the external device;
    first means developing two distinct command signals for buffer write-in and read-out operation, respectively; and
    second means connected to the reader for deriving from said storage medium instruction code signals and connected to the first means for controlling cyclical alternation of development of said two command signals.

4. In a tape reader, for reading characters visibly stored on a tape, with each character being comprised of a combination of bits across the tape, the bits of different characters being arranged in parallel tracks along said tape, the characters being arranged in words that include instruction and data code characters, the combination comprising:
    a serial character tape reader for concurrently reading the bits of a character;
    controllable means for passing said tape through the detection range of said reader;
    a bit detector connected to said tape reader and producing a sprocket pulse when at least one bit is read by said reader;
    means responsive to said sprocket pulse to produce a delayed control pulse appearing when said bit that produced said sprocket pulse has left the detecting range of said reader; and
    selective control means connected to said tape reader and responsive to particular bit combinations for stopping said tape-passing means, and being connected to be responsive to said delayed pulse for phasing the stopping of said tape.

5. In a tape reader, for reading characters visibly stored on a tape, with each character being comprised of a combination of bits across the tape, the bits of different characters being arranged in parallel tracks along said tape, the characters being arranged in words that include instruction and data code characters, the combination comprising:
    a serial character tape reader for concurrently reading the bits of a character;
    controllable means for passing said tape through the detection range of said reader;
    an instruction code detector connected to said reader; and
    means responsive to the output furnished by said instruction code detector to decide for each character read out whether or not said controllable means should be deactivated, and to deactivate said controllable means upon occurrence of at least one instruction code.

6. A device for reading and decoding data stored serially on a tape and including instruction and information characters, the combination comprising:
    a tape reader serially responsive to the characters on the tape;
    means for advancing said tape through the detecting range of said reader;
    an instruction decoder connected to said tape reader;
    a buffer memory including input and output circuits selectively activatable for write-in and read-out respectively the input circuit being connected to said tape reader for receiving therefrom characters read from the tape;

a decoder connected to said input circuits;

a decision-making unit responsive to at least one instruction character for cyclically advancing said memory and its input and output circuits through a write-in, read-out routine; and means in said decision-making unit responsive to a further instruction code for temporarily overriding said routine and substituting a character skip routine.

7. A data converter for operative interpositioning between a data-evaluating apparatus and a data storage medium containing characters comprised of a combination of bits arranged in parallel tracks, and in a serial-by-character and parallel-by-bit relationship, comprising:

a plural channel reader for serially reading said characters, parallel by bit, one channel per track and bit;

an input register connected to said reader for temporarily storing all read-out bits pertaining to one character;

a code detector connected to said register to be responsive to an instruction character and producing an output signal representative thereof;

a buffer memory having a plurality of addresses and having an activatable input circuit connected to said input register for storing said read-out characters parallel by bit in individual addresses, there being a buffer output circuit adapted for connection to said evaluating apparatus;

first control means connected to be responsive to the output of said code detector further connected to the buffer input circuit for interrupting the memory write-in and deactivating said memory input circuit and commencing memory read-out by activating said memory output circuit; and second control means connected to be responsive to said instruction character signal when read out from said memory and further connected to the input and output circuits for interrupting memory read-out and commencing memory write-in by reactivating said memory input circuit.

8. A data converter for interposition between a data-evaluating apparatus and a data storage medium, comprising:

a data-reading device for reading the content of the storage medium;

a buffer memory connected to said reader and receiving encoded signals therefrom for storage in a parallel-by-bit and serial-by-character relationship during a memory write-in routine;

a decoder connected to said buffer for receiving the characters stored in said addresses in serial relationship during a read-out routine;

means connected to said decoder to be responsive to an instruction code signal in said decoder for preparing said buffer for a data write-in routine; and means connected to the input side of the memory to be responsive to a similar code signal for terminating the write-in operation and for operatively coupling said buffer to said decoder.

9. A data converter for operative interpositioning between a data-evaluating apparatus and a data storage medium containing characters comprising of a combination of bits arranged in parallel tracks, and in a serial-by-character and parallel-by-bit relationship, comprising:

a plural channel reader for serially reading said characters, parallel by bit, one channel per track and bit;

controllable means for passing said storage medium through the detecting range of said reader;

an input register connected to said reader for temporarily storing all bits read by said reader and pertaining to one character;

a code detector connected to said register to be responsive to an instruction character and producing an output signal representative thereof;

a buffer memory having a plurality of addresses and operatively connectable to said input register for memory write-in, thereby storing said read characters parallel by bit in individual addresses;

a buffer circuit operatively connectable to said addresses for memory read-out and adapted for connection to said evaluating apparatus;

means for starting said controllable means for initiating passage of said storage medium through the detecting range of said reader and for concurrently coupling said addresses of said memory to said input register for write-in;

first control means responsive to said instruction signal for deactivating said controllable means to stop said medium and for concurrently blocking memory write-in and for coupling addresses to said output register for said memory read-out; and second control means responsive to an output furnished by said memory to reactivate said control means and to interrupt memory read-out.

10. A data converter for operative interpositioning between a data-evaluating apparatus and a data storage medium containing characters comprised of a combination of bits arranged in parallel tracks, and in a serial-by-character and parallel-by-bit relationship, comprising:

a plural channel reader for serially reading said characters, parallel by bit, one channel per track and bit;

controllable means for passing said storage medium through the detecting range of said reader;

an input register connected to said reader for temporarily storing all read-out bits pertaining to one character;

instruction code detecting means connected to said input register to be responsive to a first and a second instruction character and for respectively producing first and second output signals representative thereof;

a buffer memory having a plurality of addresses and having an activatable input circuit connected to said input register for storing said read-out characters parallel by bit in individual addresses, there being a buffer output circuit adapted for connection to said evaluating apparatus;

means for starting said controllable means for initiating passage of said storage medium through the detecting range of said reader;

first control means responsive to said first instruction signal for activating the input circuit of said memory for write-in;

second control means responsive to said second instruction signal for deactivating said input circuit of said memory and concurrently activating the output circuit of said memory for initiating memory read-out, and for further concurrently deactivating said controllable means to stop said medium; and third control means responsive to memory read-out of said second instruction signal for reactivating said controllable means for restarting said medium and for concurrently terminating said memory read-out, said first control means reactivating the input circuit of said memory for write-in after another detection of a first instruction code.

11. In a tape reader, for reading characters visibly stored on a tape, with each character being comprised of a combination of bits across the tape, the bits of different characters being arranged in parallel tracks along said tape, the characters being arranged in groups that include instruction and data code characters, the combination comprising:

a serial character tape reader for concurrently reading the bits of a character;

controllable means for passing said tape through the detection range of said reader;

an input register connected to said reader for temporarily storing all read-out bits pertaining to one character;

means responsive to the detection of at least one bit in said reader in any of said tracks and for producing a sprocket pulse in response thereto;

means responsive to said sprocket pulse and producing a delayed program clock pulse;

a code detector connected to said register to be responsive to an instruction character and producing an output signal representative thereof; and means responsive to said delayed program clock pulse and to said instruction signal for deactivating said control means for stopping said tape after the instruction character has left the detecting range of said reader.

12. In a tape reader, for reading characters visibly stored on a tape, with each character being comprised of a combination of bits across the tape, the bits of different characters being arranged in parallel tracks along said tape, the characters being arranged in groups that include instruction and data code characters, the combination comprising:

a serial character tape reader for concurrently reading the bits of a character;

controllable means for passing said tape through the detection range of said reader;

an input register connected to said reader for temporarily storing all read-out bits pertaining to one character;

means connected to the output side of said register for testing the number of bits in said input register for each character as to even parity, and producing a parity error signal whenever the number of bits in said register is odd; and means responsive to said parity error signal for deactivating said controllable means to stop said medium.

13. In a tape reader, for reading characters visibly stored on a tape, with each character being comprised of a combination of bits across the tape, the bits of different characters being arranged in parallel tracks along said tape, the characters being arranged in groups that include instruction and data code characters, the combination comprising:

a serial character tape reader for concurrently reading the bits of a character;

controllable means for passing said tape through the detection range of said reader;

an input register connected to said reader for temporarily storing all read-out bits pertaining to one character;

means responsive to the detection of at least one bit in said reader in any of said tracks and for producing a sprocket pulse in response thereto;

means responsive to said sprocket pulse and producing a delayed program clock pulse;

means for testing the number of bits in said input register for each character as to even parity, and for producing a parity error signal whenever the number of bits in said register is an odd one; and means responsive to concurrent occurrence of said parity error signal and of said program clock pulse to stop said storage medium whenever the character read as an odd-numbered bit combination has left the detecting range of said reader.

14. A data converter for operative interpositioning between a data-evaluating apparatus and a data storage medium containing characters comprised of a combination of bits arranged in parallel tracks, and in a serial-by-character and parallel-by-bit relationship, comprising:

a plural channel reader for serially reading said characters, parallel by bit, one channel per track and bit;

an input register connected to said reader for temporarily storing all read-out bits pertaining to one character;

a buffer memory having a plurality of addresses and having an activatable input circuit connected to said input register for storing said read-out characters parallel by bit in individual addresses, there being a buffer output circuit adapted for connection to said evaluating apparatus;

instruction code detector means connected to said input register and producing individual instruction code signals for each instruction code serially appearing in said register;

first control means selectively responsive to a first and a second instruction code signal to respectively initiate memory write-in and memory read-out program routines; and second control means responsive to said second and third instruction code signals derived from said detector means and interrupting said write-in–read-out program routine and to carry out a character-skipping subroutine.

15. A data converter for operative interpositioning between a data-evaluating apparatus and a data storage medium containing characters comprised of a combination of bits arranged in parallel tracks, and in a serial-by-character and parallel-by-bit relationship, comprising:

a tape-bit reading means for serially reading said characters, parallel by bit, at most one bit per track and character;

a buffer memory having a plurality of addresses operatively coupled for write-in to said reader for storing characters read out parallel by bit in individual addresses;

a buffer output circuit operatively coupled for memory read-out to said addresses and adapted for connection to said evaluating apparatus;

first control means responsive to at least one bit pertaining to a stored character as read by said reading means and producing a first train of clock pulses activating said buffer for memory write-in;

second control means connected to be responsive to a completed evaluation of a character read out from said buffer and subsequently producing a second clock pulse for activating said buffer for calling on another address for further memory read-out, there being a train of second clock pulses;

third control means including a local oscillator producing a third train of clock pulses for calling on said memory for read-out without evaluation; and fourth control means for activating only one at a time of said first, second, and third control means, so that only one of said first, second, and third trains of clock pulses operates said memory.

16. In a tape reader, for reading characters visibly stored on a tape, with each character being comprised of a combination of bits across the tape, the bits of different characters being arranged in parallel tracks along said tape, the characters being arranged in groups that include instruction and data code characters, the combination comprising:

a serial character tape reader for concurrently reading the bits of a character;

controllable means for passing said tape through the detection range of said reader;

an input register connected to said reader for temporarily storing all read-out bits pertaining to one character;

selective switching means for manually charging and correcting the content of said register; and means for selectively starting and stopping passage of said storage tape through the detecting range of said reader.

17. In a tape reader, for reading characters visibly stored on a tape, with each character being comprised of a combination of bits across the tape, the bits of different characters being arranged in parallel tracks along said tape, the characters being arranged in groups that include instruction and data code characters, the combination comprising:
- a serial character tape reader for concurrently reading the bits of a character;
- controllable means for moving said tape through the detection range of said reader;
- an input register connected to said tape reader for temporarily storing all read-out bits pertaining to one character;
- selective switching means for manually charging and correcting the content of said register;
- means connected to the output side of said register for testing the number of bits in said input register for each character as to even parity, and producing a parity error signal whenever the number of bits in said register is odd; and
- means responsive to said parity error signal for deactivating said controllable means so as to stop the movement of said tape through the detecting range of said reader.

18. A data converter for operative interpositioning between a data-evaluating apparatus and a data storage medium containing characters comprised of a combination of bits arranged in parallel tracks, and in a serial-by-character and parallel-by-bit relationship, comprising:
- a plural channel reader for serially reading said characters, parallel by bit, one channel per track and bit;
- controllable means for passing said storage medium through the detecting range of said reader;
- an input register connected to said reader for temporarily storing all read-out bits pertaining to one character;
- a buffer memory having a plurality of addresses and having an activatable input circuit connected to said input register for storing said read-out characters parallel by bit in individual addresses, there being a buffer output circuit adapted for connection to said evaluating apparatus;
- selective switching means for manually charging and correcting the content of said register;
- means connected to the output side of said register for testing the number of bits in said input register for each character as to even parity, and producing a parity error signal whenever the number of bits in said register is odd; and
- means responsive to said parity error signal for deactivating said controllable means so as to stop the passage of said medium through the detecting range of said reader.

19. A data converter for operative interpositioning between a data-evaluating apparatus and a data storage medium containing characters comprised of a combination of bits arranged in parallel tracks, and in a serial-by-character and parallel-by-bit relationship, comprising:
- a plural channel reader for serially reading said characters, parallel by bit, one channel per track and bit;
- an input register connected to said reader for temporarily storing all read-out bits pertaining to one character;
- a buffer memory having a plurality of addresses and having an activatable input circuit connected to said input register for storing said read-out characters parallel by bit in individual addresses, there being a buffer read-out circuit connected to said addresses;
- an output register connected to said buffer read-out circuit;
- clock-pulse deriving means for producing periodically triplets of phase-shifted pulses, the first one in time thereof being applied to said input and output registers for clearing same periodically, the second one in time being applied to said memory input and output circuits for governing the cyclical calling on the addresses of said buffer memory;
- first means connected for cyclically operating said memory input and output circuits for write-in and read-out; and
- second means responsive to the third one in time of each triplet to selectively control said first means for phasing the change-over from memory write-in to memory read-out and vice versa.

20. In a data converter as set forth in claim 19, the phase shift between the first and the second one of said phase-shifted pulses being longer for the memory write-in routine than for the memory read-out routine.

21. A data converter for operative interpositioning between a data-evaluating apparatus and a data storage medium containing characters comprised of a combination of bits arranged in parallel tracks, and in a serial-by-character and parallel-by-bit relationship, comprising:
- a plural channel reader for serially reading said characters, parallel by bit, one channel per track and bit;
- an input register connected to said reader for temporarily storing all read-out bits pertaining to one character;
- a buffer memory having a plurality of addresses and having an activatable input circuit connected to said input register for storing said read-out characters parallel by bit in individual addresses, there being a buffer output circuit connected to said addresses, and there being an output register connected to said buffer output circuit;
- instruction code detecting means connected to said input register to be responsive to a first and a second instruction character and for respectively producing first and second output signals representative thereof;
- clock-pulse deriving means for producing periodically triplets of phase-shifted pulses, the first one in time thereof being applied to said input and output registers for clearing same periodically, the second one in time being applied to said memory input and output circuits for governing the cyclical calling on the addresses of said buffer memory, and the third one in time being used for strobing change-over from memory write-in to memory read-out and vice versa;
- first control means respectively responsive to said first and second instruction output signals for selectively gating said memory input and output circuits for control by said second pulses; and
- second control means selectively responsive to said first instruction output signal when in said input and said output register for gating one of said third pulses for initiating a write-in and a read-out routine exchange.

22. A data converter for operative interpositioning between a data-evaluating apparatus and a data storage medium containing characters comprised of a combination of bits arranged in parallel tracks, and in a serial-by-character and parallel-by-bit relationship, comprising:
- a plural channel reader for serially reading said characters, parallel by bit, one channel per track and bit;
- an input register connected to said reader for temporarily storing all read-out bits pertaining to one character;
- controllable means for passing said storage medium through the detecting range of said reader;
- a buffer memory having a plurality of addresses and having an activatable input circuit connected to said input register for storing said read-out characters parallel by bit in individual addresses, there being a buffer output circuit adapted for connection to said evaluating apparatus;
- a detector connected to said input register for developing a parity error code signal upon appearance of an odd number of bits in said register;
- clock-pulse producing means for producing periodically triplets of phase-shifted pulses, the first one in time thereof being applied to said input register for clearing same, the second one in time being applied to said memory input and output circuits for governing the cyclical calling on the addresses thereof and erasing the content therein upon occurrence of said error code signal, and the third one in time strobing change-over from memory write-in to memory read-out;

means responsive to said parity error signal for inhibiting further production of said second pulse of said triplets; and means responsive to said parity error signal for applying the third pulse following the inhibited second one to stop passage of said medium under said reader.

23. A data converter for operative interpositioning between a data-evaluating apparatus and a data storage tape containing characters comprised of a combination of bits arranged in parallel tracks, and in a serial-by-character and parallel-by-bit relationship, comprising:

a plural channel reader for serially reading said characters, parallel by bit, one channel per track and bit;

an input register connected to said reader for temporarily storing all read-out bits pertaining to one character;

a buffer memory having a plurality of addresses and having an activatable input circuit connected to said input register for storing said read-out characters parallel by bit in individual addresses, there being a buffer output circuit including an output register adapted for connection to said evaluating apparatus, first and second code detectors responsive to an instruction code character and respectively connected to said input and output registers;

a control switch means for governing passage of said tape through the detecting range of said reader;

manually operable start-signal and reset-signal producing means;

first control means for controlling said switching means to stop passage of said storage tape upon occurrence of either one of said reset signal and of said instruction signal when in said first detector; and second control means for controlling said switching means to start passage of said storage tape upon occurrence of either one of said start signal and of said instruction signal when read out from said memory and detected by said second detector.

24. A data converter for operative interpositioning between a data-evaluating apparatus and a data storage tape containing characters comprised of a combination of bits arranged in parallel tracks, and in a serial-by-character and parallel-by-bit relationship, comprising:

a plural channel tape reader for serially reading said characters, parallel by bit, one channel per track and bit;

an input register connected to said reader for temporarily storing all read-out bits pertaining to one character;

a buffer memory having a plurality of addresses and having an activatable input circuit connected to said input register for storing said read-out characters parallel by bit in individual addresses, there being a buffer ouput circuit including an output register adapted for connection to said evaluating apparatus;

first and second code detectors responsive to a similar instruction code character and respectively connected to said input and output registers;

means connected to the output side of said input register for testing the number of bits in said input register for each character as to even parity, and producing a parity error signal whenever the number of bits in said register is odd;

drive means coupled to the tape for providing passage of the tape under the reader;

control switching means connected to the drive means for governing passage of said tape through the detecting range of said reader;

manually operable start-signal and reset-signal producing means;

first control means for controlling said switching means and respectively connected to the manually operable means, the parity testing means and the first detector to stop passage of said storage tape upon occurrence of either one of said reset signal, said parity error signal, and of said instruction character as detected by said first detector; and second control means for controlling said switching means to start passage of said tape upon occurrence of either one of said start signal and of said instruction character as detected by said second detector.

25. A data converter for operative interpositioning between a data-evaluating apparatus and a data storage medium containing characters comprised of a combination of bits arranged in parallel tracks, and in a serial-by-character and parallel-by-bit relationship, comprising:

a plural channel reader for serially reading said characters, parallel by bit, there being one channel per track and bit;

an input register connected to said reader for temporarily storing all read-out bits pertaining to one character;

a buffer memory having a plurality of addresses and having an activatable input circuit connected to said input register for storing said read-out characters in individual addresses parallel by bit, there being a buffer output circuit including an output register adapted for connection to said evaluating apparatus;

first and second code detectors responsive to similar combination of bits as an instruction code character and being respectively connected to said input and output registers;

a read switch governing activation of said memory output circuit;

means for manually developing a reset signal;

first control means for turning said read switch on in response to occurrence of said instruction character in said first detector; and second control means for selectively turning said read switch off in response to occurrence of said manually initiated reset signal, and of said instruction character when read out from said memory and detected by said second detector.

26. A data converter for operative interpositioning between a data-evaluating apparatus and a data storage medium containing characters comprised of a combination of bits arranged in parallel tracks, and is a serial-by-character and parallel-by-bit relationship, comprising:

a plural channel reader for serially reading said characters, parallel by bit, one channel per track and bit;

an input register connected to said reader for temporarily storing all read-out bits pertaining to one character;

instruction code detecting means connected to said input register to be responsive to a first and a second instruction character and for respectively producing first and second output signals representative thereof;

a buffer memory having a plurality of addresses and having an activatable input circuit connected to said input register for storing said read-out characters parallel by bit in individual addresses, there being a buffer output circuit adapted for connection to said evaluating apparatus;

an erase switch responsive to subsequent occurrence of said first and second instructions signals;

a control gate for furnishing an external starting signal and being blocked by said erase switch upon occurrence of said first instruction signal;

an erase clock governed by said erase switch for erasing the content of said memory;

a read switch governing activation of said memory output circuit;

first control means for turning said read switch on in response to occurrence of said second instruction signal in said detector; and second control means connected to said memory for turning said read and said erase switches off in response to a completed emptying of said memory.

27. A data converter for operative interpositioning between a data-evaluating apparatus and a data storage medium containing characters comprised of a combination of bits arranged in parallel tracks, and in a serial-by-character and parallel-by-bit relationship, comprising:

a plural channel reader for serially reading said characters, parallel by bit, one channel per track and bit;

an input register connected to said reader for temporarily storing all read-out bits pertaining to one character;

a buffer memory having a plurality of addresses and having an activatable input circuit connected to said input register for storing said read-out characters parallel by bit in indidivual addresses, there being a buffer output circuit adapted for connection to said evaluating apparatus;

instruction code detecting means connected to said input register to be responsive to a first and a second instruction character and for respectively producing first and second output signals representative thereof;

first control means for activating said memory input circuit for memory write-in;

second control means connected to be responsive to said first instruction code signal for deactivating said memory input circuit, activating said output circuit and developing an externally usable starting signal; and third control means connected to be responsive to said second instruction code signal for suppressing development of said externally usable starting signal.

28. A data converter for operative interpositioning between a data-evaluating apparatus and a data storage medium containing characters comprised of a combination of bits arranged in parallel tracks, and in a serial-by-character and parallel-by-bit relationship, comprising:

a plural channel reader for serially reading said characters, parallel by bit, one channel per track and bit;

an input register connected to said reader for temporarily storing all read-out bits pertaining to one character;

a code detector connected to said register to be responsive to an instruction character and producing an output signal representative thereof;

a buffer memory having a plurality of addresses and having an activatable input circuit connected to said input register for storing said read-out characters parallel by bit in individual addresses, there being a buffer output circuit adapted for connection to said evaluating apparatus;

an erase switch responsive to said code detector output signal and producing an erase signal;

a control gate for furnishing an external starting signal and being blocked upon occurrence of said instruction signal;

an erase clock governed by said erase switch for erasing the content of said memory; and means for deriving a memory empty signal from said memory to turn off said erase switch.

29. In a tape reader, for reading characters visibly stored on a tape, with each character being comprised of a combination of bits across the tape, the bits of different characters being arranged in parallel tracks along said tape, the characters being arranged in groups that include instruction and data code characters, the combination comprising:

a serial character tape reader for concurrently reading the bits of a character;

controllable means for passing said tape through the detection range of said reader;

an input register connected to said reader for temporarily storing all read-out bits pertaining to one character;

a code detector connected to said register to be responsive to an instruction character and producing an output signal representative thereof;

means responsive to the detection of at least one bit in said reader in any of said tracks and for producing a sprocket pulse in response thereto; and means for temporarily blocking said code detector in response to said bit-responsive means for a period of time that is shorter than the duration of said sprocket pulse.

30. A data converter for operative interpositioning between a data-evaluating apparatus and a data storage medium containing characters comprised of a combination of bits arranged in parallel tracks, and in a serial-by-character and parallel-by-bit relationship, comprising:

a plural channel reader for serially reading said characters, parallel by bit, one channel per track and bit;

an input register connected to said reader for temporarily storing all read-out bits pertaining to one character;

a buffer memory having a plurality of addresses and having an activatable input circuit connected to said input register for storing said read-out characters parallel by bit in individual addresses, there being a buffer output circuit adapted for connection to said evaluating apparatus;

instruction code detecting means connected to said input register to be responsive to a first and a second instruction character and for respectively producing first and second output signals representative thereof;

a write switch for governing the input circuit of said buffer memory;

control means responsive to said first and second instruction code signals to respectively turn said write switch on and off;

means connected to the output side of said register for testing the number of bits in said input register for each character as to even parity, and producing a parity error signal whenever the number of bits in said register is odd; and means for inhibiting the production of said parity error signal whenever said write switch is off.

31. A data converter for operative interpositioning between a data-evaluating apparatus and a data storage medium containing characters comprised of a combination of ibts arranged in parallel tracks, and in a serial-by-character and parallel-by-bit relationship, comprising:

a plural channel reader for serially reading said characters, parallel by bit, one channel per track and bit;

a buffer memory operatively connected to said reader and having a plurality of addresses for storing characters in said addresses, one character per address;

an output register operatively connected to said addresses;

a decoder connected to said output register;

means responsive to externally produced clock pulses and producing a pair of phase-shifted pulses, the first one in time of each pair being applied to clear said output register; and means responsive to the second one in time of each pair of pulses for calling on said addresses for memory read-out, so that an address called on loads said output register and said decoder.

32. A data converter for reading data stored in a storage medium in a serial-by-character and parallel-by-bit relationship and for preparing such data for use in an evaluating apparatus, comprising:
- a plural channel reader for serially reading out said characters one bit per channel;
- a buffer memory having a plurality of addresses and having an activatable input circuit connected to said input register for storing said read-out characters parallel by bit in individual addresses, there being a buffer output circuit connected to said evaluating apparatus;
- a decoder connected to the buffer output circuit for serially decoding the content that is being stored in said addresses;
- a control unit adapted to receive a first instruction signal from said decoder that said buffer has been emptied and for further receiving a second instruction code signal from said reader and producing a control signal for initiating memory write-in enabling said buffer to store in its addresses characters serially read out by said reader; and
- means for terminating the memory write-in procedure in response to an instruction code similar to said first instruction code and when received by said reader.

33. A data converter for operative interpositioning between a data-evaluating apparatus and a data storage medium containing characters comprised of a combination of bits arranged in parallel tracks, and in a serial-by-character and parallel-by-bit relationship, comprising:
- a plural channel reader for serially reading said characters, parallel by bit, one channel per track and bit;
- an input register connected to said reader for temporarily storing all read-out bits pertaining to one character;
- a buffer memory having a plurality of addresses and having an activatable input circuit connected to said input register for storing said read-out characters parallel by bit in individual addresses, there being a buffer output circuit including an output register adapted for connection to said evaluating apparatus;
- a pair of similar instruction code detectors respectively connected to said input and output registers for respectively activating said buffer output and input circuits;
- means for calling on said address in a predetermined succession for buffer write-in in accordance with the periodically varying content of said input register; and
- means for calling on said addresses in a different succession for buffer read-out, while the address containing said instruction code is being called on last.

34. In a tape reader, for reading characters visibly stored on a tape, with each character being comprised of a combination of bits across the tape, the bits of different characters being arranged in parallel tracks along said tape, the characters being arranged in groups that include instruction and data code characters, the combination comprising:
- a serial character tape reader for concurrently reading the bits of a character;
- controllable means for passing said tape through the detection range of said reader;
- an input register connected to said reader for temporarily storing all read-out bits pertaining to one character;
- means responsive to the detection of at least one bit in said reader in any of said tracks and for producing a sprocket pulse in response thereto;
- means for testing the number of bits in said input register for each character as to even parity, and for producing a parity error signal whenever the number of bits in said register is an odd one;
- means responsive to said sprocket pulse to temporarily inhibit production of said parity error signal; and
- means responsive to said parity error signal for controlling said tape-passing means to stop said tape.

35. A data converter for operative interpositioning between a data-evaluating apparatus and a data-storage medium containing charcters comprised of a combination of bits arranged in parallel tracks and in a serial-by-character and parallel-by-bit relationship, comprising:
- a plural channel reader for serially reading said characters, parallel by bit, one channel per track and bit;
- a buffer memory having activatable input and output circuits and a plurality of addresses, one for each character the input circuit being connected to said reader, the output circuit being connected to said evaluating device;
- means for intermittently advancing said buffer memory through a write-in routine to successively store into said addresses the characters as they are read out by the reader;
- an instruction decoder connected to said reader to interrupt said write-in routine upon the occurrence of a specific instruction code character in said reader;
- first means responsive to external clock signals for successively calling on said addresses for buffer read-out;
- second means including an internal clock-pulse source for successively calling on said addresses for buffer read-out; and
- means enabled by the specific instruction code and connected to said instruction decoder to be responsive to a further instruction code character for blocking said first means and enabling said first means during the absence of said further instruction code character.

36. In a tape reader, for reading characters visibly stored on a tape, with each character being comprised of a combination of bits across the tape, the bits of different characters being arranged in parallel tracks along said tape, the characters being arranged in groups that include instruction and data code characters, the combination comprising:
- a serial character tape reader for concurrently reading the bits of a character;
- controllable means for passing said tape through the detection range of said reader;
- an input register connected to said reader for temporarily storing all read-out bits pertaining to one character;
- means connected to the output side of said register for testing the number of bits in said input register for each character as to even parity, and producing a parity error signal whenever the number of bits in said register is odd;
- means responsive to the detection of at least one bit in said reader in any of said tracks and for producing a sprocket pulse in response thereto;
- means responsive to said sprocket pulse and producing a delayed program clock pulse;
- selective switching means for manually charging and correcting the content of said register; and
- means responsive to concurrent occurrence of said parity error signal and of said program clock pulse to stop said storage medium whenver the character read as odd-numbered bit combinations has left the detecting range of said reader.

37. A data converter for operative interpositioning between a data-evaluating apparatus and a data storage medium containing characters comprised of a combination of bits arranged in parallel tracks and in a serial-by-character and parallel-by-bit relationship, comprising:
- a plural channel reader for serially reading said characters, parallel by bit, one channel per track and bit;
- an input register connected to said reader for temporarily storing all read-out bits pertaining to one character;
- a decoder connectable to an external evaluating device;
- an output register connected to said decoder;
- a buffer memory having a plurality of addresses selectively operatively couplable to said input and said output register;

means for cyclically varying the coupling of said input and output registers to said memory;

first means for deriving a first clock pulse from said reader whenever at least one bit is read by said reader;

second means responsive to an externally produced clock pulse;

third means including a local oscillator for producing a train of clock pulses;

gating means for permitting the passage of clock pulses from one of said first, second, and third means; and clock-pulse timing means responsive to the output pulses permitted to pass through said gating means for producing periodically triplets of phase-shifted pulses, the first one in time being applied to said input and output registers for clearing same, the second one in time clocking said buffer memory for sequentially calling on the individual addresses thereof, and the third one in time phasing the change-over of the coupling of said input and output registers to said buffer memory.

38. A data converter for preparing data for use in an evaluating device, which data are stored on a tape, such data including serially stored instruction and information characters, comprising:
  means for moving said tape past a given detecting range;
  a tape reader for serially reading said instruction and information characters on said tape when passing through said range;
  a buffer memory connected to said reader and receiving encoded signals therefrom for storage in a parallel-by-bit and serial-by-character relationship during a memory write-in routine;
  similar first and second instruction decoders respectively connected to input and output sides of said memory, responsive to a particular instruction character and producing first and second instruction signals; and
  means connected to said decoders for applying said second instruction signal to said tape-moving means for starting said tape, while applying said first instruction signal to said tape-moving means for stopping said tape.

39. In a data converter wherein data are read out serially from a storage medium for temporary storage in a buffer memory having storage addresses, the combination comprising:
  a local oscillator for clocking said buffer memory for memory read out;
  means responsive to two specific, serially read-out data for enabling said local oscillator; and
  means for disabling said local oscillator upon a signal developed when a predetermined number of storage addresses in said buffer memory are empty.

40. A data converter for operative interpositioning between a data-evaluating apparatus and a data storage medium containing characters comprised of a combination of bits arranged in parallel tracks, and in a serial-by-character and parallel-by-bit relationship, comprising:
  a tape-bit reading means for serially reading said characters, parallel by bit, one bit per track and character;
  a buffer memory having a plurality of individually callable addresses for individually storing characters parallel by bit in individual addresses;
  a buffer input circuit for connecting said callable addresses of said buffer memory to said reader;
  a buffer output circuit operatively coupled for memory read-out to said addresses and adapted for connection to said evaluating apparatus;
  first control means responsive to at least one bit pertaining to a stored character as read by said reading means and producing a first train of clock pulses activating said buffer for memory write-in;
  first control means for calling on said addresses in a predetermined succession;
  second control means connected to said input and output circuits for selectively activating said buffer output and input circuits respectively for memory read-out and write-in;
  means for developing trains of pairs of phase-shifted clock pulses, the first one in time being provided for clocking and phasing said first control means, each second one in time being provided for clocking and phasing said second control means;
  first circuit means connected to operate said first control means in synchronism with said first-in-time clock pulses; and
  second circuit means connected to be responsive to said second-in-time clock pulses for phasing operation of said second control means as to change-over from write-in to read-out and vice versa.

41. A data converter for operative interpositioning between a data-evaluating apparatus and a data storage medium containing characters comprised of a combination of bits arranged in parallel tracks and in a serial-by-character and parallel-by-bit relationship, comprising:
  a plural channel reader for serially reading said characters, parallel by bit, one channel per track and bit;
  controllable means for passing said storage medium through the detecting range of said reader;
  an input register connected to said reader for temporarily storing all read-out bits pertaining to one character;
  selective switching means for manually charging and correcting the content of said register, and capable of furnishing a first signal upon completion of manual charging of said register;
  a buffer memory having a plurality of addresses and having an activatable input circuit connected to said input register for storing said read-out characters parallel by bit in individual addresses, there being a buffer output circuit adapted for connection to said evaluating apparatus;
  a switch concurrently operating said controllable means and furnishing a second signal; and
  means responsive to said first and said second signal for activating said input circuit of said buffer to write into one address of said buffer the content of said input register.

42. A data converter for operative interpositioning between a data-evaluating apparatus and a data storage medium containing characters comprised of a combination of bits arranged in parallel tracks and in a serial-by-character and parallel-by-bit relationship, comprising:
  a reading device for reading said characters from said medium serial by character, parallel by bit;
  an input circuit including an input register connected to said reader for temporarily storing all read-out bits pertaining to one character;
  a buffer memory having a plurality of addresses and further having circuit means for selectively connecting said addresses to said input registers;
  an output circuit including an output register for selective connection to said addresses;
  first means for operative connection to said input and said output circuits for deriving clock pulses therefrom in synchronism with the appearance of bits in said registers; and
  means connected to said first means for deriving an erasing pulse from said clock pulse to reset said input and said output registers.

43. A data converted for operative interpositioning between a data-evaluating apparatus and a data storage medium containing characters comprised of a combination of bits arranged in parallel tracks, and in a serial-by-character and parallel-by-bit relationship, comprising:
 a character reader for serially reading said characters in a parallel-by-bit relationship;
 controllable means for passing said storage medium through the detecting range of said reading device;
 an input register connected to said reading device for temporarily storing all read-out bits pertaining to one character;
 a buffer memory having a plurality of addresses and having an activatable input circuit connected to said input register for storing said read-out characters, parallel by bit, and in individual addresses, there being a buffer output circuit adapted for connection to said evaluating apparatus;
 means for activating said controllable means for passing said storage medium through the detecting range of said reading device; and
 means responsive to one bit as read by said reader and producing a delayed pulse for deactivating said controllable means so as to inhibit further passage of said storage medium.

44. A data converter for operative interpositioning between a data evaluating apparatus and a data storage medium containing characters comprised of combination of bits arranged in parallel tracks, and in a serial-by-character and parallel-by-bit relationship, comprising:
 a plural channel reader for serially reading said characters, parallel by bit, there being one channel per track;
 a buffer memory having a plurality of storage cells and being connectable to said reader for storing in said cell characters as read by said reader;
 an output circuit network connected to said buffer memory for selectively drawing from the cells of said buffer memory characters as individually stored in said buffer memory cells;
 a switching means selectively activatable for activating said output circuit network to sequentially draw a plurality of characters from said buffer memory; and
 control means for turning said switching means off in selective response to a first signal drawn from a specific cell and to a second signal representative of a specific character when drawn from said memory.

References Cited
UNITED STATES PATENTS

| | | | |
|---|---|---|---|
| 3,059,221 | 10/1962 | Page et al. | 340—172.5 |
| 3,129,409 | 4/1964 | Perley | 340—172.5 |
| 3,199,084 | 9/1965 | Gehring et al. | 340—172.5 |

PAUL J. HENON, *Primary Examiner.*

G. SHAW, *Assistant Examiner.*